(12) United States Patent
Mochida et al.

(10) Patent No.: US 7,676,593 B2
(45) Date of Patent: Mar. 9, 2010

(54) METHOD OF BANDWIDTH CONTROL BY REWRITING ACK NUMBER

(75) Inventors: Kei Mochida, Tokyo (JP); Hideki Homma, Tokyo (JP)

(73) Assignee: PANASONIC Corporation, Osaka (JP)

( * ) Notice: Subject to any disclaimer, the term of this patent is extended or adjusted under 35 U.S.C. 154(b) by 378 days.

(21) Appl. No.: 11/692,281

(22) Filed: Mar. 28, 2007

(65) Prior Publication Data

US 2007/0239889 A1 Oct. 11, 2007

(30) Foreign Application Priority Data

Apr. 10, 2006 (JP) ............................ 2006-107369

(51) Int. Cl.
*G06F 15/16* (2006.01)
*G06F 15/173* (2006.01)
(52) U.S. Cl. .................. 709/234; 709/223; 709/246
(58) Field of Classification Search ............... None
See application file for complete search history.

(56) References Cited

U.S. PATENT DOCUMENTS

| 6,038,216 | A | 3/2000 | Packer | |
|---|---|---|---|---|
| 6,182,139 | B1 * | 1/2001 | Brendel | 709/226 |
| 6,389,462 | B1 * | 5/2002 | Cohen et al. | 709/218 |
| 6,976,085 | B1 * | 12/2005 | Aviani et al. | 709/234 |
| 7,139,268 | B1 * | 11/2006 | Bhagwat et al. | 370/389 |
| 2004/0006643 | A1 * | 1/2004 | Dolson et al. | 709/246 |
| 2004/0215753 | A1 * | 10/2004 | Chan et al. | 709/223 |

OTHER PUBLICATIONS

Schulzrinne et al., "RTP: A Transport Protocol for Real-Time Applications," The Internet Engineering Task Force, RFC 1889, Jan. 1996, Online: http://www.ietf.org/rfc/rfc1889.txt.

* cited by examiner

*Primary Examiner*—Wen-Tai Lin
(74) *Attorney, Agent, or Firm*—Greenblum & Bernstein P.L.C.

(57) ABSTRACT

A network relay apparatus installed with a TCP shaper has a packet converter that changes an ACK number of a confirmation reply packet in response to downstream data transmitted from a WAN side host to a lower value while transferring the packet.

13 Claims, 28 Drawing Sheets

METHOD OF BANDWIDTH CONTROL BY REWRITING ACK NUMBER

BACKGROUND OF THE INVENTION

1. Field of the Invention

The present invention relates to a packet relay apparatus connected to a packet network such as the Internet.

2. Description of Related Art

With the widespread use of the Internet in recent years, a variety of communication protocols have been in use. A protocol layer called a transport layer includes TCP (Transmission Control Protocol) and UDP (User Datagram Protocol). TCP achieves reliable data transmission.

FIG. 19 shows a TCP segment structure. TCP segment 102 is included in IP packet (hereinafter simply referred to as "packet") 101. TCP segment 102 includes TCP header 103 and TCP data 104. TCP data 104 may contain no actual data.

FIG. 28 shows an IP header 500 structure. Protocol number field 501 in IP header 500 contains a number for identifying a protocol in a transport layer included in a packet. For instance, when the protocol in the transport layer included in a packet having IP header 500 is TCP, number 6 is contained in protocol number field 501. When the protocol in the transport layer included in the packet having IP header 500 is UDP, number 17 is contained in protocol number field 501. Source IP address field 502 contains a source IP address. Destination IP address field 503 contains a destination IP address.

Generally, communication over TCP is performed between a pair of a server and a client. The client herein means a network terminal that issues a connection request; the server means a network terminal that receives the connection request. After the client issues the connection request to the server, the server and the client transmit and receive TCP data to and from each other using a packet. In data transmission, the server or client transmits a TCP segment containing TCP data to the associated client or server. When TCP data 104 of TCP segment 102 contains actual data, sequence number field 101 in TCP header 103 indicates the byte number of one-byte data at the top of TCP data 104 in the entire data to be transmitted.

FIG. 20 illustrates basic data transmission over TCP. As shown in FIG. 20, whenever server 201 transmits to client 202, TCP segments X1, X3, and X5, client 202 transmits back to server 201 TCP segments that include a confirmation reply (hereinafter referred to as ACKs) X2, X4, and X6. An ACK number field of each ACK that client 202 transmits contains a value obtained by adding 1 to a sequence number assigned to a TCP segment that client 202 has received. For example, X2, which is a confirmation reply to X1, contains a value derived from adding 1 to a sequence number of X1. Since the ACK number field of X2 shows the value derived from adding 1 to the sequence number of previously transmitted X1, server 201, upon receiving X2, confirms that X1 was properly transmitted to client, and then transmits TCP segment X3. In the operation above, server 201 can confirm that the transmitted TCP data are surely delivered to client 202 when server 201 receives the ACK from client 202.

FIG. 21 illustrates a behavior in a case when a packet loss occurs during communication over TCP. Packet loss is a situation where a packet is not properly handled on a transmission line or on a packet relay apparatus (hereinafter referred to as a "relay apparatus"), and thus the packet is not delivered to a destination. FIG. 21 is an example in which an ACK to TCP segment X13 is not returned to server 203. A packet loss might have occurred on a transmission line in this case. Then, server 203 retransmits to client 204, TCP segment X14, which contains TCP data identical to the data contained TCP segment X13. Time X17, which is a time from transmission of TCP segment X13 to transmission of TCP segment X14 from server 203, is called an RTO (Round Trip Timeout). Time X16, which is a time from transmission of TCP segment X11 containing TCP data to return of ACK X12 in response to TCP segment X11, is called an RTT (Round Trip Time).

In the above-described examples of FIGS. 20 and 21, however, server 201 or 203 does not transmit subsequent data unless confirming receipt of an ACK from client 202 or 204 in response to a TCP segment that server 201 or 203 has transmitted. More specifically, unless server 201 or 203 receives from client 202 or 204, ACKs X2, X4, X6, X12, and X15 consecutively in response to transmitted TCP segments X1, X3, X5, X11, and X13=X14 respectively, server 201 or 203 does not transmit the subsequent data, thus deteriorating transfer efficiency. Therefore, the transfer method as described above is rarely applied. The transfer efficiency has been improved with various enhancements.

FIGS. 22 and 23 are conventional examples for improving the transfer efficiency with enhanced TCP flow control on a client side. In FIG. 22, server 205 consecutively transmits TCP segments X21 to X25 at a high speed. However, client 206 is sometimes unable to process TCP segments X21 to X25 transmitted from server 205. For example, TCP segment X25 is discarded and wasted due to delay in processing, although the TCP segment was once received on client 206.

To prevent the situation above, window size 112 in the TCP header of FIG. 19 is used to notify server 207 of a remaining amount of bytes for reception as shown with TCP segments X31 and X36 in FIG. 23. Such ACKs prevent the TCP segments transmitted from server 207, from being discarded when client 208 is unable to process the data. Server 207 is able to recognize the number of TCP segments that can be transmitted consecutively to client 208, based on window size field 112 in TCP header 103 of FIG. 19, for example. In FIG. 23, based on TCP segment X31 from client 208 that notifies server 207 of a window size of 4000 bytes, server 207 transmits to client 208, TCP segments X32 to X35, which contain 1000 bytes each and thus make a total of 4000 bytes. Similarly, based on TCP segment X36 from client 208 that notifies server 207 of a window size of 4000 bytes, server 207 transmits to client 208, TCP segments X37 to X40, which contain 1000 bytes each and thus make a total of 4000 bytes.

FIG. 24 illustrates a TCP behavior in a case when a packet loss occurs during flow control with the window size. When server 209 transmits a TCP segment (byte 1000 to byte 2000) and client 210 completes receiving the TCP segment, client 210 transmits to server 209, ACK X54, which carries a number that indicates receipt of the TCP segment (ACK 2001). When a packet loss occurs in transmission of TCP segment X55 (byte 2001 to byte 3000) from server 209, TCP behaves as described below. Even when client 210 receives, from server 209, TCP segment X56 (byte 3001 to byte 4000) or TCP segment X58 (byte 4001 to byte 5000) after transmitting ACK X54 to server 209, client 210 further returns, to server 209, ACKs X57 and X59 identical to X54 (hereinafter such ACKs referred to as "duplicate ACKs"), since client 210 has yet to receive TCP segment X55 (byte 2001 to byte 3000). Server 209 then receives ACKs X54, X57, and X59, which include the number that indicates receipt through X53 on client 210 (ACK 2001), for a plurality of times. Thereby, server 209 recognizes that client 210 cannot receive TCP segment X55 due to packet loss at least in TCP segment X55, although server 209 has transmitted, to server 210, TCP segment X56 (byte 3001 to byte 4000) and TCP segment X58 (byte 4001 to byte 5000). At this point, server 209 retransmits TCP segment X55 as X60.

FIG. 25 is a conventional example that shows efficient transmission of an ACK. Instead of transmitting the ACK associated with the individual TCP segment as shown in FIG. 24, client 212 transmits to server 211, one ACK X74 or X78, which includes a confirmation reply to a plurality of TCP segments X71 to X73 or X75 to X77, thus allowing efficient transmission of the ACK. Such ACK shall be transmitted normally within 0.5 second.

FIGS. 26 and 27 are other conventional examples of efficient transmission and reception of TCP data. The examples illustrate a method where a TCP data transmitter transmits a TCP segment to a TCP data receiver, based on a window size (i.e., a maximum amount of data that the TCP data receiver can buffer before processing a received TCP segment) received from the TCP data receiver. The method employs a concept called a congestion window (hereinafter referred to as CWND). The method is effective when a transmission line between a server and a client has a sufficiently large transmission capacity.

Practically, however, the server and the client are connected via a plurality of transmission lines having a variety of transmission capacities. Further, with improvement in calculation performance these days, the client tends not to advertise a small window size. When the data transmitter consecutively transmits all TCP data up to the window size that the data receiver advertises, there is a possibility where transmission throughput may exceed a small transmission capacity of some transmission line during transmission on the plurality of transmission lines. Under the circumstance, a number of packet losses occur in the method, and thus the throughput declines.

To address the problem, a mechanism of CWND is applied to perform flow control on the TCP data transmitter as well. CWND is employed on the data transmitter. Even when the data transmitter receives a large window size from the client at the start of data transmission, the data transmitter transmits only one TCP segment at the beginning. That is, the transmission starts at CWND=1. Thereafter, CWND is increased to find an optimum CWND value.

As shown in FIG. 26, every time server 213 receives from client 214 an ACK in response to a transmitted TCP segment containing TCP data, server 213 exponentially increases the number of TCP segments, that is, the CWND value, for next transmission. More specifically, in FIG. 26, server 213 first starts the transmission at CWND=1. When receiving from client 214 ACK X82 in response to transmitted TCP segment X81, server 213 sets CWND=2 and consecutively transmits TCP segments X83 and X84. When receiving from client 214 ACK X85 in response to TCP segments X83 and X84, server 213 sets CWND=4 and consecutively transmits TCP segments X86 to X89. When further receiving from client 214 ACK X90 in response to TCP segments X86 to X89, server 213 sets CWND=8 and consecutively transmits eight TCP segments from TCP segment X91.

Server 213 continues to increase the CWND value not exceeding the window size advertised by the client, until a state of congestion (when a TCP segment is retransmitted due to packet loss or RTO expiration) is detected.

When the state of congestion occurs, server 213 decreases the CWND value by half of the point of occurrence, for example, and then linearly increases CWND not exceeding the window size advertised by the client as shown in FIG. 27.

A data transmission method after the state of congestion as shown in FIG. 27 is called "congestion avoidance mode." On the other hand, a state before the state of congestion as shown in FIG. 26 is called "slow start mode." An increase in CWND is large in slow start mode and small in congestion avoidance mode. Once switching to congestion avoidance mode, server 213 remains in the mode, not switching back to slow start mode, until one session ends.

Communication between the server and client is performed at the optimum CWND value obtained as above. In most of the recent TCP application, the above-described congestion window is used in transmission and reception.

A timing to switch from slow start mode to congestion avoidance mode may be set to a point when CWND exceeds a certain threshold in slow start mode (hereinafter referred to as a "slow start threshold"), instead of occurrence of congestion or RTO expiration as described above. The slow start threshold may be appropriately determined by an installer.

From the description above, four parameters listed below are related to the TCP throughput.

A) RTT: The throughput decreases as the RTT increases; the throughput increases as the RTT decreases.

B) CWND: The throughput increases as CWND increases; the throughput decreases as CWND decreases.

C) Window size: Increasing the window size may increase the throughput (depending on CWND). Decreasing the window size decreases the throughput, regardless of the CWND size.

D) TCP transmission mode: In slow start mode, the throughput sharply increases; in congestion control mode, the throughput moderately increases. The transmission mode is switched when congestion occurs in slow start mode or when CWND exceeds the slow start threshold in slow start mode.

As the Internet has been widely used these days, an Internet telephone (hereinafter referred to as an "IP telephone") system has been gaining popularity. In the IP telephone system, voice communication between Internet terminals is performed using a packet containing audio data. The IP telephone system includes two or more IP telephone terminals, which perform voice communication normally over UDP.

At the same time, a method for accessing the Internet on an ADSL (Asymmetric Digital Subscriber Line) or a CATV network has been widely used at home. When connecting to the Internet over the ADSL or CATV network at home, a relay apparatus is mostly used to relay a packet from an Internet terminal at home to an ISP (Internet Service Provider) or to relay a packet from the ISP to the Internet terminal at home (hereinafter the relay apparatus having the above-described functions is referred to as an "access router"). Although a transmission capacity of an access line to a home over ADSL or CATV has been increasing year after year, use of an access line that provides a bidirectional transmission capacity of 10 Mbps, such as the Ethernet, is still limited.

Recently, a trial as shown in FIG. 2 has been vigorously pursued, wherein access router D2 that functions as a gateway to the above-described home network is provided with an IP telephone function. In FIG. 2, TCP segment D5 and voice communication packet D4 are mixed on upper level transmission line D3. TCP segment D5 is transmitted between client D1 and server D7. Voice communication packet D4 over UDP is transmitted between IP telephone D8 and access router D2 installed with the IP telephone function. Further, a transmission capacity of upper level transmission line D3 is 1 Mbps, which is smaller than that of other transmission lines D9 and D10. Particularly when TCP segment D5 and voice communication packet D4 are transmitted simultaneously, a transmission amount may exceed the transmission capacity of transmission line D3. When the transmission amount exceeds the transmission capacity, a packet transmission queue or a packet reception queue of access router D2 is extended to a maximum length, thus causing a packet loss.

The packet loss has a significant impact on audio quality of voice communication packet D4 in particular. In addition, as the transmission amount on upper level transmission line D3 approaches the transmission capacity due to the TCP segment, jitter of the voice communication packet (refer to Publication 1, for example) generally becomes large, which also has a significant impact on the audio quality. The phenomenon is observed not only on access router D2, but also on upper level relay apparatus D6. Therefore, in order to improve the audio quality in the configuration as shown in FIG. 2, the throughput of the communication packet other than the voice packet, that is, the throughput of TCP segment D5 in FIG. 2, needs to be purposely lowered. Access router D2 can control an output packet so as to lower the upstream throughput of TCP segment D5 in FIG. 2, excluding the voice packet. It is difficult for access router D2, however, to control the downstream throughput, since upper level relay apparatus D6 transmits the TCP segment and the voice communication packet.

Communication other than the voice communication at home is mainly performed in a reliable transmission method, such as TCP. In order to purposely lower the downstream throughput of the TCP communication other than the voice communication and to ensure the audio quality by relatively prioritizing the voice communication, a known method is to "lower a window size value from a client" (refer to Related Art 1, for example).

[Related Art 1] Specification of U.S. Pat. No. 6,038,216

[Publication 1] Schulzrinne, H. "RTP: A Transport Protocol for Real-Time Applications."

RFC number: 1889 [online]. January, 1996. The Internet Engineering Task Force.

[retrieved on Apr. 10, 2006]. Retrieved from the Internet: http://www.ietf.org/rfc/rfc1889.txt However, a client terminal may be set to ignore the window size. Thus, the technology of Related Art 1 is not effective for the client incapable of processing the window size. With the technology, the downstream throughput of the TCP communication except of the voice communication cannot be lowered purposely, and thus the audio quality cannot be ensured.

SUMMARY OF THE INVENTION

The present invention is provided to address the above-noted shortcomings. An object of the present invention is to lower downstream throughput of TCP communication other than voice communication without depending on a window size, so as to ensure audio quality.

The present invention relates to a network relay apparatus connecting with a first terminal and a second terminal, the network relay apparatus comprising a transmitter that transmits first data received from the first terminal to the second terminal and transmits second data received from the second terminal to the first terminal, the second data comprising acknowledgement information according to the first data, and a data modifier that modifies the second data to change the acknowledgement information into an another acknowledgement information, wherein said transmitter transmits the modified second data to the first terminal. In the configuration, downstream throughput of a TCP packet does not exceed a capacity of the network, thus reducing packet loss when a voice communication packet and the like are transmitted simultaneously.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The embodiments of the present invention are explained in the following, with reference to the above-described drawings. In the present embodiments, a function provided by the present invention is referred to as a "TCP shaper." Whole data included in one packet are referred to as packet data. A packet containing a TCP segment in particular is referred to as a TCP packet. Definitions of the TCP segment and an ACK are the same as provided in the related art.

Figure 19:
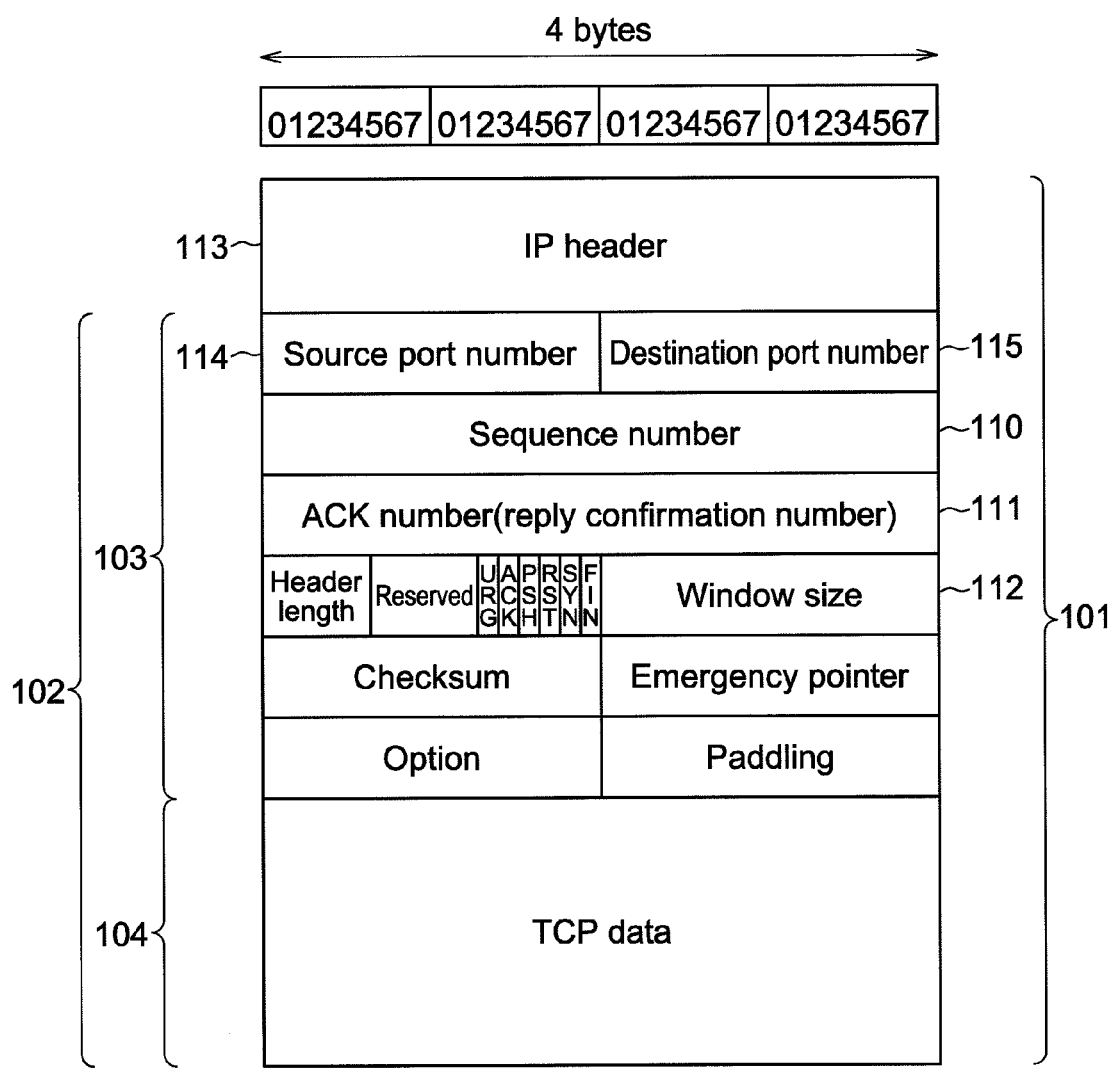
FIG. 19 illustrates a TCP header format structure.
Figure 20:
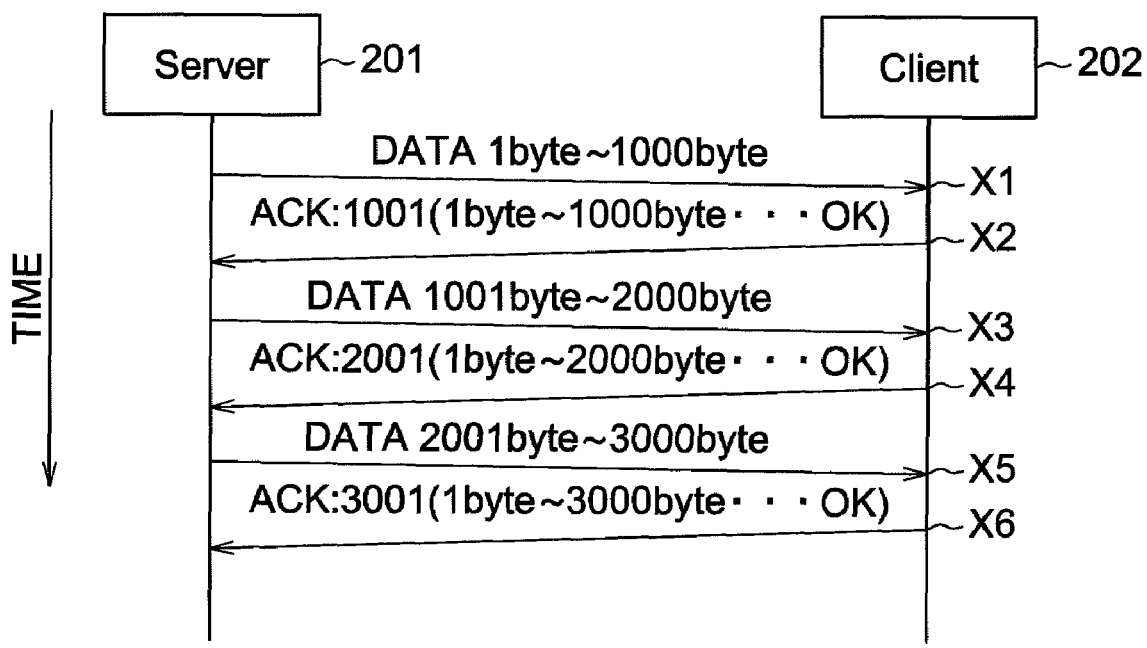
FIG. 20 is a sequence diagram illustrating the most basic TCP transmission.
Figure 21:
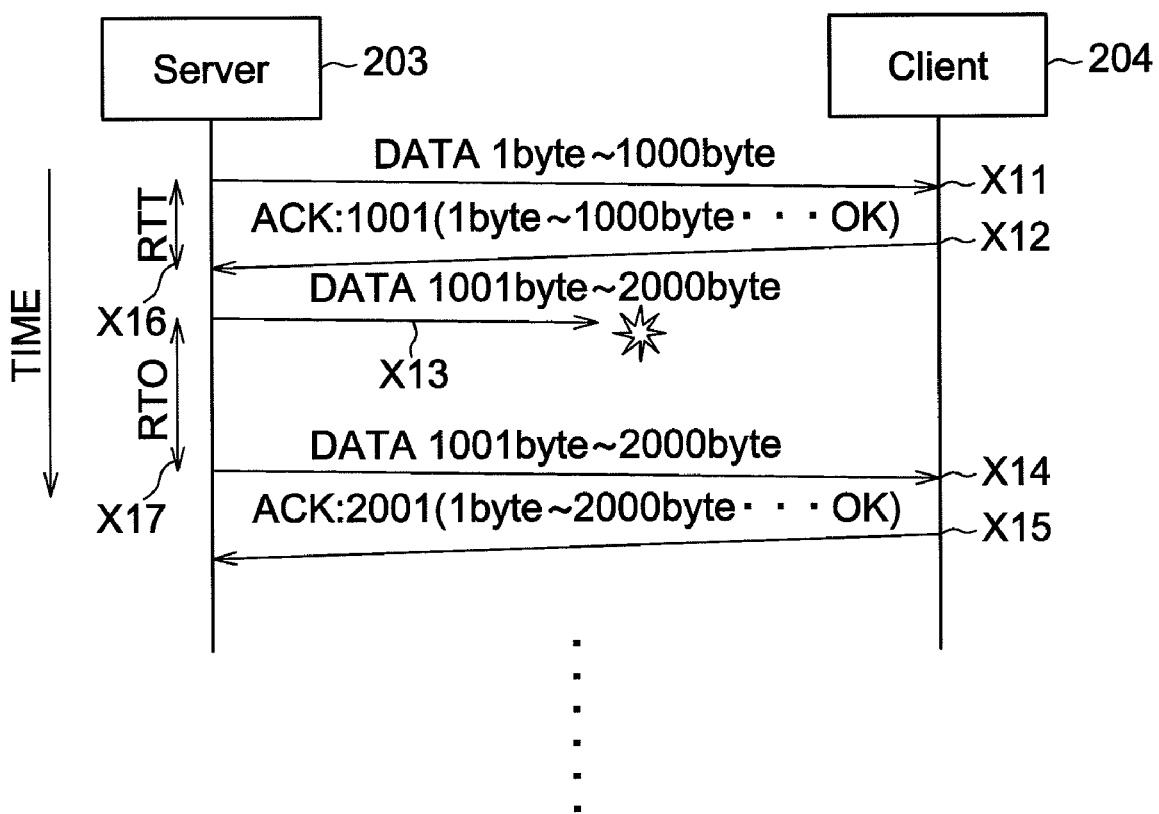
FIG. 21 is a sequence diagram illustrating operations when a packet loss occurs in the most basic TCP transmission.
Figure 22:
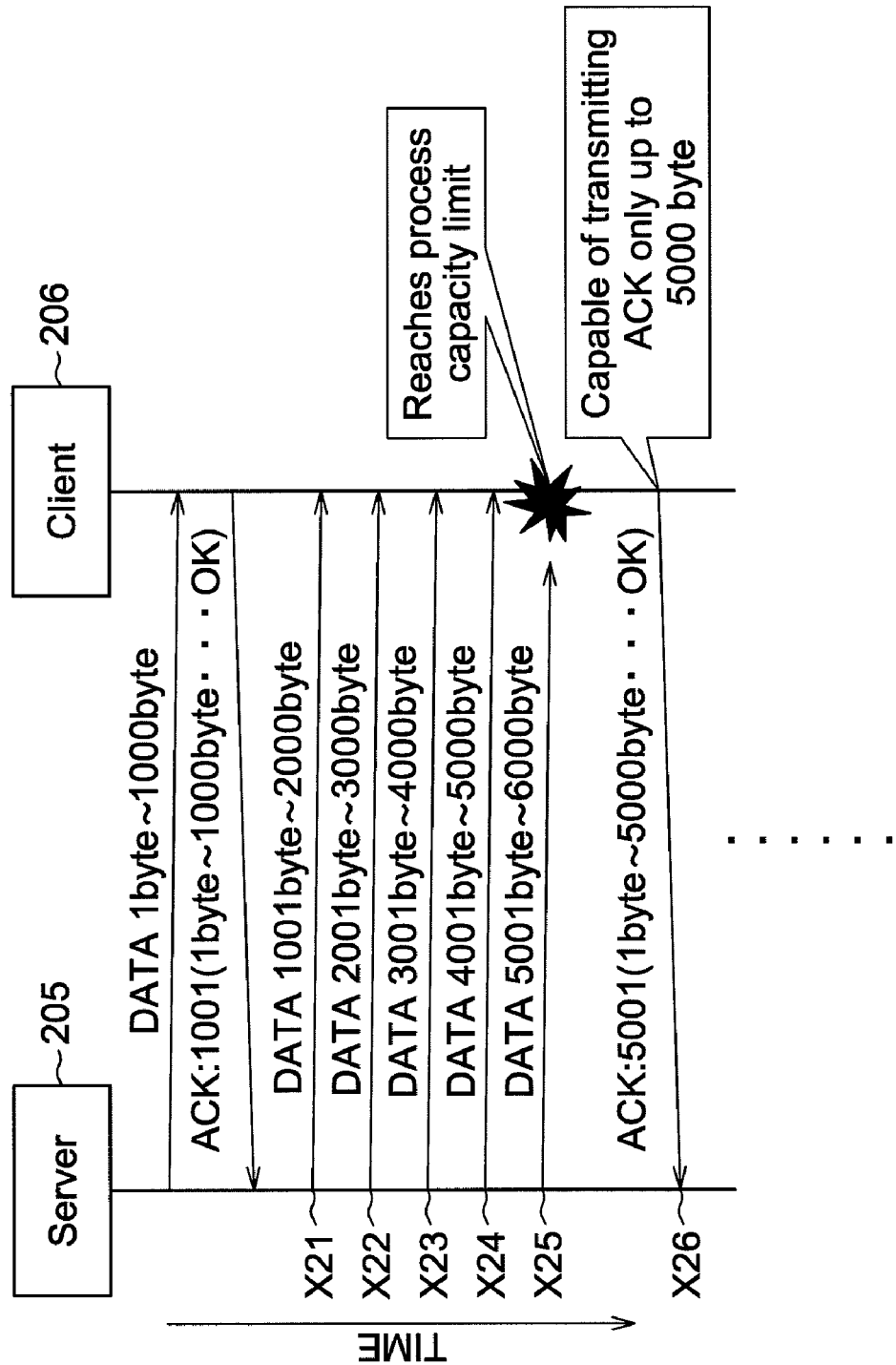
FIG. 22 is a sequence diagram illustrating operations when data transmission is beyond processing capability in basic TCP transmission.
Figure 23:
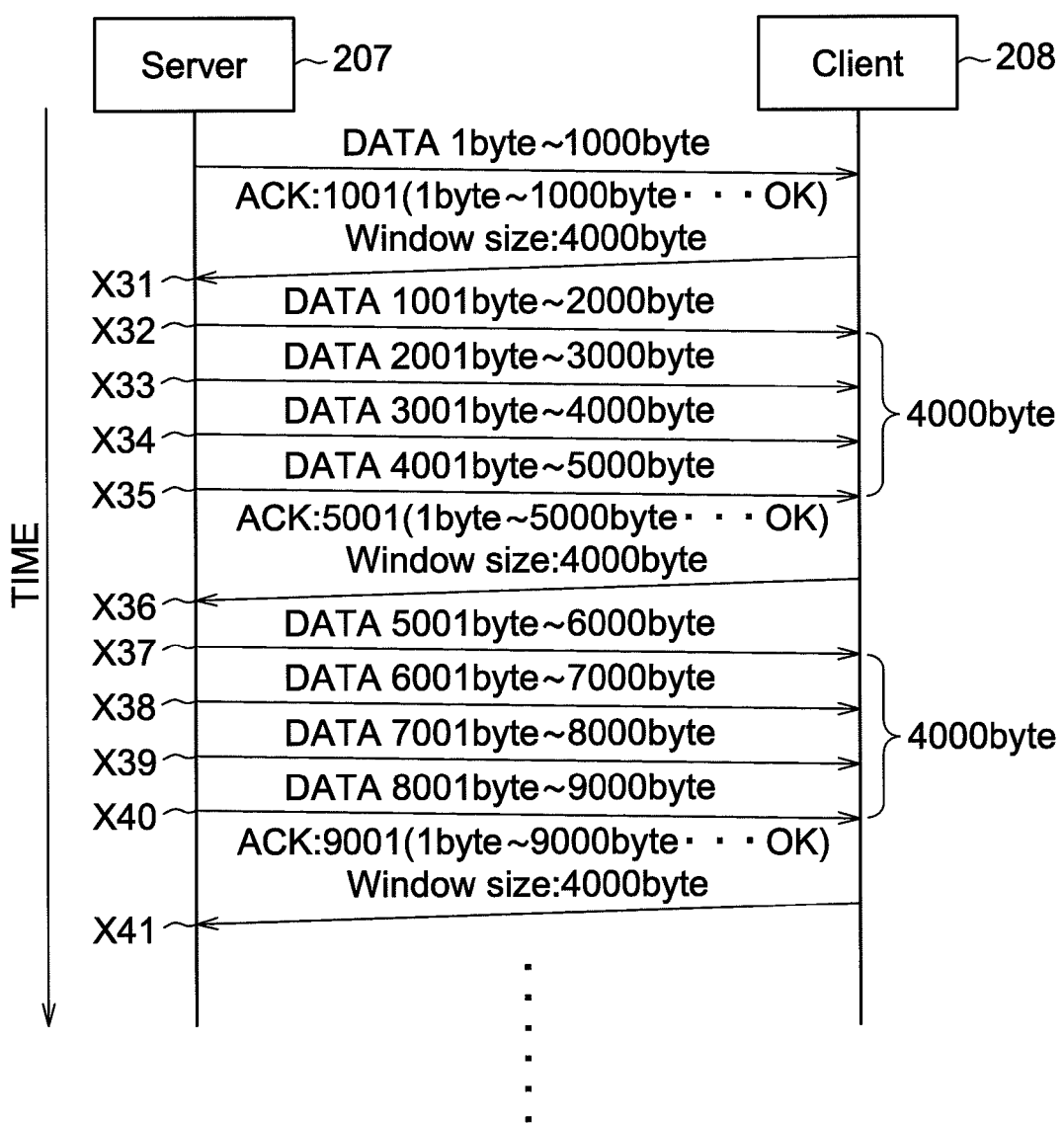
FIG. 23 is a sequence diagram illustrating TCP transmission incorporating a window size.
Figure 24:
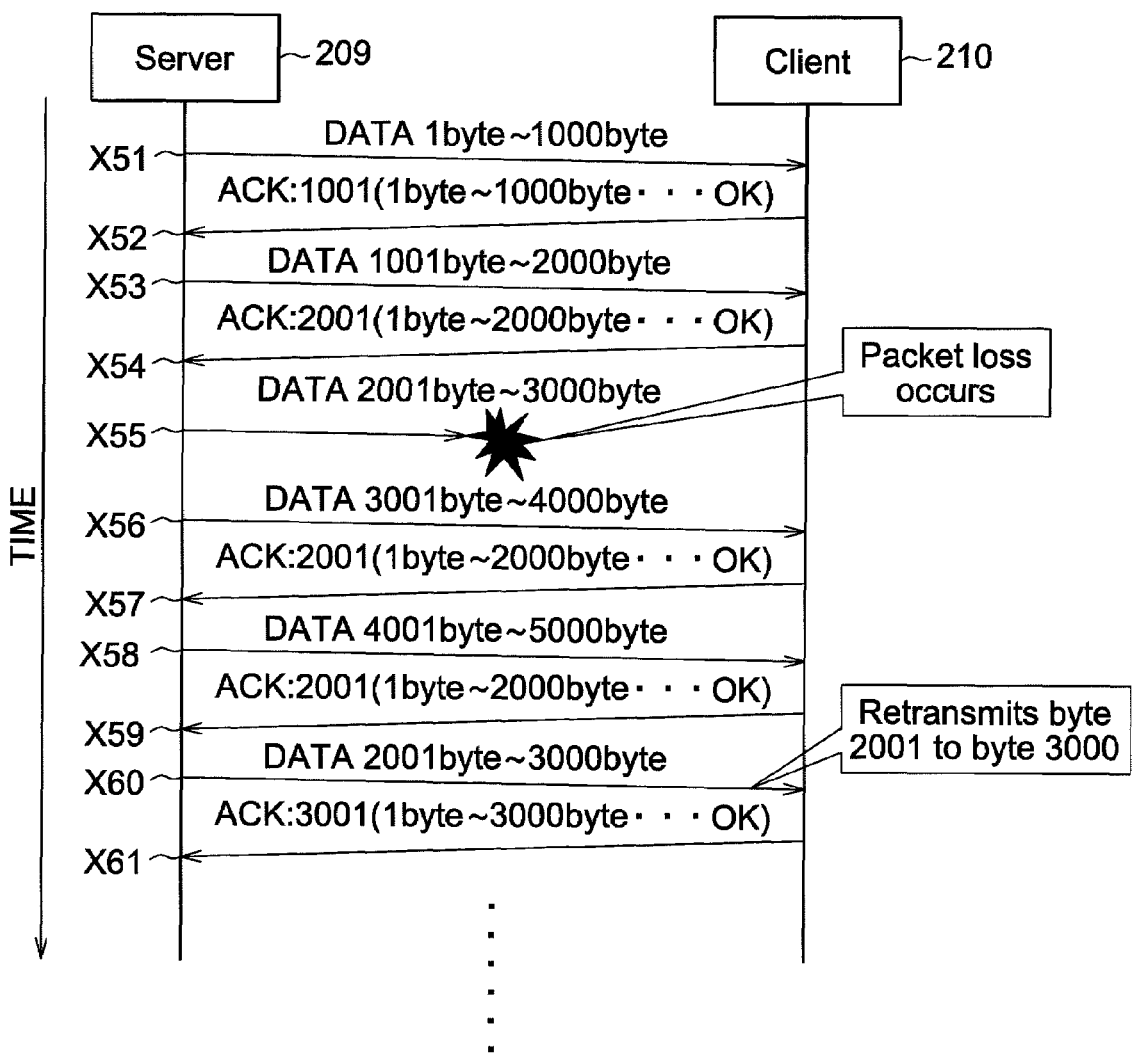
FIG. 24 is a sequence diagram illustrating operations when a packet loss occurs in TCP transmission incorporating the window size.
Figure 25:
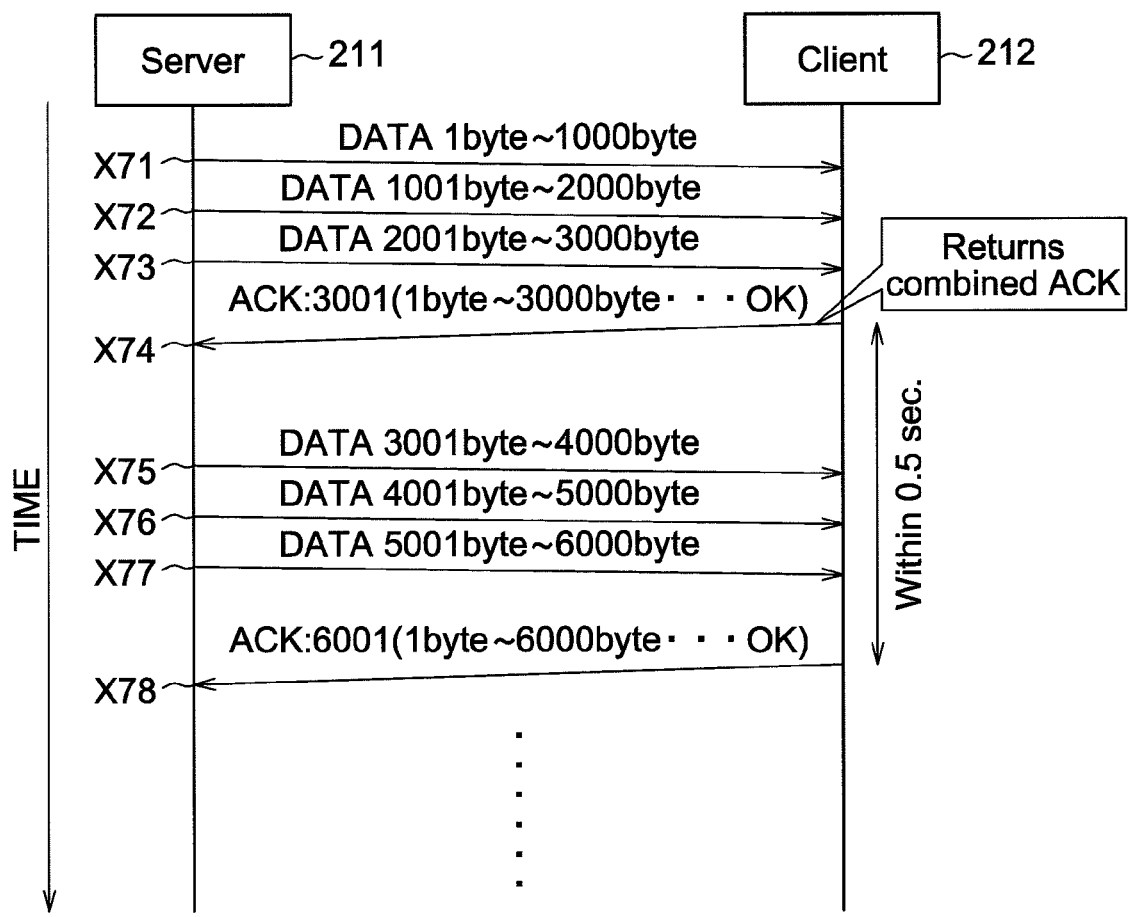
FIG. 25 is a sequence diagram illustrating a delayed ACK in TCP transmission.
Figure 26:
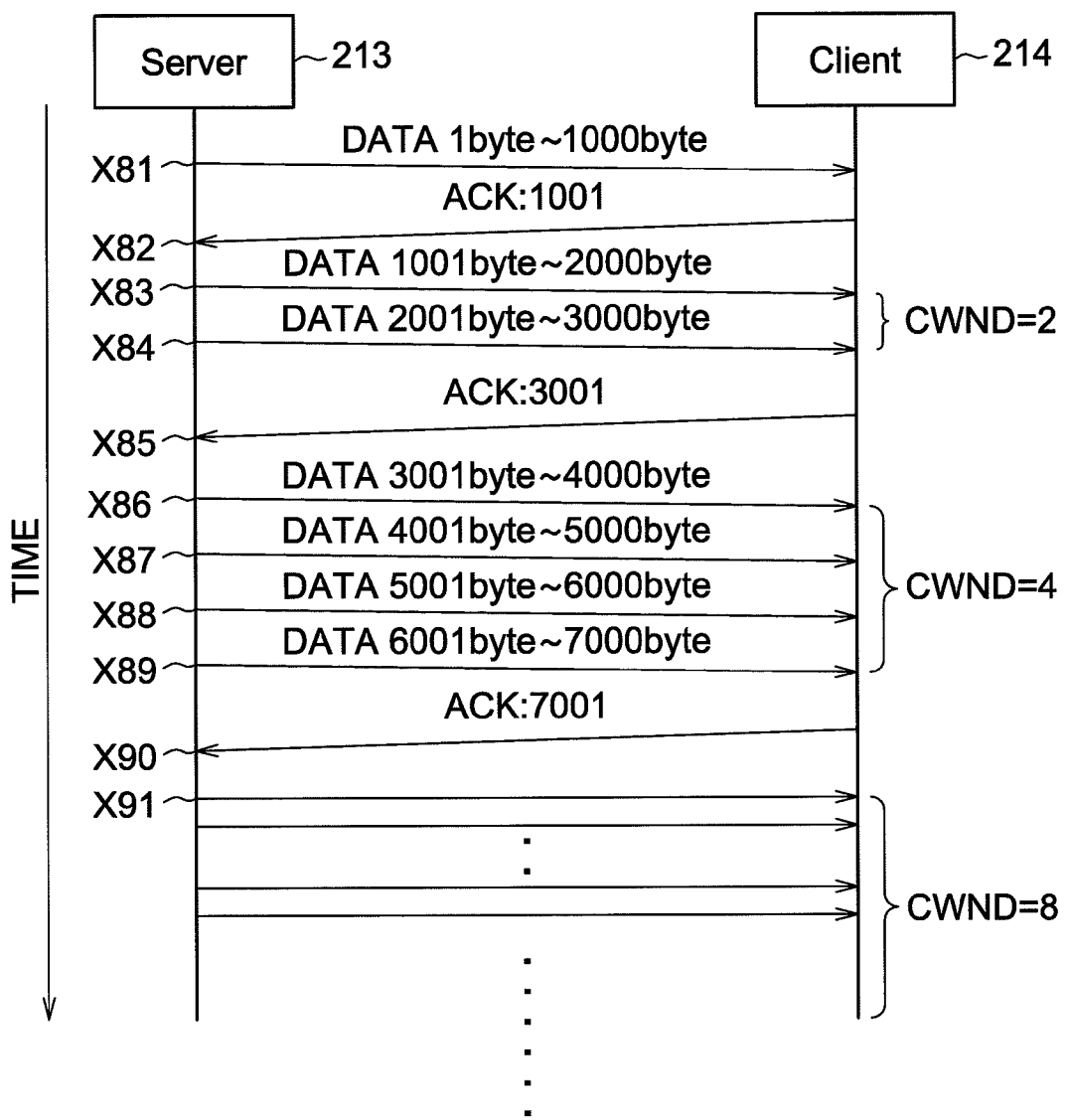
FIG. 26 is a sequence diagram illustrating transmission using a congestion window in TCP transmission (slow start mode)
Figure 27:
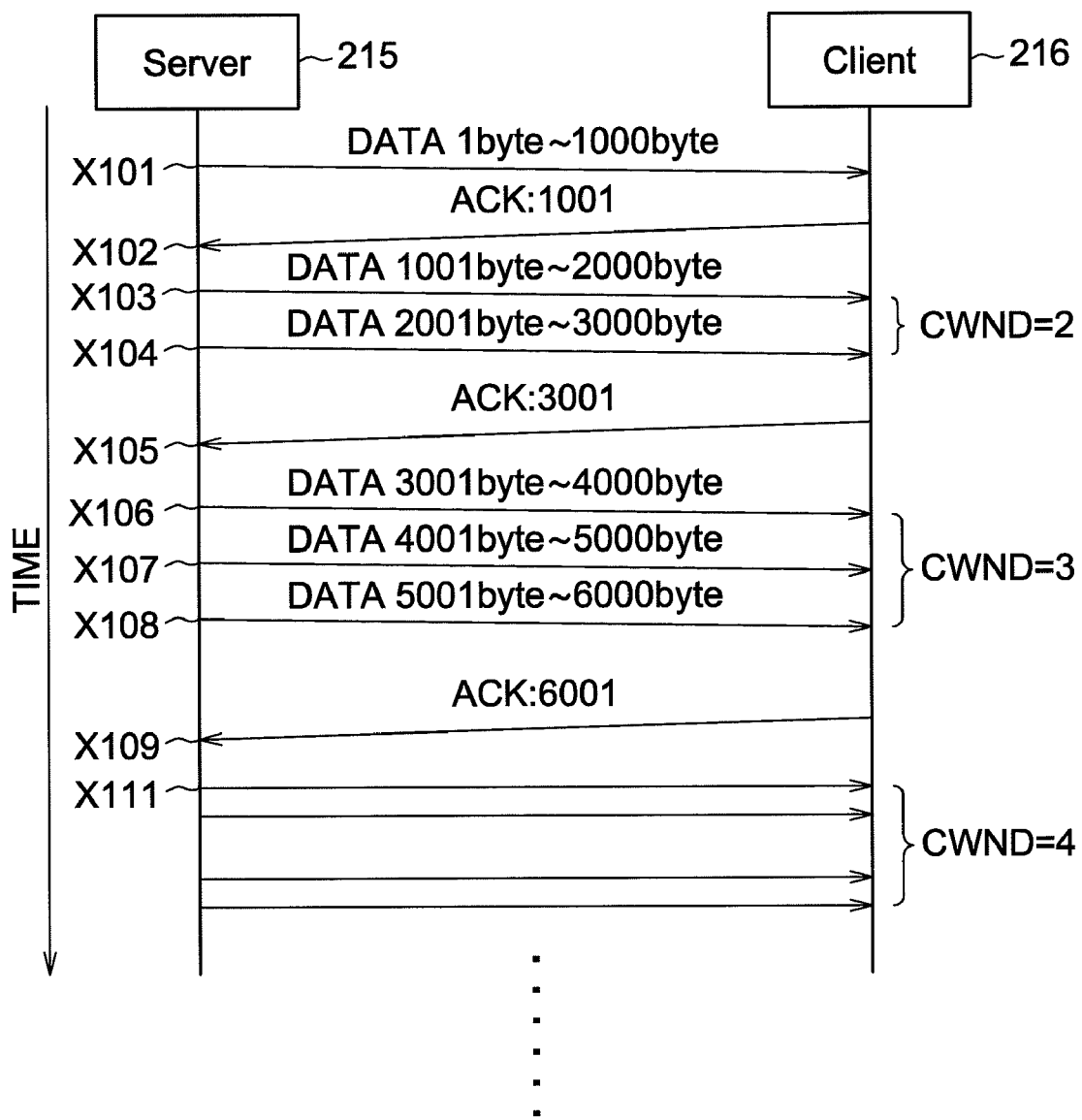
FIG. 27 is a sequence diagram illustrating transmission using the congestion window in TCP transmission (congestion avoidance mode)

TCP communication is performed between a pair of a server and a client. The client transmits a connection request to the server. When the server receives the connection request from the client, a channel for data communication is established between the server and the client. A plurality of channels may be established between the server and the client. The plurality of channels can be identified by: a client IP address and a server IP address (e.g., data contained in source IP address field 502 and destination IP address field 503 of FIG. 28); a source port number of the client (e.g., data contained in 114 of FIG. 19); and a destination port number of the server (e.g., data contained in 115 of FIG. 19). The channel is referred to as a "session" in explanations below.

First Embodiment

Figure 1:
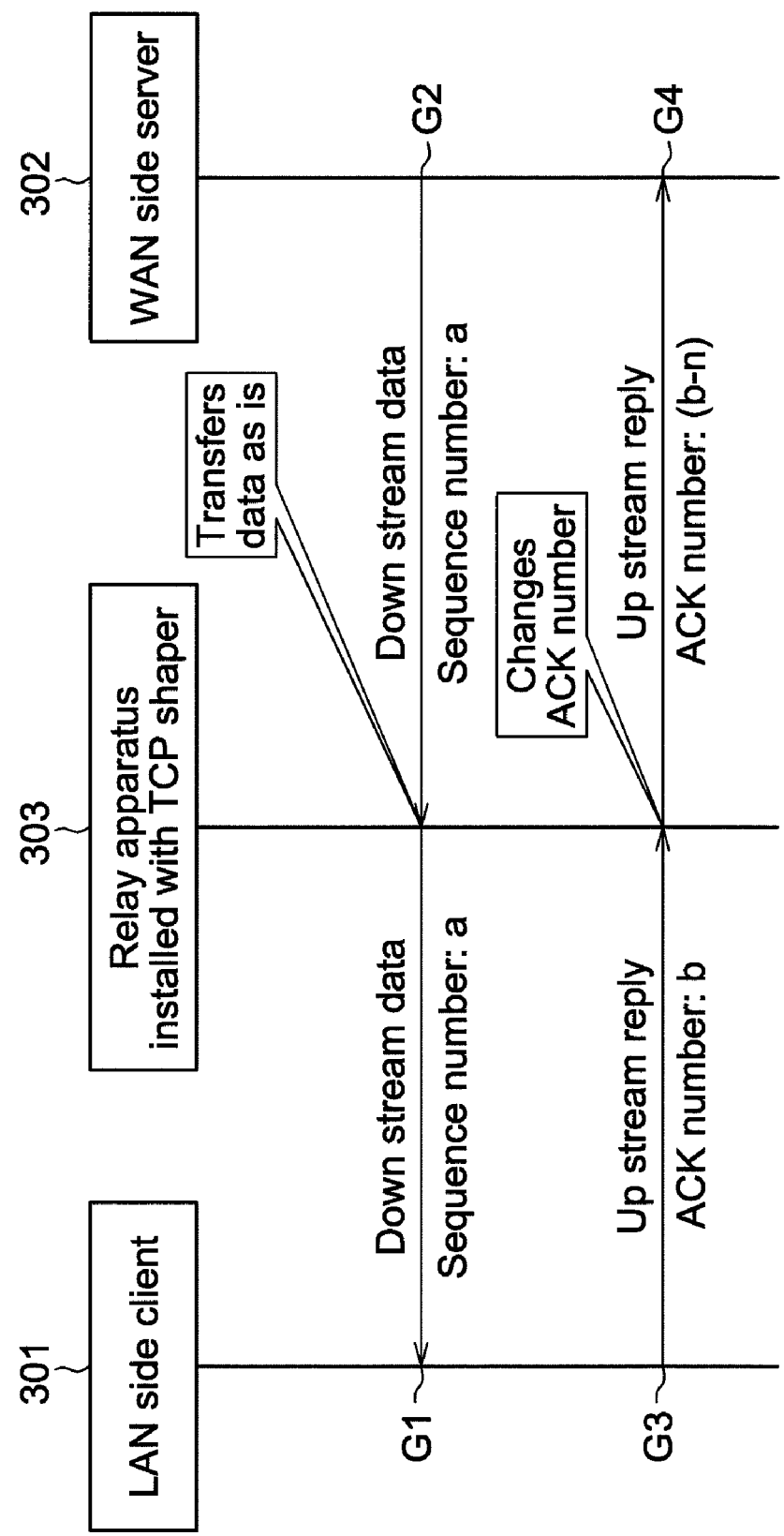
FIG. 1 is a sequence diagram illustrating packet transfer to which the present invention is applied.
Figure 3:
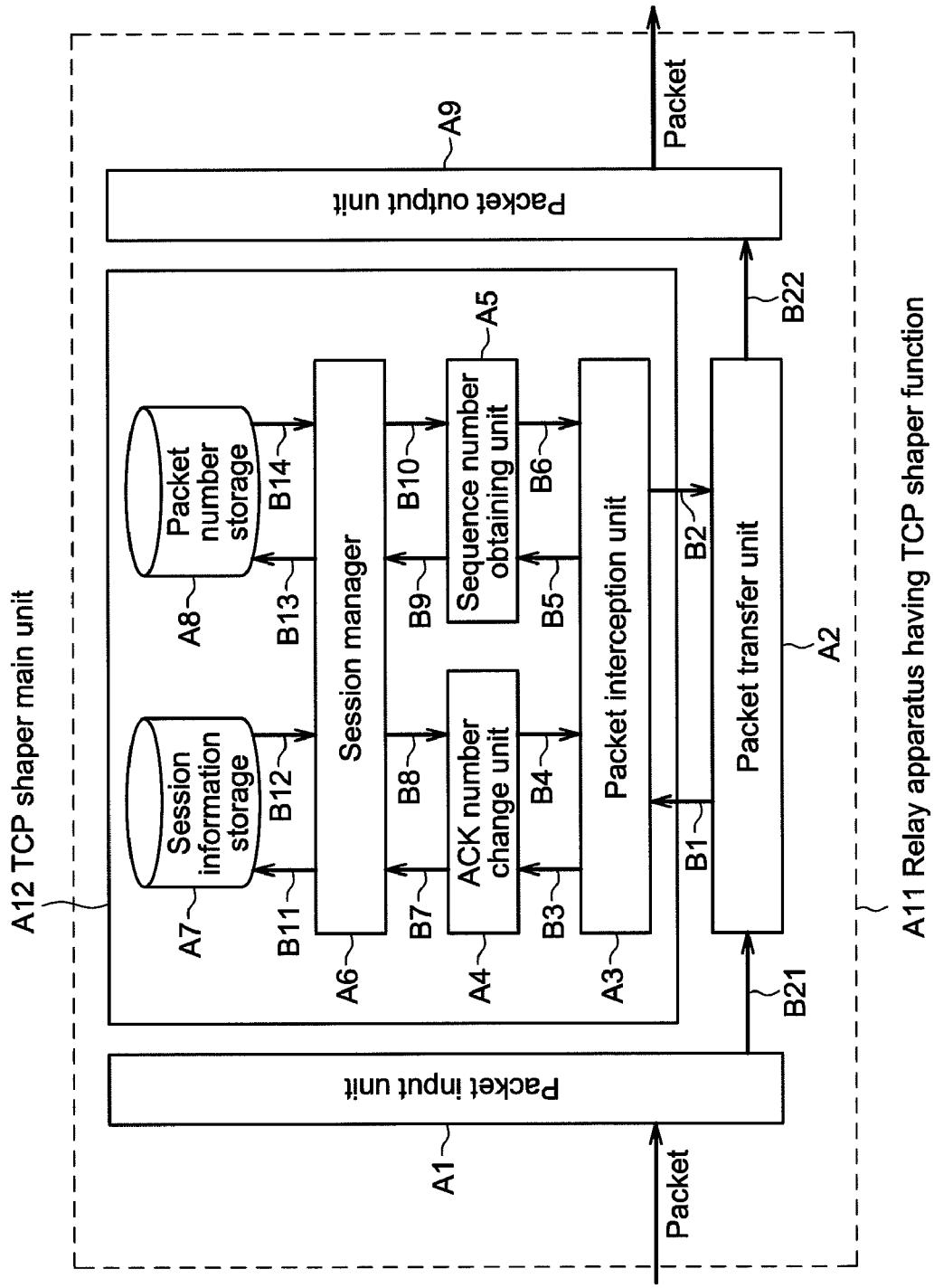
FIG. 3 is a general block diagram illustrating a configuration of a relay apparatus according to embodiments of the present invention (basic TCP shaper)
Figure 4:
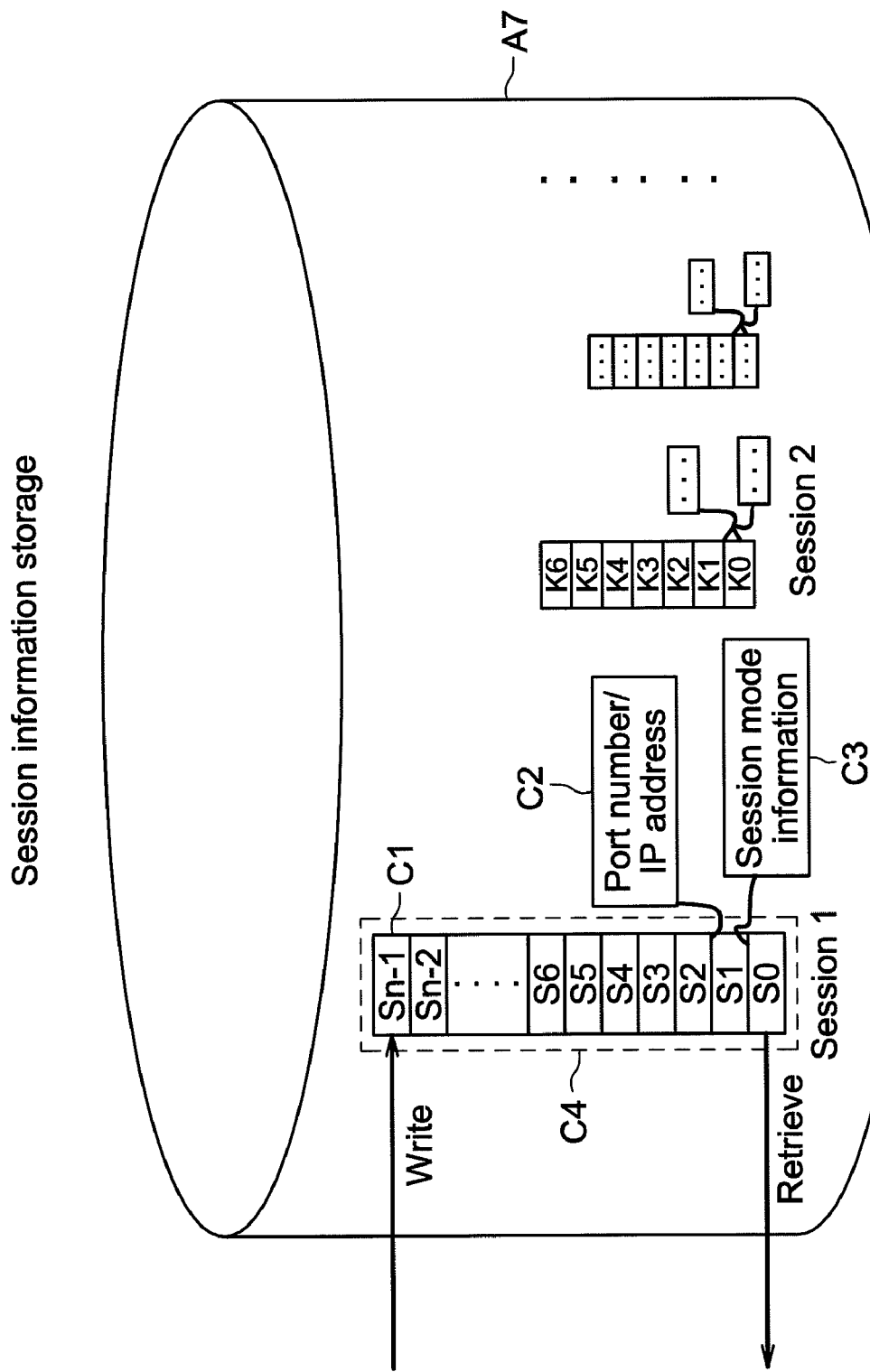
FIG. 4 illustrates a structure of a session information storage in the relay apparatus according to the embodiments of the present invention.
Figure 5:
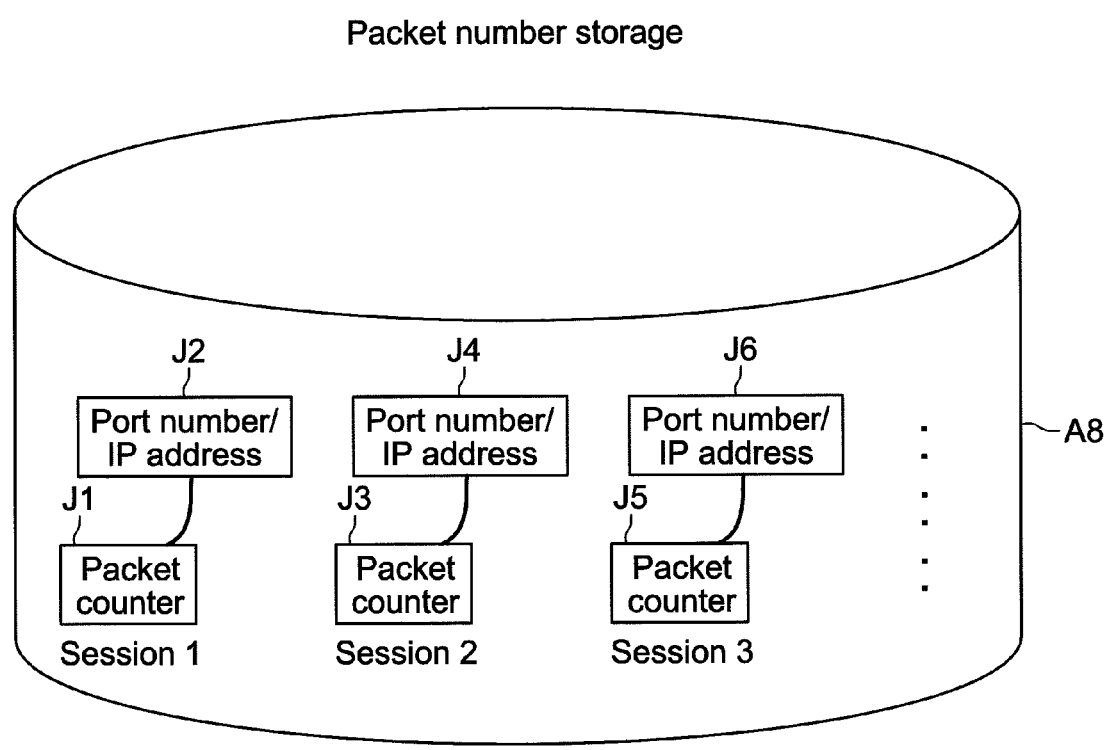
FIG. 5 illustrates a structure of a packet number storage in the relay apparatus according to the embodiments of the present invention.
Figure 8:
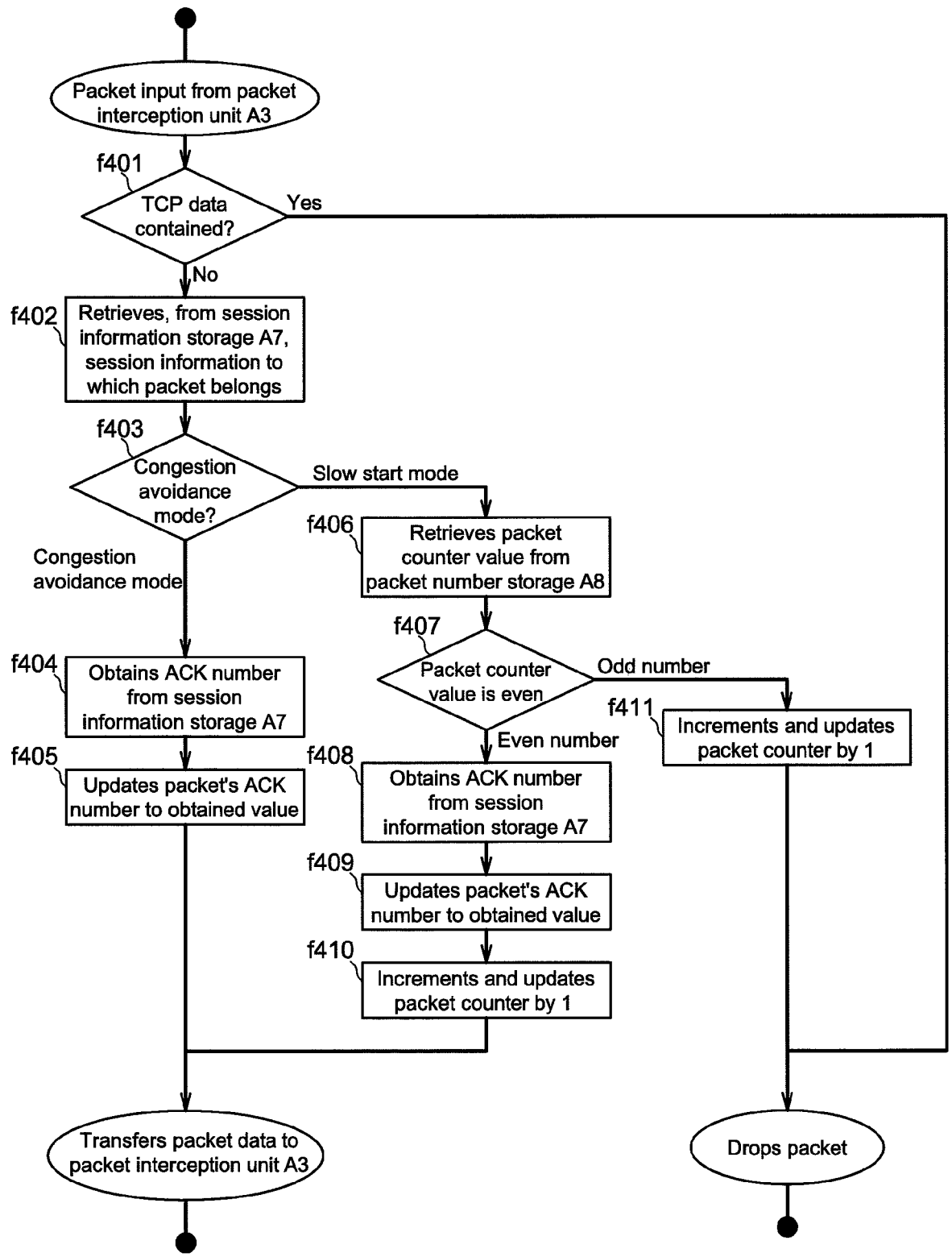
FIG. 8 is a flowchart of an ACK number change unit in the relay apparatus according to the embodiments of the present invention (basic TCP shaper)
Figure 9:
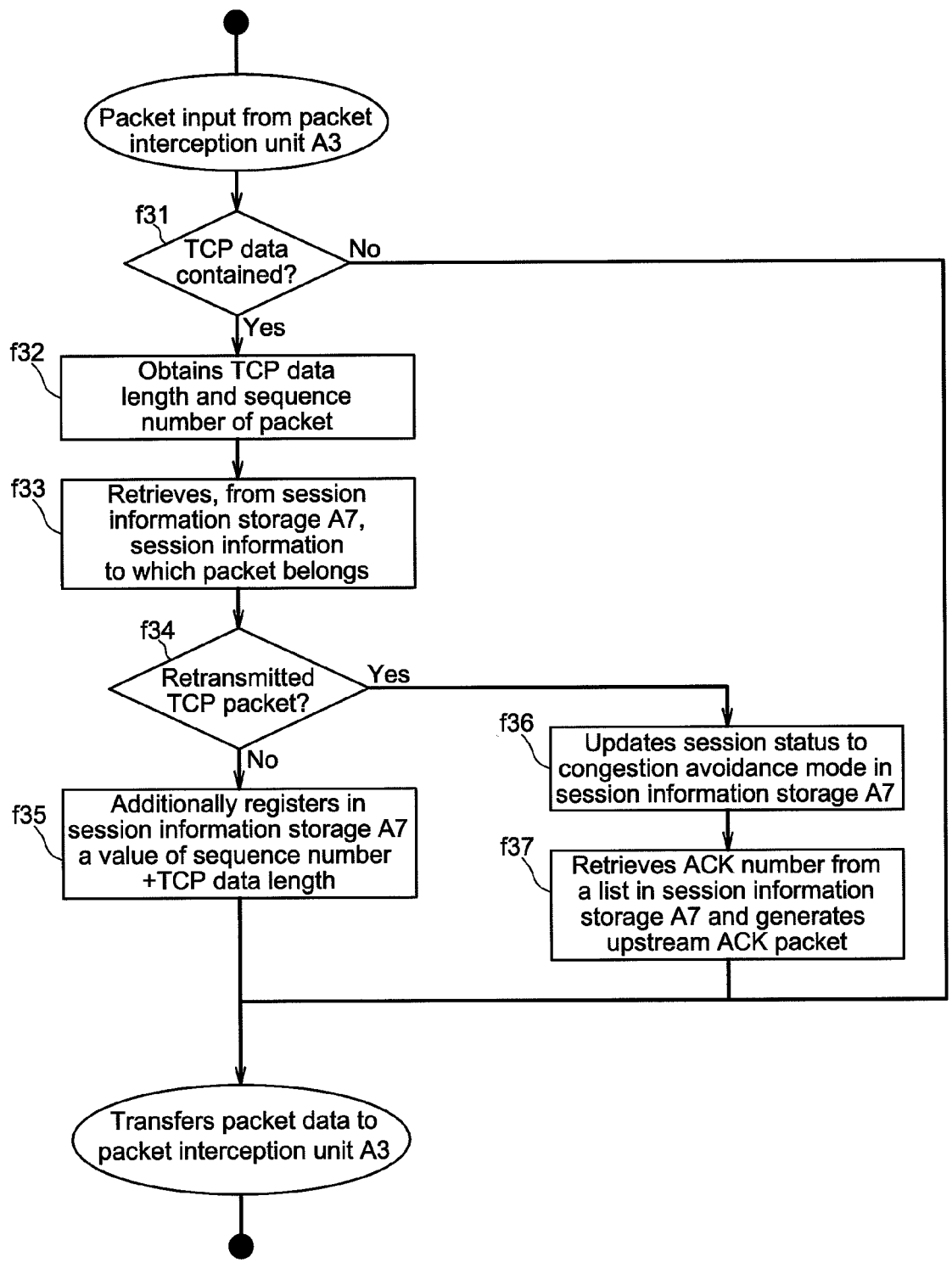
FIG. 9 is a flowchart of a sequence number obtaining unit in the relay apparatus according to the embodiments of the present invention.
Figure 10:
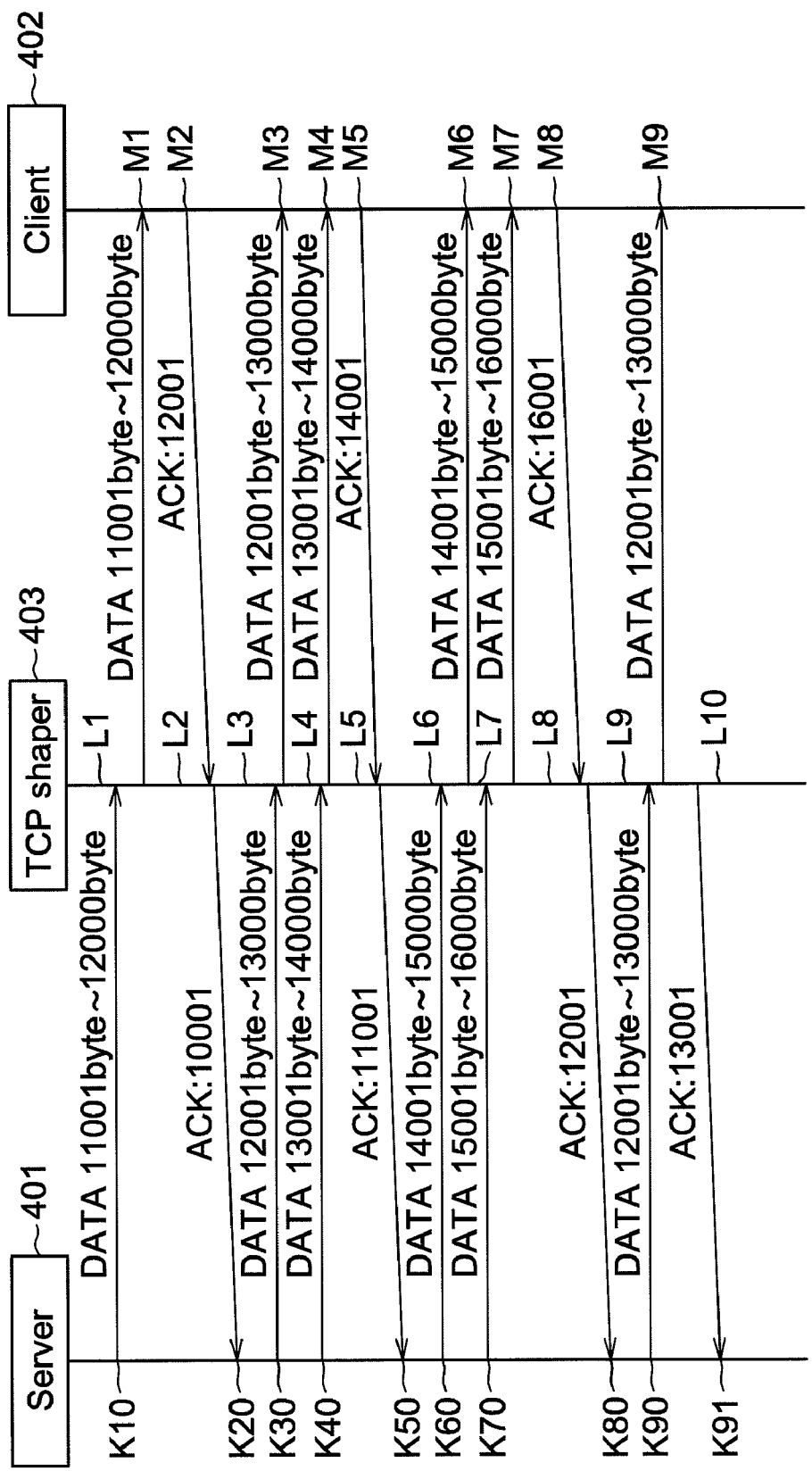
FIG. 10 is a sequence diagram illustrating operations in congestion avoidance mode in the relay apparatus according to the embodiments of the present invention (basic TCP shaper)
Figure 11:
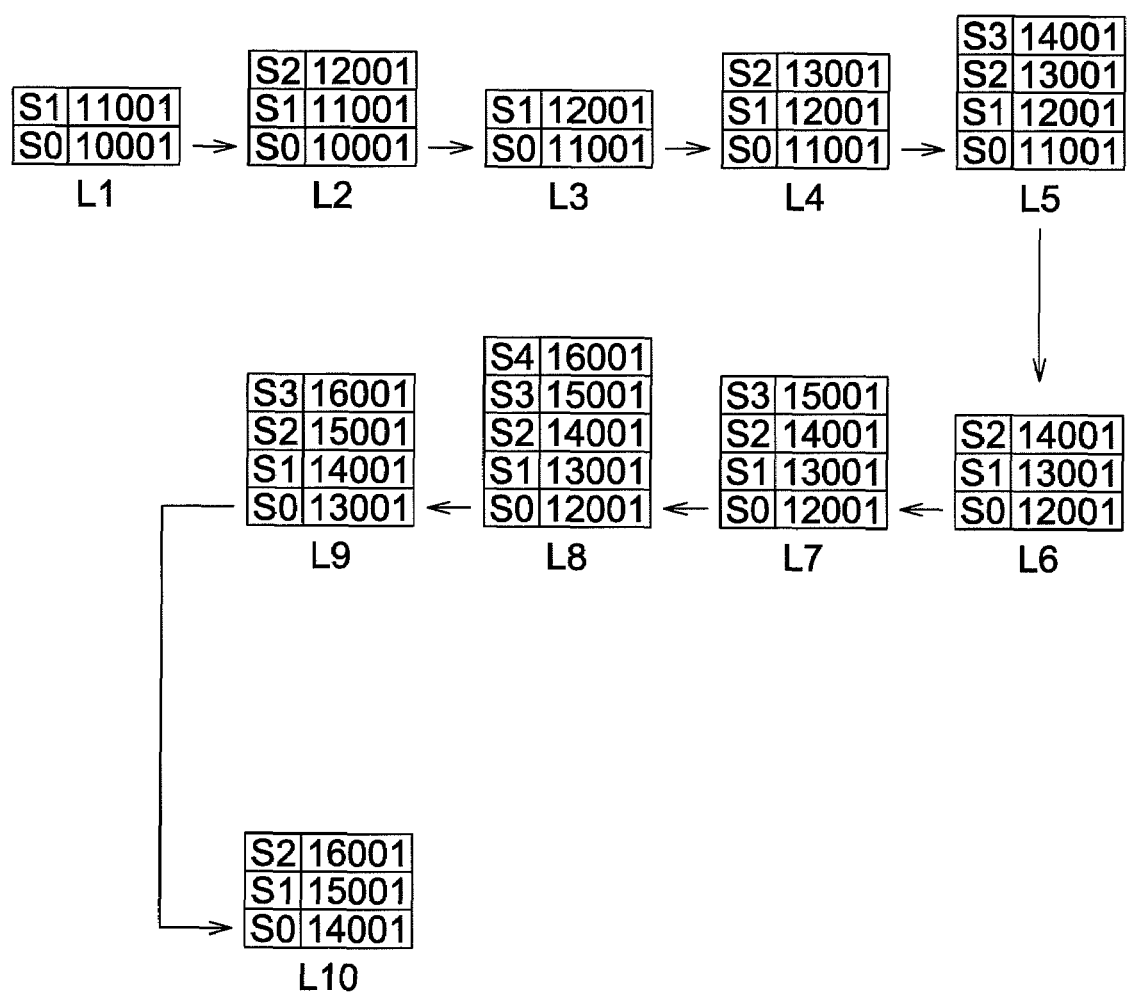
FIG. 11 illustrates transition of an ACK number list in congestion avoidance mode in the session information storage of the relay apparatus according to the embodiments of the present invention (basic TCP shaper)
Figure 12:
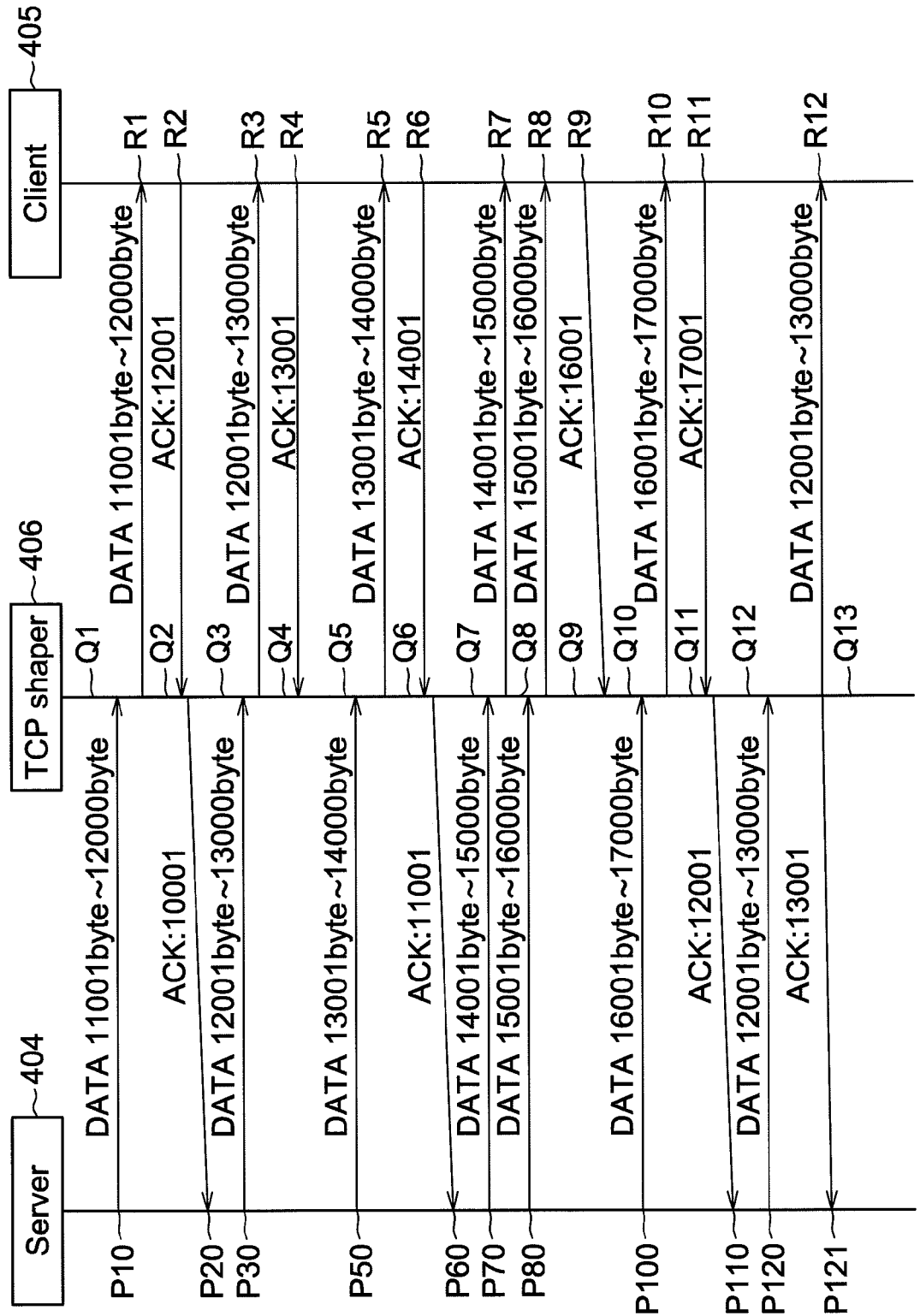
FIG. 12 is a sequence diagram illustrating operations in slow start mode in the relay apparatus according to the embodiments of the present invention (basic TCP shaper)
Figure 13:
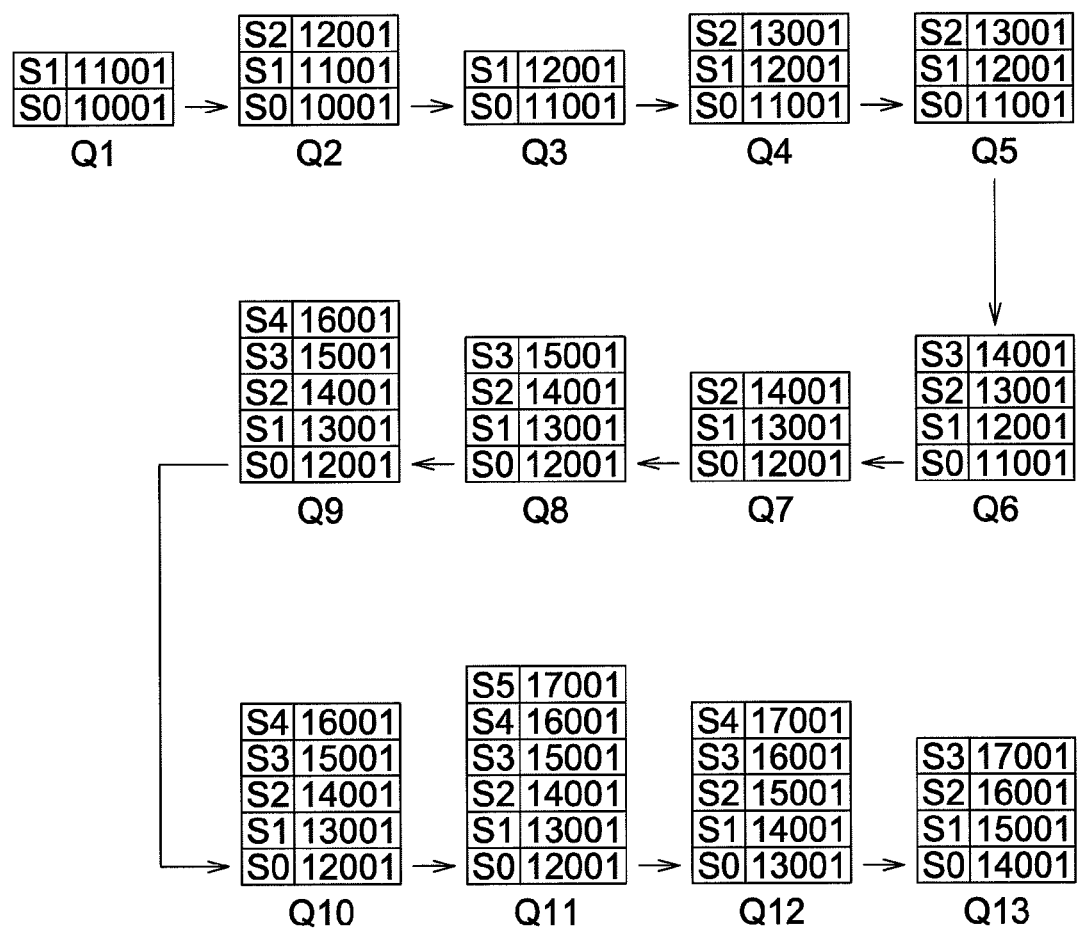
FIG. 13 illustrates transition of an ACK number list in slow start mode in the session information storage of the relay apparatus according to the embodiments of the present invention (basic TCP shaper)

In a first embodiment, descriptions are provided in order of: a basic operation concept of the present invention with reference to FIG. 1; a configuration of a basic TCP shaper with reference to FIGS. 3 to 5; a process flow of each module included in the basic TCP shaper with reference to FIGS. 6 to 9; an operation example of the basic TCP shaper in "congestion avoidance mode" with reference to FIGS. 10 and 11; and an operation example of the basic TCP shaper in "slow start mode" with reference to FIGS. 12 and 13.

FIG. 1 illustrates the basic operation concept of the present invention. In FIG. 1, LAN side client 301 and WAN side server 302 communicate each other using TCP. Relay apparatus 303 installed with the TCP shaper is provided on a communication path between LAN side client 301 and WAN side server 302. An upstream direction herein indicates a direction from relay apparatus 303 installed with the TCP shaper to the WAN side server. A transmission line between relay apparatus 303 installed with the TCP shaper and WAN side server 302 is called an "upper level transmission line," as opposed to a transmission line between LAN side client 301 and relay apparatus 303 installed with the TCP shaper.

When relay apparatus 303 installed with the TCP shaper transfers TCP segment G3, which LAN side client 301 transmits to WAN side server 302, relay apparatus 303 installed with the TCP shaper updates value b in an ACK number field (hereinafter referred to as an "ACK number") to value b-n by subtracting n, and transfers the TCP segment as TCP segment G4. Since relay apparatus 303 installed with the TCP shaper rewrites the ACK number of the upstream TCP segment with the lower value, TCP segment G4 does not serve as an ACK to TCP segment G2, but as an ACK to a TCP segment that was transmitted from WAN side server 302 to LAN side client 301 before TCP segment G2. Relay apparatus 303 installed with the TCP shaper will transmit the ACK to G2 in a sequence later than FIG. 1 (not shown in the drawing).

Then, an RTT value on WAN side server 302 for transmission and reception of the TCP segment becomes large, thus easily causing an RTO value to expire. As a result, a state of congestion is virtually generated in transmission and reception of the TCP segment. Throughput of a downstream TCP segment from WAN side server 302 to LAN side client 301 is thus suppressed and another communication bandwidth is easily secured.

Described below is the configuration of the basic TCP shaper with reference to FIGS. 3 to 5. FIG. 3 is an overall configuration example of the basic TCP shaper. Basic TCP shaper A12 is installed as one extended function of relay apparatus 303 in FIG. 1, for example.

Normally, a relay apparatus only has packet input unit A1, packet transfer unit A2, and packet output unit A9 as shown in FIG. 3. Relay apparatus 303 having the basic TCP shaper also has TCP shaper main unit A12 in addition to the units.

TCP shaper main unit A12 intercepts a TCP packet (a packet having a TCP segment) in packet transfer unit A2 via path B1. After changing an ACK number or obtaining a sequence number of the intercepted TCP packet, TCP shaper main unit A12 returns the TCP packet to packet transfer unit A2 via path B2. TCP shaper main unit A12 does not intercept a packet other than the TCP packet. Thus, the packet other than the TCP packet is provided from packet input unit A1 to packet transfer unit A2 via path B21, and is then directly transferred to the packet output unit via path B22.

As shown in FIG. 3, TCP shaper main unit A12 according to the first embodiment includes the following modules: packet interception unit A3, ACK number change unit A4, sequence number obtaining unit A5, session manager A6, session information storage A7, and packet number storage A8.

Packet interception unit A3 intercepts a TCP packet from packet transfer unit A2 and transfers the TCP packet to another module; and returns a TCP packet processed in another module to packet transfer unit A2. Further, packet interception unit A3 determines whether or not the packet travels in the upstream direction, based on a source IP address (e.g., data contained in source IP address field 502 of FIG. 28) and a destination IP address (e.g., data contained in destination IP address field 503 of FIG. 28) included in the packet.

Of TCP packets intercepted by packet interception unit A3, ACK number change unit A4 changes an ACK number (e.g., 111 in FIG. 19) of an upstream ACK extracted based on a rule (hereinafter described), to a new ACK number obtained from session information storage A7 via session manager A6.

Sequence number obtaining unit A5 extracts a sequence number (e.g., 110 in FIG. 19) and a data length of TCP data (e.g., 104 in FIG. 19), from a downstream TCP packet intercepted by packet interception unit A3. The extracted sequence number and data length of TCP data are added, and then the sum is written in session information storage A7 via session manager A6.

Session manager A6 relays a variety of data between ACK number change unit A4 and session information storage A7; and between sequence number obtaining unit A5 and packet number storage A8.

When a plurality of sessions exist in session information storage A7 or packet number storage A8, session manager A6 further determines to which session in session information storage A7 or in packet number storage A8 the variety of data belong, which are relayed to and from session information storage A7 or packet number storage A8. For example, session manager A6 obtains from ACK number change unit A4 or sequence number obtaining unit A5, information that identifies a session to which a TCP packet belongs, such as, for example, the packet source IP address (e.g., data contained in source IP address field 502 of FIG. 28), the packet destination IP address (e.g., data contained in destination IP address field 503 of FIG. 28), the TCP source port number (e.g., data contained in 114 of FIG. 19), the TCP destination port number (e.g., data contained in 115 of FIG. 19), and the like, along with other information. Based on the obtained information, session manager A6 identifies a memory space in session information storage A7 or in packet number storage A8, for example, and stores the data in the memory space of the associated session.

FIG. 4 is an example of an internal structure of session information storage A7. Session information storage A7 secures a memory space for each session and stores session information. For instance, a memory space assigned to session 1 stores: C2, which contains the packet source IP address (e.g., data contained in source IP address field 502 of FIG. 28), the packet destination IP address (e.g., data contained in destination IP address field 503 of FIG. 28), the TCP source port number (e.g., data contained in 114 of FIG. 19), and the TCP destination port number (e.g., data contained in 115 of FIG. 19); session mode information C3 (hereinafter described in detail); and session list C4 that stores ACK numbers in addresses S0 to Sn-1.

The session list (e.g., C4 of session 1 in FIG. 4), which stores an ACK number for each session controlled inside session information storage A7, has a FIFO structure. In session 1 of FIG. 4, for example, when registering a new ACK number on session list C4, session manager A6 always stores the number in top address Sn-1. When retrieving an ACK number from session list C4, session manager A6 always retrieves the ACK number stored in bottom address S0. After the ACK number in address S0 is retrieved, ACK number data stored in addresses S1 to Sn-1 above address S0 move down to addresses one below the addresses. In other words, on session list C4 at a certain point, the ACK number registered in address S0 is retrieved first, since the ACK number is registered at the oldest time at that point; and the ACK number registered in address Sn-1 is retrieved last, since the ACK number is registered at the newest time among ACK numbers on session list C4 at that point. As described above, session information storage A7 always retrieves the ACK number having the oldest registration time on the associated session list.

The session list is stored per session. Normally, only a limited number of sessions can be stored. When session manager A6 tries to create a new session list in session information storage A7 and finds no memory space available for the session list in session information storage A7, session manager A6 then, for example, deletes from session information storage A7 a session list that has not been updated for the longest period of time so as to create the new session list.

The session mode information (e.g., C3 of session 1 in FIG. 4) stores mode of an associated session: slow start mode or congestion avoidance mode. In the first embodiment, slow start mode is indicated as 1, and congestion avoidance mode as 0. In either mode, the ACK number (e.g., 111 in FIG. 19) of the upstream ACK extracted based on the predetermined rule (hereinafter described) is transferred to WAN side server 302 after the ACK number is rewritten. An upstream ACK other than the above-described ACK, however, is not transferred to WAN side server 302.

In the first embodiment, the upstream ACK is extracted based on the predetermined rule as described below. In slow start mode, every other upstream TCP packet is surely extracted, and the ACK number of the extracted packet is rewritten. In congestion avoidance mode, the ACK number of the upstream TCP packet is always rewritten. In the present invention, the rule to extract the upstream ACK is not limited as described above and may be defined as desired. A frequency of extraction in slow start mode, however, needs to be equal to or less than that in congestion avoidance mode.

Packet number storage A8 stores the number of TCP packets transmitted in the upstream direction per session. FIG. 5 is an example of an internal structure of packet number storage A8. Each of packet counters J1, J3, and J5 stores the number of TCP packets transferred in the upstream direction in each session. Packet counters J1, J3, and J5 are used to drop one ACK out of every two upstream ACKs in slow start mode.

Similar to session information storage A7, the packet counter is provided per session. Normally, only a limited number of sessions can be stored. When session manager A6 tries to create a packet counter for a new session in packet number storage A8 and finds no memory space available for the packet counter in packet number storage A8, session manager A6 then, for example, deletes from packet number storage A8 a packet counter that has not been updated for the longest period of time so as to create the packet counter for the new session.

Executing processes below using the above-described modules suppresses the throughput of a TCP segment in each session.

Provided below is a process flow in each of the modules included in the basic TCP shaper with reference to FIGS. 6 to 9. As described above, only the TCP packet is handled in the modules, except packet transfer unit A2.

Figure 6:
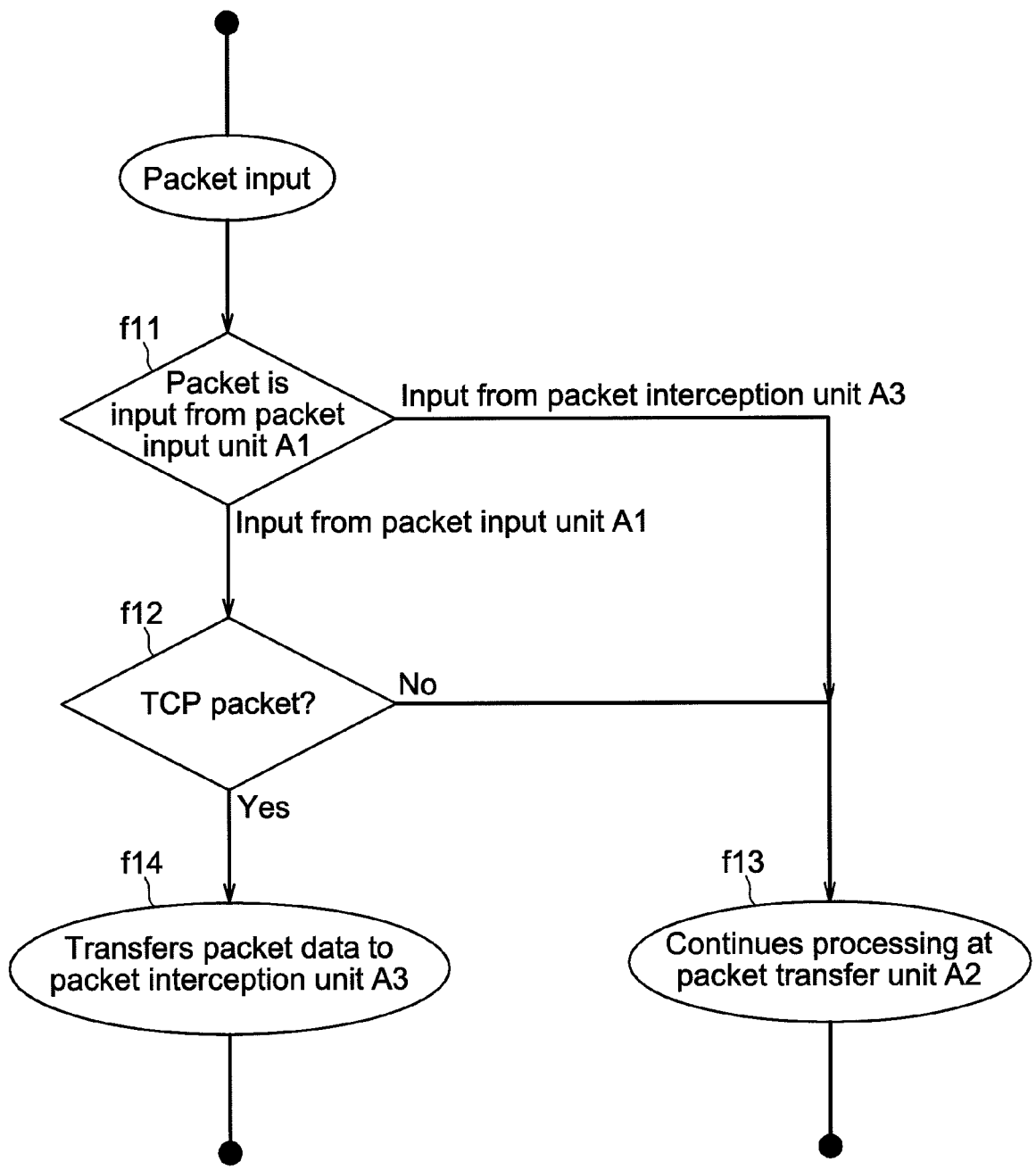
FIG. 6 is a flowchart of a packet transfer unit in the relay apparatus according to the embodiments of the present invention.

FIG. 6 is an example of a process flow in packet transfer unit A2. A packet is input from packet input unit A1 and from packet interception unit A3.

Packet transfer unit A2 first checks in step f11 from which module the input packet is provided. When the input packet is from packet input unit A1, packet transfer unit A2 executes a process of step f12. When the input packet is from packet interception unit A3, it is indicated that the packet is completed with a TCP shaper process. Thus, packet transfer unit A2 transfers the packet to packet output unit A9.

In step f12, packet transfer unit A2 determines whether or not the input packet is a TCP packet. When a number in protocol number field 501 of IP header 113 in FIG. 28 in the related art is 6, for example, the packet is determined as the TCP packet. In this case, packet transfer unit A2 transfers the packet data to packet interception unit A3, so as to start the TCP shaper process. When the input packet is not the TCP packet, packet transfer unit A2 transfers the packet to packet output unit A9, similar to a normal transfer process.

Figure 7:
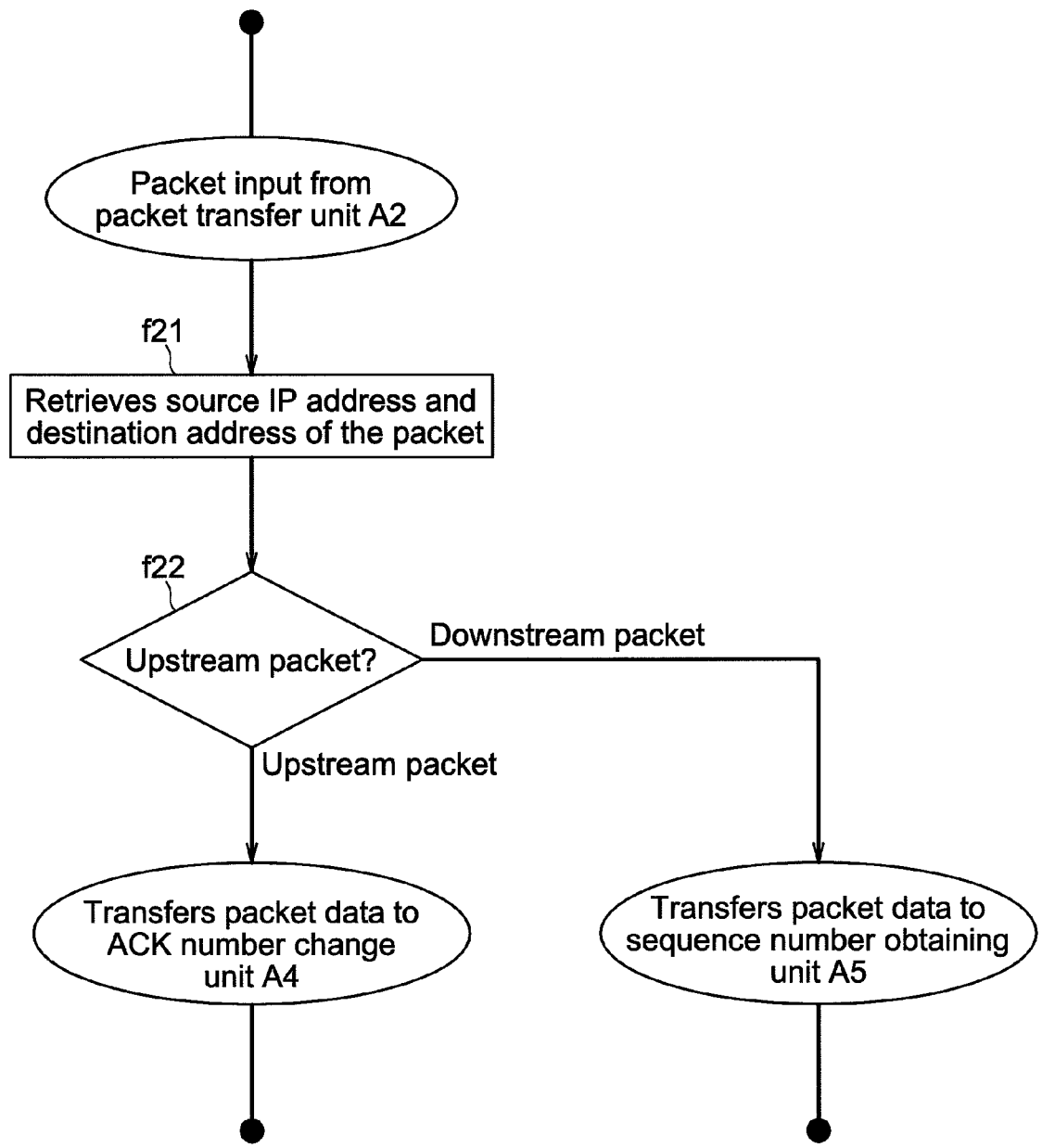
FIG. 7 is a flowchart of a packet interception unit in the relay apparatus according to the embodiments of the present invention.

FIG. 7 is an example of a process flow in packet interception unit A3 for the input packet from packet transfer unit A2.

Figure 28:
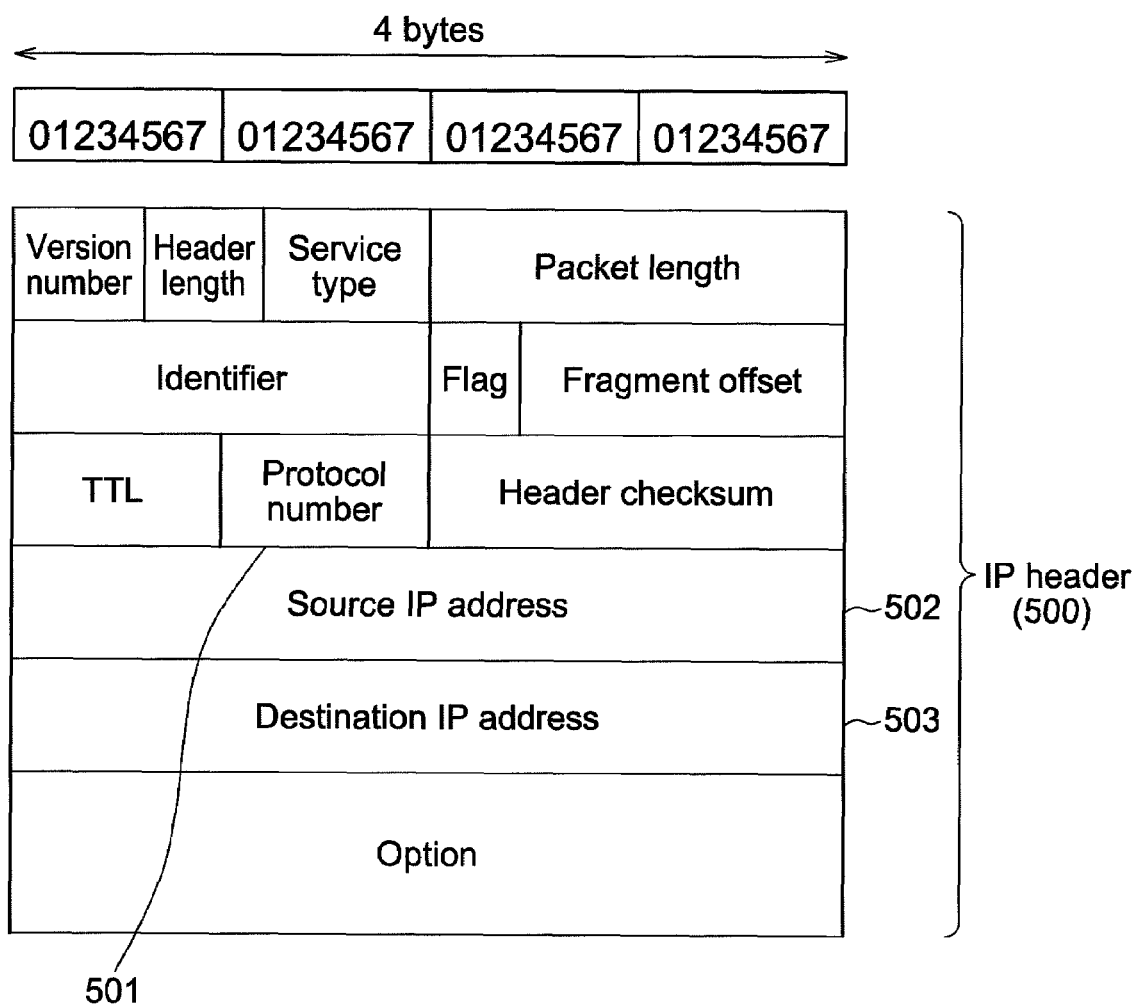
FIG. 28 illustrates an IP header format structure.

In step f21, packet interception unit A3 retrieves from the input packet data the source IP address (e.g., data contained in source IP address field 502 of FIG. 28) and the destination IP address (e.g., data contained in destination IP address field 503 of FIG. 28). Then, in step f22, packet interception unit A3 determines whether the TCP packet travels in the upstream or downstream direction, based on the source IP address (e.g., data contained in source IP address field 502 of FIG. 28) and destination IP address retrieved in step f21.

When the input packet travels upstream, packet interception unit A3 transfers the packet data to ACK number change unit A4 via path B3 in FIG. 3. When the input packet travels downstream, packet interception unit A3 transfers the packet data to sequence number obtaining unit A5 via path B5.

Packet interception unit A3 does not process packet data input from ACK number change unit A4 or sequence number obtaining unit A5, and transfers the packet data to packet transfer unit A2.

FIG. 8 is an example of a process flow in ACK number change unit A4 for the upstream TCP packet.

Only the upstream TCP packet transferred from packet interception unit A3 (path B3 in FIG. 3) is input to ACK number change unit A4. Further, ACK number change unit A4 exchanges with session manager A6 only information related to a session to which the TCP packet belongs, but not the packet itself.

ACK number change unit A4 determines in step f401 whether or not actual data are contained in a TCP data section of the upstream TCP packet input from packet interception unit A3. (TCP packet 102 in FIG. 19 of the related art may not contain actual data in TCP data 104. A state where no data contained in TCP data 104 is hereinafter referred to as "no TCP data contained." On the other hand, a state where actual data are contained in TCP data 104 is referred to as "TCP data contained.") When the upstream TCP packet contains no TCP data, the TCP packet is an ACK, and then ACK number change unit A4 executes a process of step f402.

When the upstream TCP packet contains TCP data, ACK number change unit A4 in the first embodiment drops the upstream TCP packet. In other words, ACK number change unit A4 does not transmit to WAN side server 302 the upstream TCP packet containing TCP data from LAN side client 301 in FIG. 1. The packet is dropped because transmitting to WAN side server 302 no ACK to the packet containing TCP data further increases the RTT of TCP, and thus easily generates a state of congestion. When it is obvious or expected that not so many upstream TCP packets contain TCP data, ACK number change unit A4 may return the packets to packet transfer unit A2, instead of dropping the packets, so that the packets are output from relay apparatus A11 via packet output unit A9. In the first embodiment, however, the explanation is provided where ACK number change unit A4 drops the upstream TCP packets containing TCP data.

In step f402, ACK number change unit A4 obtains mode information (e.g., C3 of session 1 in FIG. 4) of a session to which the packet currently being processed belongs, from session information storage A7 via session manager A6. In step f403, ACK number change unit A4 determines whether the current session runs in slow start mode or in congestion avoidance mode, based on the mode information obtained in step f402.

When the session runs in congestion avoidance mode, ACK number change unit A4 obtains the oldest ACK number (e.g., data stored in address S0 of session 1 in FIG. 4) at the moment from a session list (e.g., C4 of session 1 in FIG. 4) to which the packet currently being processed belongs in session information storage A7 via session manager A6 in step f404. Then, in step f405, ACK number change unit A4 rewrites an ACK number of the TCP packet temporarily stored in packet interception unit A3 with the ACK number obtained in the preceding step (e.g., S0 of session 1 in FIG. 4). ACK number change unit A4 then transfers the TCP packet whose ACK number has been rewritten to packet interception unit A3. When the session list is empty, ACK number change unit A4 does not rewrite the ACK number of the TCP packet temporarily stored therein, and transfers the TCP packet to packet interception unit A3.

When the session runs in slow start mode, ACK number change unit A4 retrieves a value in a packet counter (e.g., J1 of session 1 in FIG. 5) of the session to which the packet currently being processed belongs, from packet number storage A8 via session manager A6 in step f406. Then, in step f407, ACK number change unit A4 determines whether or not the value in the packet counter is an even number. When the value in the packet counter is even, ACK number change unit A4 executes a process of step f408; when the value in the packet counter is odd, ACK number change unit A4 executes a process of step f411. (Branchings from step f407 may be reverse of those in the first embodiment. That is, the process of step f408 may be executed when the value is odd.) In step f411, ACK number change unit A4 increments the value in the associated packet counter (e.g., J1 of session in FIG. 5) by one in packet number storage A8, and then drops the packet. The process enables slow start mode of the first embodiment, wherein "upstream TCP packets are always extracted alternately and ACK numbers of the extracted packets are rewritten."

In step f408, ACK number change unit A4 obtains the oldest ACK number (e.g., data stored in address S0 of session 1 in FIG. 4) at the moment from the session list (e.g., C4 of session 1 in FIG. 4) to which the TCP packet temporarily stored in ACK number change unit A4 belongs in session information storage A7 via session manager A6. Then, in step f409, ACK number change unit A4 updates the ACK number of the packet. (When the associated session list, such as, for example, C4 of session 1 in FIG. 4, is empty, ACK number change unit A4 does not update the ACK number.) In step f410 that follows, ACK number change unit A4 increments the value in the packet counter (e.g., J1 of session 1 in FIG. 5) by one in the associated session in packet number storage A8, and then transfers the processed TCP packet to packet interception unit A3 via path B4.

FIG. 9 is an example of a process flow in sequence number obtaining unit A5. Only the downstream TCP packet transferred from packet interception unit A3 (path B5 in FIG. 3) is input to sequence number obtaining unit A5. Further, sequence number obtaining unit A5 exchanges with session manager A6 only information related to a session to which the TCP packet belongs, but not the packet itself.

In step f31, sequence number obtaining unit A5 determines whether or not actual data are contained in a TCP data section of the input downstream TCP packet. In other words, sequence number obtaining unit A5 determines whether or not the downstream TCP packet contains TCP data. When the downstream TCP packet contains no TCP data, sequence number obtaining unit A5 does not process the downstream TCP packet and transfers the packet data to packet interception unit A3. When the downstream TCP packet contains TCP data, sequence number obtaining unit A5 executes a process of step f32.

In step f32, sequence number obtaining unit A5 obtains a data length and a sequence number of the TCP data (e.g., TCP data 104 in TCP packet 102 of FIG. 19 in the related art) from the downstream TCP packet currently being processed. In step f33, sequence number obtaining unit A5 obtains session list C4 to which the packet belongs, from session information storage A7 via session manager A6.

In step f34, sequence number obtaining unit A5 obtains the newest ACK number (e.g., data stored in address Sn-1 of session 1 in FIG. 4) from a session list associated with the downstream TCP packet currently being processed, in session information storage A7 via session manager A6. Then, sequence number obtaining unit A5 calculates a sum of the TCP data length and sequence number, which are obtained in earlier step f32. Sequence number obtaining unit A5 then compares the calculated value with the newest ACK number obtained in the preceding step (e.g., data stored in address Sn-1 of session 1 in FIG. 4).

When the newest ACK number (e.g., data stored in address Sn-1 of session 1 in FIG. 4) is greater than the sum of the TCP data length and sequence number, sequence number obtaining unit A5 determines that the downstream TCP packet currently being processed is not a retransmitted packet. In step f35 that follows, sequence number obtaining unit A5 additionally registers on the associated session list stored in session information storage A7, the sum of the TCP data length and sequence number obtained in earlier step f32 of the downstream TCP packet currently being processed.

When the newest ACK number (e.g., Sn-1 of session 1 in FIG. 4) is less than the sum of the TCP data length and sequence number, sequence number obtaining unit A5 determines that the downstream TCP packet currently being processed is the retransmitted packet. Since the state in which the packet is retransmitted indicates that congestion has occurred (packet loss or RTO expiration), sequence number obtaining unit A5 sets mode information (e.g., C3 of session 1 in FIG. 4) of the associated session stored in session information storage 7 to congestion avoidance mode in step f36.

In step f37 that follows, sequence number obtaining unit A5 retrieves the oldest ACK number (e.g., data stored in address S0 of session 1 in FIG. 4) at the moment from session information storage A7; newly creates an upstream TCP packet having the ACK number and containing no data, based on the source IP address (e.g., data contained in source IP address field 502 of FIG. 28), the destination IP address (e.g., data contained in destination IP address field 503 of FIG. 28), the source port number (e.g., data contained in 114 of FIG. 19), and the destination port number (e.g., data contained in 115 of FIG. 19) stored in C2 of session information storage A7; and transfers the upstream TCP packet and the processed downstream TCP packet to packet interception unit A3 at B6. When no session list associated with the downstream TCP packet currently being processed exists in session information storage A7, that is, in case of a new session, sequence number obtaining unit A5 creates a new session list in session information storage A7 via session manager A6.

Described below is an operation example of the basic TCP shaper having the above-described configuration and process flows. The operation example of the basic TCP shaper in congestion avoidance mode is first described with reference to FIGS. 10 and 11. FIG. 10 is an example of TCP communication in congestion avoidance mode among server 401, client 402, and relay apparatus installed with the TCP shaper (hereinafter referred to as "TCP shaper relay apparatus") 403. TCP shaper relay apparatus 403 is provided on a communication path between server 401 and client 402. An internal configuration of TCP shaper relay apparatus 403 is the same as shown in FIGS. 3 to 5. Further, TCP shaper relay apparatus 403 handles a packet transmitted on the communication path between server 401 and client 402 according to the process flows shown in FIGS. 6 to 9. Server 401 transmits to client 402, packets (K10, K30, K40, K60, K70, and K90) each of which contains TCP data of 1000 bytes in TCP per transmission. Client 402 transmits to server 401, packets containing no TCP data (M2, M5, and M8), which are ACKs in response to the packets containing TCP data (K10, K30, K40, K60, and K70).

FIG. 11 is a transition example of a session list in session information storage A7 during the communication in FIG. 10. The session list changes in session 1 of session information storage A7 in FIG. 4. More specifically, session list C4 in session information storage A7 of TCP shaper relay apparatus 403 starts in state L1 of FIG. 11, wherein values 11001 and 10001 are already stored in addresses S0 and S1 respectively of session list C4 in state L1. Value 10001 is registered at an older time than value 11001. Congestion has yet to occur at this point. Since the communication in FIGS. 10 and 11 is performed in congestion avoidance mode, mode information C3 of session 1 in state L1 stores value 0, which indicates congestion avoidance mode.

First, server 401 transmits packet K10 to client 402. Then, TCP shaper relay apparatus 403, which is provided on the communication path between server 401 and client 402, receives packet K10. Since packet K10 travels downstream, sequence number obtaining unit A5 obtains and stores a sequence number required to rewrite an ACK number of an upstream packet in the flow from f401 (hereinafter described) according to the flow from f31 shown in FIG. 9.

Since it is determined in f31 that packet K10 contains TCP data, sequence number obtaining unit A5 of TCP shaper relay apparatus 403 obtains the sequence number and TCP data length of packet K10 (f32 in FIG. 9), and identifies a session list of packet K10 stored in session information storage A7, based on IP address information (e.g., 502 and 503 in FIG. 28) and port number information (e.g., 114 and 115 in FIG. 19) of packet K10 (f33 in FIG. 9). In the first embodiment, the IP address information and port number information of packet K10 are identical to IP address information and port number information C2 of session 1 in session information storage A7 shown in FIG. 4, and thus the session list of packet K10 is identified as session list C4 of session 1.

Then, sequence number obtaining unit A5 determines whether or not packet K10 is a retransmitted TCP packet in a method provided below, for example (f34 in FIG. 9).

In FIG. 10, packet K10 has a sequence number of 11001 and a TCP data length of 1000 bytes. Sequence number obtaining unit A5 of TCP shaper relay apparatus 403 adds the sequence number and TCP data length of packet K10 obtained in process flow f32 of FIG. 9, that is, 11001+1000=12001.

Then, sequence number obtaining unit A5 of TCP shaper relay apparatus 403 compares value 12001, which is the sum of the sequence number and TCP data length, with value 11001, which is the ACK number having the newest registration time at the moment stored in S1 of session list C4 in state L1 in session information storage A7. Since sum 12001 of the sequence number and TCP data length is greater, sequence number obtaining unit A5 determines that packet K10 is not the retransmitted TCP packet, and additionally registers the sum of the sequence number and TCP data length on session list C4 in session information storage A7 (f35 in FIG. 9). In this case, sequence number obtaining unit A5 stores sum 12001 of the sequence number and TCP data length in S2 of session list C4 in session information storage A7.

Then, sequence number obtaining unit A5 transfers packet K10 as packet M1 to packet interception unit A3 (f38 in FIG. 9). Packet M1 is transferred to packet transfer unit A2 and to packet output unit A9 in sequence. TCP shaper relay apparatus 403 then transfers packet M1 to client 402. At this point, session list C4 changes from state L1 to state L2 as shown in FIG. 11.

Receiving packet M1, client 402 transmits to server 401, packet M2, which has ACK number 12001 and no TCP data, as an ACK to packet M1. TCP shaper relay apparatus 403 provided on the communication path between server 401 and client 402, receives packet M2 during the transmission. Since packet M2 travels upstream, ACK number change unit A4 rewrites the ACK number received from client 402 with a value less than the ACK number, according to the flow from f401 shown in FIG. 8, and transfers packet M2 to server 401. Thereby, ACK number change unit A4 limits the data transmission bandwidth from server 401 to client 402.

In f401, since packet M2 contains no TCP data, ACK number change unit A4 of TCP shaper relay apparatus 403 identifies a session list of packet M2 stored in session information storage A7, based on IP address information (e.g., 502 and 503 in FIG. 28) and port number information (e.g., 114 and 115 in FIG. 19) contained in packet M2 (f402 in FIG. 8). In the first embodiment, the IP address information and port number information of packet M2 are identical to IP address information and port number information C2 of session 1 in session information storage A7 shown in FIG. 4, and thus the session list of packet M2 is identified as session list C4 of session 1.

Then, ACK number change unit A4 determines whether a session of packet M2 runs in congestion avoidance mode or in slow start mode, based on the value stored in mode information C3 of session 1 in ACK number storage A7 (f403 in FIG. 8). Since value 0 (indicating congestion avoidance mode) is stored in mode information C3 of session 1, ACK number change unit A4 processes packet M2 in congestion avoidance mode according to the flow from f404 in FIG. 8.

In f404, ACK number change unit A4 of TCP shaper relay apparatus 403 obtains an ACK number having the oldest registration time stored on session list C4 in session information storage A7, that is, in this case, value 10001 stored in S0 in state L2 (f404 in FIG. 8). (As a result, value 10001 stored in S0 of session list C4 is deleted; a value stored in S1 moves to S0; and a value stored in S2 moves to S1.) ACK number change unit A4 then rewrites the ACK number of packet M2 with value 10001 (f405 in FIG. 8). Packet K20, which is packet M2 whose ACK number has been rewritten, is transferred to packet interception unit A3 (f412 in FIG. 8), and then to packet transfer unit A2 and to packet output unit A9 in sequence. TCP shaper relay apparatus 403 then transfers packet K20 to server 401 (f412 in FIG. 8). At this point, session list C4 changes from state L2 to state L3 as shown in FIG. 11.

Server 401 has yet to receive an ACK to packet K10 already transmitted to client 402 at this point. However, server 401 of the first embodiment determines that a state of congestion has not yet occurred since server 401 has received packet K20, and thus continues to transmit to client 402, two packets K30 and K40 that contain next data consecutively. TCP shaper relay apparatus 403 provided on the communication path between server 401 and client 402, receives packets K30 and K40 during the transmission. Since packets K30 and K40 travel downstream, sequence number obtaining unit A5 obtains and stores a sequence number required to rewrite an ACK number of an upstream packet in the flow from f401, according to the flow from f31 in FIG. 9, similar to the above-described case of packet K10.

More specifically, similar to the above-described case of packet K10, packet K30 is determined as a packet containing TCP data (f31 in FIG. 9), and a session list thereof is identified as session list C4 of session 1 (f32 and f33 in FIG. 9). Then, sequence number obtaining unit A5 determines whether or not packet K30 is a retransmitted TCP packet as described below, similar to the above-described case of packet K10 (f34 in FIG. 9).

In FIG. 10, packet K30 has a sequence number of 12001 and a TCP data length of 1000 bytes. Sequence number obtaining unit A5 of TCP shaper relay apparatus 403 adds the sequence number and TCP data length of packet K30 obtained in process flow f32 of FIG. 9, that is, 12001+1000=13001. Then, sequence number obtaining unit A5 of TCP shaper relay apparatus 403 compares value 13001, which is the sum of the sequence number and TCP data length, with value 12001, which is the ACK number having the newest registration time at the moment stored in S1 of session list C4 in state L3 in session information storage A7. Since sum 13001 of the sequence number and TCP data length is greater, sequence number obtaining unit A5 determines that packet K30 is not the retransmitted TCP packet, and additionally registers the sum of the sequence number and TCP data length (f35 in FIG. 9). In this case, sequence number obtaining unit A5 stores sum 13001 of the sequence number and TCP data length in S2 of session list C4 in session information storage A7. Then, sequence number obtaining unit A5 transfers packet K30 as packet M3 to packet interception unit A3 (f38 in FIG. 9). Packet M3 is transferred to packet transfer unit A2 and to packet output unit A9 in sequence. TCP shaper relay apparatus 403 then transfers packet M3 to client 402. At this point, session list C4 changes from state L3 to state L4 as shown in FIG. 11.

The process similar to the above-described case of packet K30 is executed for packet K40. More specifically, packet K40 is determined as a packet containing TCP data, and a session list thereof is identified as session list C4 of session 1 (f31 to f33 in FIG. 9). Sequence number obtaining unit A5 of TCP shaper relay apparatus 403 compares value 14001, which is a sum of sequence number 13001 and TCP data length 1000 of packet K40, with value 13001, which is the ACK number having the newest registration time at the moment stored in S2 of session list C4 in state L4 in session information storage A7 (f34 in FIG. 9). Since sum 14001 of the sequence number and TCP data length is greater, sequence number obtaining unit A5 determines that packet K40 is not a retransmitted TCP packet, and additionally registers the sum of the sequence number and TCP data length (f35 in FIG. 9). In this case, sequence number obtaining unit A5 stores sum 14001 of the sequence number and TCP data length in S3 of session list C4 in session information storage A7. Then, sequence number obtaining unit A5 transfers packet K40 as packet M4 to packet interception unit A3 (f38 in FIG. 9). Packet M4 is transferred to packet transfer unit A2 and to packet output unit A9 in sequence. TCP shaper relay apparatus 403 then transfers packet M4 to client 402. At this point, session list C4 changes from state L4 to state L5 as shown in FIG. 11.

Receiving packets M3 and M4 in a short interval as described above, client 402 transmits to server 401, one ACK as packet M5 in response to packets M3 and M4. Packet M5 has ACK number 14001 and no TCP data. Then, TCP shaper relay apparatus 403 provided on the communication path between server 401 and client 402, receives packet M5 during the transmission. Since packet M5 travels upstream, ACK number change unit A4 again rewrites the ACK number received from client 402 with a value less than the ACK number, according to the flow from f401 shown in FIG. 8, and transfers packet M5 to server 401, similar to the above-described case of ACK packet M2. Thereby, ACK number change unit A4 limits the data transmission bandwidth from server 401 to client 402. More specifically, similar to the above-described case of packet M2, packet M5 is determined as a packet containing no TCP data (f401 in FIG. 8), and a session list thereof is identified as session list C4 of session 1 (f402 in FIG. 8).

Then, ACK number change unit A4 determines whether a session of packet M5 runs in congestion avoidance mode or in slow start mode, based on the value stored in mode information C3 of session 1 in ACK number storage A7 (f403 in FIG. 8). Since value 0 (indicating congestion avoidance mode) is stored in mode information C3 of session 1, ACK number change unit A4 processes packet M5 in congestion avoidance mode according to the flow from f404 in FIG. 8.

In f404, ACK number change unit A4 of TCP shaper relay apparatus 403 obtains an ACK number having the oldest registration time stored on session list C4 in session information storage A7, that is, in this case, value 11001 stored in S0 in state L5 (f404 in FIG. 8) (As a result, value 11001 stored in S0 of session list C4 is deleted; a value stored in S1 moves to S0; a value stored in S2 moves to S1; and a value stored in S3 moves to S2.) ACK number change unit A4 then rewrites the ACK number of packet M5 with value 11001 (f405 in FIG. 8). Packet K50, which is packet M5 whose ACK number has been rewritten, is transferred to packet interception unit A3 (f412 in FIG. 8), and then to packet transfer unit A2 and to packet output unit A9 in sequence. TCP shaper relay apparatus 403 then transfers packet K50 to server 401. At this point, session list C4 changes from state L5 to state L6 as shown in FIG. 11.

Server 401 has yet to receive an ACK to packets K10, K30, and K40 already transmitted to client 402 even at this point. Still, server 401 of the first embodiment determines that a state of congestion has not yet occurred since server 401 has received packet K50, and thus continues to transmit to client 402, two packets K60 and K70 that contain next data consecutively. TCP shaper relay apparatus 403 provided on the communication path between server 401 and client 402, receives packets K60 and K70 during the transmission. Since packets K60 and K70 travel downstream, sequence number obtaining unit A5 obtains and stores a sequence number required to rewrite an ACK number of an upstream packet in the flow from f401, according to the flow from f31 in FIG. 9, similar to the above-described case of packet K10 and the like.

More specifically, similar to the above-described case of packet K1 and the like, packet K60 is first determined as a packet containing TCP data (f31 in FIG. 9), and a session list thereof is identified as session list C4 of session 1 (f32 and f33 in FIG. 9). Then, sequence number obtaining unit A5 of TCP shaper relay apparatus 403 compares value 15001, which is a sum of sequence number 14001 and TCP data length 1000 of packet K60, with value 14001, which is the ACK number having the newest registration time at the moment stored in S2 of session list C4 in state L6 in session information storage A7. Since sum 15001 of the sequence number and TCP data length is greater, sequence number obtaining unit A5 determines that packet K60 is not a retransmitted TCP packet, and additionally registers the sum of the sequence number and TCP data length (f35 in FIG. 9). In this case, sequence number obtaining unit A5 stores sum 15001 of the sequence number and TCP data length in S3 of session list C4 in session information storage A7. Then, sequence number obtaining unit A5 transfers packet K60 as packet M6 to packet interception unit A3 packet (f38 in FIG. 9). Packet M6 is transferred to packet transfer unit A2 and to packet output unit A9 in sequence. TCP shaper relay apparatus 403 then transfers packet M7 to client 402. At this point, session list C4 changes from state L6 to state L7 as shown in FIG. 11.

The process similar to the above-described case of packet K60 is executed for packet K70. More specifically, packet K70 is determined as a packet containing TCP data, and a session list thereof is identified as session list C4 of session 1 (f31 to f33 in FIG. 9). Sequence number obtaining unit A5 of TCP shaper relay apparatus 403 compares value 16001, which is a sum of sequence number 15001 and TCP data length 1000 of packet K70, with value 15001, which is the ACK number having the newest registration time at the moment stored in S3 of session list C4 in state L7 in session information storage A7 (f34 in FIG. 9). Since sum 16001 of the sequence number and TCP data length is greater, sequence number obtaining unit A5 determines that packet K70 is not a retransmitted TCP packet, and additionally registers the sum of the sequence number and TCP data length (f35 in FIG. 9). In this case, sequence number obtaining unit A5 stores sum 16001 of the sequence number and TCP data length in S4 of session list C4 in session information storage A7. Then, sequence number obtaining unit A5 transfers packet K70 as packet M7 to packet interception unit A3 (f38 in FIG. 9). Packet M7 is transferred to packet transfer unit A2 and to packet output unit A9 in sequence. TCP shaper relay apparatus 403 then transfers packet M7 to client 402. At this point, session list C4 changes from state L7 to state L8 as shown in FIG. 11.

Receiving packets M6 and M7 in a short interval similar to the above-described case of packets M3 and M4, client 402 transmits to server 401, one ACK as packet M8 in response to packets M6 and M7. Packet M8 has ACK number 16001 and no TCP data. Then, TCP shaper relay apparatus 403 provided on the communication path between server 401 and client 402, receives packet M8 during the transmission. Since packet M8 travels upstream, ACK number change unit A4 rewrites the ACK number received from client 402 with a value less than the ACK number, according to the flow from f401 shown in FIG. 8, and transfers packet M8 to server 401. Thereby, ACK number change unit A4 limits the data transmission bandwidth from server 401 to client 402. More specifically, similar to the above-described case of packet M2 and the like, packet M8 is determined as a packet containing no TCP data (f401 in FIG. 8), and a session list thereof is identified as session list C4 of session 1 (f402 in FIG. 8).

Then, ACK number change unit A4 determines whether a session of packet M8 runs in congestion avoidance mode or in slow start mode, based on the value stored in mode information C3 of session 1 in ACK number storage A7 (f403 in FIG. 8). Since value 0 (indicating congestion avoidance mode) is stored in mode information C3 of session 1, ACK number change unit A4 processes packet M8 in congestion avoidance mode according to the flow from f404 in FIG. 8.

In f404, ACK number change unit A4 of TCP shaper relay apparatus 403 obtains an ACK number having the oldest registration time stored on session list C4 in session information storage A7, that is, in this case, value 12001 stored in S0 in state L8 (f404 in FIG. 8). (As a result, value 12001 stored in S0 of session list C4 is deleted; a value stored in S1 moves to S0; a value stored in S2 moves to S1; a value stored in S3 moves to S2; and a value stored in S4 moves to S3.) ACK number change unit A4 then rewrites the ACK number of packet M8 with value 12001 (f405 in FIG. 8). Packet K80, which is packet M8 whose ACK number has been rewritten, is transferred to packet interception unit A3 (f412 in FIG. 8), and then to packet transfer unit A2 and to packet output unit A9 in sequence. TCP shaper relay apparatus 403 then transfers packet K80 to server 401. At this point, session list C4 changes from state L8 to state L9 as shown in FIG. 11. For server 401, packet K80 serves as an ACK to packet K10.

Of packets K10, K30, K40, K60, and K70 already transmitted to client 402, server 401 has received the ACK to packet K10, but no ACK yet to remaining packets K30, K40, K60, and K70 at this point. Thus, server 401 of the first embodiment, which has received ACK packet K80, finally recognizes that an RTO to packet K30 expired, since server 401 has yet to receive from client 402 an ACK to packet K30 (a packet having ACK number 13001).

Then, server 401 determines that congestion has occurred in packet K30 or the packet transmitted thereafter, and retransmits to client 402, packet K90, which has data identical to the data in packet K30. TCP shaper relay apparatus 403 provided on the communication path between server 401 and client 402, receives packet K90 during the transmission. Since packet K90 travels downstream, sequence number obtaining unit A5 obtains and stores a sequence number required to rewrite an ACK number of an upstream packet in the flow from f401, according to the flow from f31 in FIG. 9, similar to the above-described case of packet K10 and the like.

More specifically, similar to the above-described case of packet K10 and the like, packet K90 is first determined as a packet containing TCP data (f31 in FIG. 9), and a session list thereof is identified as session list C4 of session 1 (f32 and f33 in FIG. 9). Then, sequence number obtaining unit A5 determines whether or not packet K90 is a retransmitted TCP packet as described below, for example (f34 in FIG. 9).

In FIG. 10, packet K90 has a sequence number of 12001 and a TCP data length of 1000 bytes. Sequence number obtaining unit A5 of TCP shaper relay apparatus 403 adds the sequence number and TCP data length of packet K90 obtained in process flow f32 of FIG. 9, that is, 12001+1000=13001. Then, sequence number obtaining unit A5 of TCP shaper relay apparatus 403 compares value 13001, which is the sum of the sequence number and TCP data length, with value 16001, which is the ACK number having the newest registration time at the moment stored in S3 of session list C4 in state L9 in session information storage A7. Since sum 13001 of the sequence number and TCP data length is less, sequence number obtaining unit A5 determines that packet K90 is the retransmitted TCP packet, and executes a process for the retransmitted packet (f36 and f37 in FIG. 9). In this case, sequence number obtaining unit A5 updates the value in mode information C3 of session 1 in session information storage A7 to 0, which indicates congestion avoidance mode (f36 in FIG. 9; the value in mode information C3 remains unchanged, however, since the session already runs in congestion avoidance mode).

During the state of congestion, server 401 only retransmits to client 402 the packet containing TCP data, and does not transmit new TCP data to client 402. Thus, when the state of congestion lasts long, the transfer efficiency declines. In order to recover server 401 from the state of congestion at the earliest point, TCP shaper relay apparatus 403 generates and transmits an ACK to server 401, for example.

More specifically, in order to recover server 401 from the state of congestion, sequence number obtaining unit A5 of TCP shaper relay apparatus 403 generates upstream packet K91 containing no TCP data, based on the source IP address (e.g., 502 in FIG. 28), the destination IP address (e.g., 503 in FIG. 28), the source port number (e.g., 114 in FIG. 19), and the destination port number (e.g., 115 in FIG. 19), which are stored in C2 of session information storage A7. Sequence number obtaining unit A5 then transfers packet K91 to packet interception unit A3.

Then, ACK number change unit A4 of TCP shaper relay apparatus 403 inputs from packet interception unit A3, packet K91 generated earlier in sequence number obtaining unit A5. ACK number change unit A4 obtains an ACK number having the oldest registration time at the moment stored on session list C4 in session information storage A7, that is, in this case, value 13001 stored in S0 in state L9. (As a result, value 13001 stored in S0 of session list C4 is deleted; a value stored in S1 moves to S0; a value stored in S2 moves to S1; and a value stored in S3 moves to S2.) ACK number change unit A4 then writes value 13001 to an ACK number of packet K91 (f37 in FIG. 9). Packet K91, to which ACK number 13001 has been written, is transferred to packet interception unit A3 (f38 in FIG. 9), and then to packet transfer unit A2 and to packet output unit A9 in sequence. TCP shaper relay apparatus 403 then transfers packet K91 to server 401.

Thereafter, TCP shaper relay apparatus 403 does not store the ACK number in session information storage A7, and transfers packet K90 as packet M9 to packet interception unit A3 (f38 in FIG. 9). Packet M9 is transferred to packet transfer unit A2 and to packet output unit A9 in sequence. TCP shaper relay apparatus 403 then transfers packet M9 to client 402. At this point, session list C4 changes from state L9 to state L10.

Described below is the operation example of the basic TCP shaper in slow start mode with reference to FIGS. 12 and 13. FIG. 12 is an example of TCP communication in slow start mode among server 404, client 405, and TCP shaper relay apparatus 406. TCP shaper relay apparatus 406 is provided on a communication path between server 404 and client 405. An internal configuration of TCP shaper relay apparatus 406 is the same as shown in FIGS. 3 to 5. Further, TCP shaper relay apparatus 406 handles a packet transmitted on the communication path between server 404 and client 405 based on the process flows shown in FIGS. 6 to 9. Server 404 transmits to client 405, packets (P10, P30, P50, P70, P80, P100, and P120) each of which contains TCP data of 1000 bytes in TCP per transmission. Client 405 transmits to server 404, packets containing no TCP data (R2, R4, R6, R9, and R11), which are ACKs in response to the packets containing TCP data (P10, P30, P50, P70, P80, and P100) transmitted from server 404.

FIG. 13 is a transition example of a session list in session information storage A7 during the communication in FIG. 12. The session list changes in session 1 of session information storage A7 in FIG. 4. More specifically, session list C4 in session information storage A7 of TCP shaper relay apparatus 406 starts in state Q1 of FIG. 13, wherein values 11001 and 10001 are already stored in addresses S0 and S1 respectively of session list C4. Value 10001 is registered at an older time than value 11001. Congestion has yet to occur at this point. Since the communication in FIGS. 12 and 13 is performed in slow start mode, mode information C3 of session 1 in state Q1 stores value 1, which indicates slow start mode. Further, packet counter J of session 1 in packet number storage A8 stores an even number. When server 404 runs in slow start mode, TCP shaper relay apparatus 406 uses the packet counter in packet number storage A8 in a method hereinafter described, so as to generate a state of congestion at the earliest point and to switch to congestion avoidance mode. Thereby, TCP shaper relay apparatus 406 prevents a spike in a communication bandwidth from server 404 to client 405 in slow start mode.

First, server 404 transmits packet P10 to client 405. Then, TCP shaper relay apparatus 406 provided on the communication path between server 404 and client 405, receives packet P10. Since packet P10 travels downstream, sequence number obtaining unit A5 obtains and stores a sequence number required to rewrite an ACK number of an upstream packet in the flow from f401, according to the flow from f31 shown in FIG. 9, similar to the above-described operation example of the basic TCP shaper in congestion avoidance mode.

Similar to the above-described operation example of the basic TCP shaper in congestion avoidance mode, packet P10 is determined as a packet containing TCP data (f31 in FIG. 9), and a session list thereof is identified as session list C4 of session 1 (f32 and f33 in FIG. 9). Then, sequence number obtaining unit A5 determines whether or not packet P10 is a retransmitted TCP packet as described below, for example (f34 in FIG. 9).

In FIG. 12, packet P10 has a sequence number of 11001 and a TCP data length of 1000 bytes. TCP shaper relay apparatus 406 adds the sequence number and TCP data length of packet P10 obtained in process flow f32 of FIG. 9, that is, 11001+1000=12001. Then, sequence number obtaining unit A5 of TCP shaper relay apparatus 406 compares value 12001, which is the sum of the sequence number and TCP data length, with value 11001, which is the ACK number having the newest registration time at the moment stored in S1 of session list C4 in state Q1 in session information storage A7. Since sum 12001 of the sequence number and TCP data length is greater, sequence number obtaining unit A5 determines that packet P10 is not the retransmitted TCP packet, and additionally registers the sum of the sequence number and TCP data length on session list C4 in session information storage A7 (f35 in FIG. 9). In this case, sequence number obtaining unit A5 stores sum 12001 of the sequence number and TCP data length in S2 of session list C4 in session information storage A7. Then, sequence number obtaining unit A5 transfers packet P10 as packet R1 to packet interception unit A3 (f38 in FIG. 9). Packet R1 is transferred to packet transfer unit A2 and to packet output unit A9 in sequence. TCP shaper relay apparatus 406 then transfers packet R1 to client 405 (f38 in FIG. 9). At this point, session list C4 changes from state Q1 to state Q2 as shown in FIG. 13.

Receiving packet R1, client 405 transmits to server 404, packet R2, which has ACK number 12001 and no TCP data, as an ACK to packet R1. TCP shaper relay apparatus 406 provided on the communication path between server 404 and client 405, receives packet R2 during the transmission. Since packet R2 travels upstream, ACK number change unit A4 rewrites the ACK number received from client 405 with a value less than the ACK number, according to the flow from f401 shown in FIG. 8, and transfers packet R2 to server 404, similar to the above-described operation example of the basic TCP shaper in congestion avoidance mode; or alternatively drops the ACK packet for server 404. Thereby, ACK number change unit A4 limits the data transmission bandwidth from server 404 to client 405. More specifically, similar to the above-described operation example of the basic TCP shaper in congestion avoidance mode, packet R2 is determined as a packet containing no TCP data (f401 in FIG. 8), and a session list thereof is identified as session list C4 of session 1 (f402 in FIG. 8).

Then, ACK number change unit A4 determines whether a session of packet R2 runs in congestion avoidance mode or in slow start mode, based on the value stored in mode information C3 of session 1 in ACK number storage A7 (f403 in FIG. 8). Since value 1 (indicating slow start mode) is stored in mode information C3 of session 1, ACK number change unit A4 processes packet R2 in slow start mode according to the flow from f406 in FIG. 8.

In f406, ACK number change unit A4 of TCP shaper relay apparatus 406 identifies a packet counter for packet R2 stored in packet number storage A8, based on IP address information (e.g., 502 and 503 in FIG. 28) and port number information (e.g., 114 and 115 in FIG. 19) contained in packet R2, and obtains the value in the packet counter. In the first embodiment, the IP address information and port number information of packet R2 are identical to IP address information and port number information J2 of session 1 in packet information storage A8 shown in FIG. 5, and thus the packet counter for packet R2 is identified as packet counter J1 of session 1. Then, ACK number change unit A4 of TCP shaper relay apparatus 406 obtains the value in packet counter J1 in f406.

Since it is determined in f407 that packet counter J1 stores an even number, ACK number change unit A4 rewrites the ACK number received from client 405 with a value less than the ACK number, and transfers packet R2 to server 404. More specifically, ACK number change unit A4 of TCP shaper relay apparatus 406 obtains an ACK number having the oldest registration time stored on session list C4 in session information storage A7, that is, in this case, value 10001 stored in S0 in state Q2 (f408 in FIG. 8) (As a result, value 10001 stored in S0 of session list C4 is deleted; a value stored in S1 moves to S0; and a value stored in S2 moves to S1.) ACK number change unit A4 then rewrites the ACK number of packet R2 with value 10001 (f409 in FIG. 8), and increments and updates the value in packet counter J1 by one (f410 in FIG. 8). (As a result, the value in packet counter J1 has changed to an odd number.) Packet P20, which is packet R2 whose ACK number has been rewritten, is transferred to packet interception unit A3 (f412 in FIG. 8), and then to packet transfer unit A2 and to packet output unit A9 in sequence. TCP shaper relay apparatus 406 then transfers packet P20 to server 404 (f412 in FIG. 8). At this point, session list C4 changes from state Q2 to state Q3 as shown in FIG. 13.

Server 404 has yet to receive an ACK to packet P10 already transmitted to client 405 at this point. However, server 404 of the first embodiment determines that a state of congestion has not yet occurred since server 404 has received packet P20, and thus continues to transmit to client 405, packet P30 that contains next data. TCP shaper relay apparatus 406 provided on the communication path between server 404 and client 405, receives packet P30 during the transmission. Since packet P30 travels downstream, sequence number obtaining unit A5 again obtains and stores a sequence number required to rewrite an ACK number of an upstream packet in the flow from f401, according to the flow from f31 in FIG. 9, similar to the above-described case of packet P10.

More specifically, similar to the above-described case of packet P10, packet P30 is determined as a packet containing TCP data (f31 in FIG. 9), and a session list thereof is identified as session list C4 of session 1 (f32 and f33 in FIG. 9). Then, sequence number obtaining unit A5 determines whether or not packet P30 is a retransmitted TCP packet as described below, similar to the above-described case of packet P10 (f34 in FIG. 9).

In FIG. 12, packet P30 has a sequence number of 12001 and a TCP data length of 1000 bytes. Sequence number obtaining unit A5 of TCP shaper relay apparatus 406 adds the sequence number and TCP data length of packet P30 obtained in process flow f32 of FIG. 9, that is, 12001+1000=13001. Then, sequence number obtaining unit A5 of TCP shaper relay apparatus 406 compares value 13001, which is the sum of the sequence number and TCP data length, with value 12001, which is the ACK number having the newest registration time at the moment stored in S1 of session list C4 in state Q3 in session information storage A7. Since sum 13001 of the sequence number and TCP data length is greater, sequence number obtaining unit A5 determines that packet P30 is not the retransmitted TCP packet, and additionally registers the sum of the sequence number and TCP data length (f35 in FIG.

9). In this case, sequence number obtaining unit A5 stores sum 13001 of the sequence number and TCP data length in S2 of session list C4 in session information storage A7. Then, sequence number obtaining unit A5 transfers packet P30 as packet R3 to packet interception unit A3 (f38 in FIG. 9). Packet R3 is transferred to packet transfer unit A2 and to packet output unit A9 in sequence. TCP shaper relay apparatus 406 then transfers packet R3 to client 405. At this point, session list C4 changes from state Q3 to state Q4 as shown in FIG. 13.

Receiving packet R3, client 405 transmits to server 404, packet R4, which has ACK number 13001 and no TCP data, as an ACK to packet R3. TCP shaper relay apparatus 406 provided on the communication path between server 404 and client 405, receives packet R4 during the transmission. Since packet R4 travels upstream, ACK number change unit A4 again rewrites the ACK number received from client 405 with a value less than the ACK number, according to the flow from f401 shown in FIG. 8, and transfers packet R4 to server 404, similar to the above-described case of ACK packet R2; or alternatively drops the ACK packet for server 404. Thereby, ACK number change unit A4 limits the data transmission bandwidth from server 404 to client 405. More specifically, similar to the above-described case of ACK packet R2, packet R4 is determined as a packet containing no TCP data (f401 in FIG. 8), and a session list thereof is identified as session list C4 of session 1 (f402 in FIG. 8).

Then, ACK number change unit A4 determines whether a session of packet R4 runs in congestion avoidance mode or in slow start mode, based on the value stored in mode information C3 of session 1 in ACK number storage A7 (f403 in FIG. 8). Since value 1 (indicating slow start mode) is stored in mode information C3 of session 1, ACK number change unit A4 processes packet R4 in slow start mode according to the flow from f406 in FIG. 8.

In f406, similar to the above-described case of ACK packet R2, ACK number change unit A4 of TCP shaper relay apparatus 406 identifies a packet counter for packet R4 as packet counter J1 of session 1, and obtains the value stored in packet counter J1.

Since it is determined in f407 that packet counter J1 stores an odd number, ACK number change unit A4 drops the ACK packet for server 404. More specifically, ACK number change unit A4 of TCP shaper relay apparatus 406 increments and updates the value in packet counter J1 by one (f411 in FIG. 8; as a result, the value in packet counter J1 has changed to an even number), and drops packet R4 (f413 in FIG. 8). At this point, session list C4 changes from state Q4 to state Q5 as shown in FIG. 13.

Server 404 has yet to receive an ACK to packets P10 and P30 already transmitted to client 405 at this point. However, server 404 of the first embodiment determines that a state of congestion has not yet occurred, and thus continues to transmit to client 405, packet P50 that contains next data. TCP shaper relay apparatus 406 provided on the communication path between server 404 and client 405, receives packet P50 during the transmission. Since packet P50 travels downstream, sequence number obtaining unit A5 obtains and stores a sequence number required to rewrite an ACK number of an upstream packet in the flow from f401, according to the flow from f31 in FIG. 9, similar to the above-described case of packet P10 and the like.

More specifically, similar to the above-described case of packet P10 and the like, packet P50 is first determined as a packet containing TCP data (f31 in FIG. 9), and a session list thereof is identified as session list C4 of session 1 (f32 and f33 in FIG. 9). Then, sequence number obtaining unit A5 of TCP shaper relay apparatus 406 compares value 14001, which is a sum of sequence number 13001 and TCP data length 1000 of packet P50, with value 13001, which is the ACK number having the newest registration time at the moment stored in S2 of session list C4 in state Q5 in session information storage A7. Since sum 14001 of the sequence number and TCP data length is greater, sequence number obtaining unit A5 determines that packet P50 is not a retransmitted TCP packet, and additionally registers the sum of the sequence number and TCP data length (f35 in FIG. 9). In this case, sequence number obtaining unit A5 stores sum 14001 of the sequence number and TCP data length in S3 of session list C4 in session information storage A7. Then, sequence number obtaining unit A5 transfers packet P50 as packet R5 to packet interception unit A3 (f38 in FIG. 9). Packet R5 is transferred to packet transfer unit A2 and to packet output unit A9 in sequence. TCP shaper relay apparatus 406 then transfers packet R5 to client 405. At this point, session list C4 changes from state Q5 to state Q6 as shown in FIG. 13.

Receiving packet R5, client 405 transmits to server 404, packet R6, which has ACK number 14001 and no TCP data, as an ACK to packet R5. TCP shaper relay apparatus 406 provided on the communication path between server 404 and client 405, receives packet R6 during the transmission. Since packet R6 travels upstream, ACK number change unit A4 rewrites the ACK number received from client 405 with a value less than the ACK number, according to the flow from f401 shown in FIG. 8, and transfers packet R6 to server 404; or alternatively drops the ACK packet for server 404. Thereby, ACK number change unit A4 limits the data transmission bandwidth from server 404 to client 405. More specifically, similar to the above-described case of ACK packet R2 and the like, packet R6 is determined as a packet containing no TCP data (f401 in FIG. 8), and a session list thereof is identified as session list C4 of session 1 (f402 in FIG. 8).

Then, ACK number change unit A4 determines whether a session of packet R6 runs in congestion avoidance mode or in slow start mode, based on the value stored in mode information C3 of session 1 in ACK number storage A7 (f403 in FIG. 8). Since value 1 (indicating slow start mode) is stored in mode information C3 of session 1, ACK number change unit A4 processes packet R6 in slow start mode according to the flow from f406 in FIG. 8.

In f406, similar to the above-described case of ACK packet R2 and the like, ACK number change unit A4 of TCP shaper relay apparatus 406 identifies a packet counter for packet R6 as packet counter J1 of session 1, and obtains the value stored in packet counter J1.

Since it is determined in f407 that packet counter J1 stores an even number, ACK number change unit A4 rewrites the ACK number received from client 405 with a value less than the ACK number, and transfers packet R6 to server 404. More specifically, ACK number change unit A4 of TCP shaper relay apparatus 406 obtains an ACK number having the oldest registration time stored on session list C4 in session information storage A7, that is, in this case, value 11001 stored in S0 in state Q6 (f408 in FIG. 8). (As a result, value 11001 stored in S0 of session list C4 is deleted; a value stored in S1 moves to S0; a value stored in S2 moves to S1; and a value stored in S3 moves S2.) ACK number change unit A4 then rewrites the ACK number of packet R6 with value 11001 (f409 in FIG. 8), and increments and updates the value in packet counter J1 by one (f410 in FIG. 8). (As a result, the value in packet counter J1 has changed to an odd number.) Packet P60, which is packet R6 whose ACK number has been rewritten, is transferred to packet interception unit A3 (f412 in FIG. 8), and then to packet transfer unit A2 and to packet output unit A9 in sequence. TCP shaper relay apparatus 406 then transfers packet P60 to server 404. At this point, session list C4 changes from state Q6 to state Q7 as shown in FIG. 13.

Server 404 has yet to receive an ACK to packets P10, P30, and P50 already transmitted to client 405 at this point. Still, server 404 of the first embodiment determines that a state of congestion has not yet occurred since server 404 has received packet P60, and thus continues to transmit to client 405, two packets P70 and P80 that contain next data consecutively. TCP shaper relay apparatus 406 provided on the communication path between server 404 and client 405, receives packets P70 and P80 during the transmission. Since packets P70 and P80 travel downstream, sequence number obtaining unit A5 obtains and stores a sequence number required to rewrite an ACK number of an upstream packet in the flow from f401, according to the flow from f31 in FIG. 9, similar to the above-described case of packet P10 and the like.

More specifically, similar to the above-described case of packet P10 and the like, packet P70 is first determined as a packet containing TCP data (f31 in FIG. 9), and a session list thereof is identified as session list C4 of session 1 (f32 and f33 in FIG. 9). Then, sequence number obtaining unit A5 of TCP shaper relay apparatus 406 compares value 15001, which is a sum of sequence number 14001 and TCP data length 1000 of packet P70, with value 14001, which is the ACK number having the newest registration time at the moment stored in S2 of session list C4 in state Q7 in session information storage A7 (f34 in FIG. 9). Since sum 15001 of the sequence number and TCP data length is greater, sequence number obtaining unit A5 determines that packet P70 is not a retransmitted TCP packet, and additionally registers the sum of the sequence number and TCP data length (f35 in FIG. 9). In this case, sequence number obtaining unit A5 stores sum 15001 of the sequence number and TCP data length in S3 of session list C4 in session information storage A7. Then, sequence number obtaining unit A5 transfers packet P70 as packet R7 to packet interception unit A3 (f38 in FIG. 9). Packet R7 is transferred to packet transfer unit A2 and to packet output unit A9 in sequence. TCP shaper relay apparatus 406 then transfers packet R7 to client 405. At this point, session list C4 changes from state Q7 to state Q8 as shown in FIG. 13.

The process similar to the above-described case of packet P70 is executed for packet P80. More specifically, packet P80 is determined as a packet containing TCP data, and a session list thereof is identified as session list C4 of session 1 (f31 to f33 in FIG. 9). Sequence number obtaining unit A5 of TCP shaper relay apparatus 406 compares value 16001, which is a sum of sequence number 15001 and TCP data length 1000 of packet P80, with value 15001, which is the ACK number having the newest registration time at the moment stored in S3 of session list C4 in state Q8 in session information storage A7 (f34 in FIG. 9). Since sum 16001 of the sequence number and TCP data length is greater, sequence number obtaining unit A5 determines that packet P80 is not a retransmitted TCP packet, and stores sum 16001 of the sequence number and TCP data length of packet P80 in S4 of session list C4 in session information storage A7 (f35 in FIG. 9). Then, sequence number obtaining unit A5 transfers P80 as packet R8 to packet interception unit A3 packet (f38 in FIG. 9). Packet R8 is transferred to packet transfer unit A2 and to packet output unit A9 in sequence. TCP shaper relay apparatus 406 then transfers packet R8 to client 405. At this point, session list C4 changes from state Q8 to state Q9 as shown in FIG. 13.

Receiving packets R7 and R8 in a short interval as described above, client 405 transmits to server 404, packet R9, which has ACK number 16001 and no TCP data, as an ACK to packets R7 and R8. TCP shaper relay apparatus 406 provided on the communication path between server 404 and client 405, receives packet R9 during the transmission. Since packet R9 travels upstream, ACK number change unit A4 again rewrites the ACK number received from client 405 with a value less than the ACK number, according to the flow from f401 shown in FIG. 8, and transfers packet R9 to server 404, similar to the above-described case of ACK packet R2 and the like; or alternatively drops the ACK packet for server 404. Thereby, ACK number change unit A4 limits the data transmission bandwidth from server 404 to client 405. More specifically, similar to the above-described case of packet R2 and the like, packet R9 is determined as a packet containing no TCP data (f401 in FIG. 8), and a session list thereof is identified as session list C4 of session 1 (f402 in FIG. 8).

Then, ACK number change unit A4 determines whether a session of packet R9 runs in congestion avoidance mode or in slow start mode, based on the value stored in mode information C3 of session 1 in ACK number storage A7 (f403 in FIG. 8). Since value 1 (indicating slow start mode) is stored in mode information C3 of session 1, ACK number change unit A4 processes packet R9 in slow start mode according to the flow from f406 in FIG. 8.

In f406, similar to the case of ACK packet R2 and the like, ACK number change unit A4 of TCP shaper relay apparatus 406 identifies a packet counter for packet R9 as packet counter J1 of session 1, and obtains the value stored in packet counter J1.

Since it is determined in f407 that packet counter J1 stores an odd number, ACK number change unit A4 drops the ACK packet for server 404. More specifically, ACK number change unit A4 of TCP shaper relay apparatus 406 increments and updates the value in packet counter J1 by one (f411 in FIG. 8; as a result, the value in packet counter J1 has changed to an even number), and drops packet R9 (f413 in FIG. 8). At this point, session list C4 changes from state Q9 to state Q10 as shown in FIG. 13.

Server 404 has yet to receive an ACK to packets P10, P30, P50, P70, and P80 already transmitted to client 405 even at this point. Still, server 404 of the first embodiment determines that a state of congestion has not yet occurred, and thus continues to transmit to client 405, packet P100 that contains next data. TCP shaper relay apparatus 406 provided on the communication path between server 404 and client 405, receives packet P100 during the transmission. Since packet P100 travels downstream, sequence number obtaining unit A5 obtains and stores a sequence number required to rewrite an ACK number of an upstream packet in the flow from f401, according to the flow from f31 in FIG. 9, similar to the above-described case of packet P10 and the like.

More specifically, similar to the above-described case of packet P10 and the like, packet P100 is first determined as a packet containing TCP data (f31 in FIG. 9), and a session list thereof is identified as session list C4 of session 1 (f32 and f33 in FIG. 9). Then, sequence number obtaining unit A5 of TCP shaper relay apparatus 406 compares value 17001, which is a sum of sequence number 16001 and TCP data length 1000 of packet P100, with value 16001, which is the ACK number having the newest registration time at the moment stored in S4 of session list C4 in state Q10 in session information storage A7. Since sum 17001 of the sequence number and TCP data length is greater, sequence number obtaining unit A5 determines that packet P100 is not a retransmitted TCP packet, and additionally registers the sum of the sequence number and TCP data length (f35 in FIG. 9). In this case, sequence number obtaining unit A5 stores sum 17001 of the sequence number and TCP data length in S5 of session list C4 in session information storage A7. Then, sequence number obtaining unit A5 transfers packet P100 as packet R10 to packet interception unit A3 (f38 in FIG. 9). Packet R10 is transferred to packet transfer unit A2 and to packet output unit A9 in sequence. TCP shaper relay apparatus 406 then transfers packet R10 to client 405. At this point, session list C4 changes from state Q10 to state Q11 as shown in FIG. 13.

Receiving packet R10, client 405 transmits to server 404, packet R1, which has ACK number 17001 and no TCP data, as an ACK to packet R10. TCP shaper relay apparatus 406 provided on the communication path between server 404 and client 405, receives packet R11 during the transmission. Since packet R11 travels upstream, ACK number change unit A4 rewrites the ACK number received from client 405 with a value less than the ACK number, according to the flow from f400 shown in FIG. 8, and transfers packet R11 to server 404; or alternatively drops the ACK packet for server 404. Thereby, ACK number change unit A4 limits the data transmission bandwidth from server 404 to client 405. More specifically, similar to the above-described case of ACK packet R2 and the like, packet R11 is determined as a packet containing no TCP data (f401 in FIG. 8), and a session list thereof is identified as session list C4 of session 1 (f402 in FIG. 8).

Then, ACK number change unit A4 determines whether a session of packet R11 runs in congestion avoidance mode or in slow start mode, based on the value stored in mode information C3 of session 1 in ACK number storage A7 (f403 in FIG. 8). Since value 1 (indicating slow start mode) is stored in mode information C3 of session 1, ACK number change unit A4 processes packet R11 in slow start mode according to the flow from f406 in FIG. 8.

In f406, similar to the above-described case of ACK packet R2 and the like, ACK number change unit A4 of TCP shaper relay apparatus 406 identifies a packet counter for packet R11 as packet counter J1 of session 1, and obtains the value stored in packet counter J1.

Since it is determined in f407 that packet counter J1 stores an even number, ACK number change unit A4 rewrites the ACK number received from client 405 with a value less than the ACK number, and transfers packet R11 to server 404. More specifically, ACK number change unit A4 of TCP shaper relay apparatus 406 obtains an ACK number having the oldest registration time stored on session list C4 in session information storage A7, that is, in this case, value 12001 stored in S0 in state Q11 (f408 in FIG. 8). (As a result, value 12001 stored in S0 of session list C4 is deleted; a value stored in S1 moves to S0; a value stored in S2 moves to S1; a value stored in S3 moves to S2; a value stored in S4 moves to S3; and a value stored in S5 moves to S4.) ACK number change unit A4 then rewrites the ACK number of packet R11 with value 12001 (f409 in FIG. 8), and increments and updates the value in packet counter J1 by one (f410 in FIG. 8). (As a result, the value in packet counter J1 has changed to an odd number.) Packet P110, which is packet R11 whose ACK number has been rewritten, is transferred to packet interception unit A3 (f412 in FIG. 8), and then to packet transfer unit A2 and to packet output unit A9 in sequence. TCP shaper relay apparatus 406 then transfers packet P110 to server 404. At this point, session list C4 changes from state Q11 to state Q12 as shown in FIG. 13. For server 404, packet P110 serves as an ACK to packet P10.

Of packets P10, P30, P50, P70, P80, and P100 already transmitted to client 405, server 404 has received the ACK to packet P10, but no ACK yet to remaining packets P30, P50, P70, P80, and P100 at this point. Thus, server 404 of the first embodiment, which has received ACK packet P110, finally recognizes that an RTO to packet P30 expired, since server 404 has yet to receive from client 405 an ACK to packet P30 (a packet having ACK number 13001).

Then, server 404 determines that congestion has occurred in packet P30 or the packet transmitted thereafter, and retransmits to client 405, packet P120, which has data identical to the data in packet P30. TCP shaper relay apparatus 406 provided on the communication path between server 404 and client 405, receives packet P120 during the transmission. Since packet P120 travels downstream, sequence number obtaining unit A5 obtains and stores a sequence number required to rewrite an ACK number of an upstream packet in the flow from f401, according to the flow from f31 in FIG. 9, similar to the above-described case of packet P10 and the like.

More specifically, similar to the above-described case of packet P10 and the like, packet P120 is first determined as a packet containing TCP data (f31 in FIG. 9), and a session list thereof is identified as session list C4 of session 1 (f32 and f33 in FIG. 9). Then, sequence number obtaining unit A5 determines whether or not packet P120 is a retransmitted TCP packet as described below, for example (f34 in FIG. 9).

In FIG. 12, packet P120 has a sequence number of 12001 and a TCP data length of 1000 bytes. Sequence number obtaining unit A5 of TCP shaper relay apparatus 406 adds the sequence number and TCP data length of packet P120 obtained in process flow f32 of FIG. 9, that is, 12001+1000=13001. Then, sequence number obtaining unit A5 of TCP shaper relay apparatus 406 compares value 13001, which is the sum of the sequence number and TCP data length, with value 17001, which is the ACK number having the newest registration time at the moment stored in S4 of session list C4 in state Q12 in session information storage A7. Since sum 13001 of the sequence number and TCP data length is less, sequence number obtaining unit A5 determines that packet P120 is the retransmitted TCP packet, and executes a process for the retransmitted packet (f36 and f37 in FIG. 9). In this case, sequence number obtaining unit A5 updates the value in mode information C3 of session 1 in session information storage A7 to 0, which indicates congestion avoidance mode (f36 in FIG. 9).

During the state of congestion, server 404 only retransmits to client 405 the packet containing TCP data, and does not transmit new TCP data to client 405. Thus, when the state of congestion lasts long, the transfer efficiency declines. In order to recover server 404 from the state of congestion at the earliest point, TCP shaper relay apparatus 406 generates and transmits an ACK to server 404, for example.

More specifically, in order to recover server 404 from the state of congestion, sequence number obtaining unit A5 of TCP shaper relay apparatus 406 generates upstream packet P121 containing no TCP data, based on the source IP address (e.g., 502 in FIG. 28), the destination IP address (e.g., 503 in FIG. 28), the source port number (e.g., 114 in FIG. 19), and the destination port number (e.g., 115 in FIG. 19), which are stored in C2 of session information storage A7. Sequence number obtaining unit A5 then transfers packet P121 to packet interception unit A3.

Then, ACK number change unit A4 of TCP shaper relay apparatus 406 inputs from packet interception unit A3, packet P121 generated earlier in sequence number obtaining unit A5. ACK number change unit A4 obtains an ACK number having the oldest registration time at the moment stored in session information storage A7, that is, in this case, value 13001 stored in S0 of session list C4 in state Q12. (As a result, value 13001 stored in S0 of session list C4 is deleted; a value stored in S1 moves to S0; a value stored in S2 moves to S1; a value stored in S3 moves to S2; and a value stored in S4 moves to S3.) ACK number change unit A4 then writes value 13001 to an ACK number of packet P121 (f37 in FIG. 9). Packet P121, to which ACK number 13001 has been written, is transferred to packet interception unit A3 (f38 in FIG. 9), and then to packet transfer unit A2 and to packet output unit A9 in sequence. TCP shaper relay apparatus 406 then transfers packet P121 to server 404.

Thereafter, TCP shaper relay apparatus 406 does not store the ACK number in session information storage A7, and transfers packet P120 as packet R12 to packet interception unit A3 (f38 in FIG. 9). Packet R12 is transferred to packet transfer unit A2 and to packet output unit A9 in sequence. TCP shaper relay apparatus 406 then transfers packet R12 to client 405. At this point, session list C4 changes from state Q12 to state Q13.

In the present invention as described above, the network relay apparatus relays communication on a network between at least one server and at least one client. When receiving an upstream packet on the connected network, the network relay apparatus and the network relay control method rewrite an ACK number of the packet with a value less than an original value, and then transmit the packet to the network. When the server receives the ACK packet having the rewritten ACK number, which is the value less than the original value, the server determines that not all packets earlier transmitted to the client have been delivered, and stops transmitting a new packet to the client until the server receives an ACK packet having an ACK number that shows all the packets transmitted to the client are delivered. Thereby, the downstream TCP throughput does not exceed a capacity of the network, thus reducing packet loss of a voice communication packet and the like transmitted simultaneously. Further, using no window size provides an advantage to solve a problem, including that the throughput does not decline in communication using a terminal incapable of handling the window size.

Second Embodiment

Figure 14:
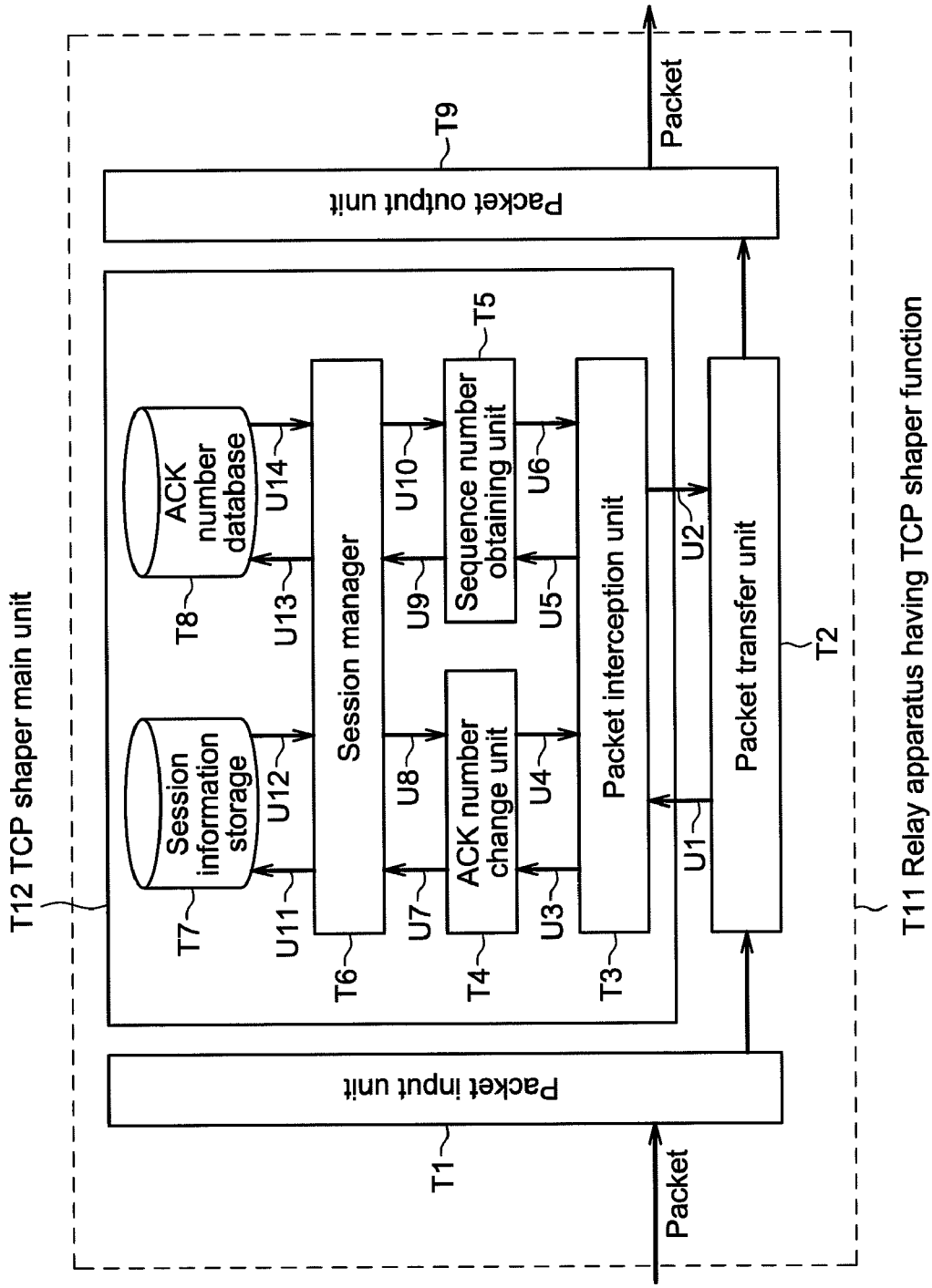
FIG. 14 is a general block diagram illustrating a configuration of a relay apparatus according to the embodiments of the present invention (enhanced TCP shaper)
Figure 15:
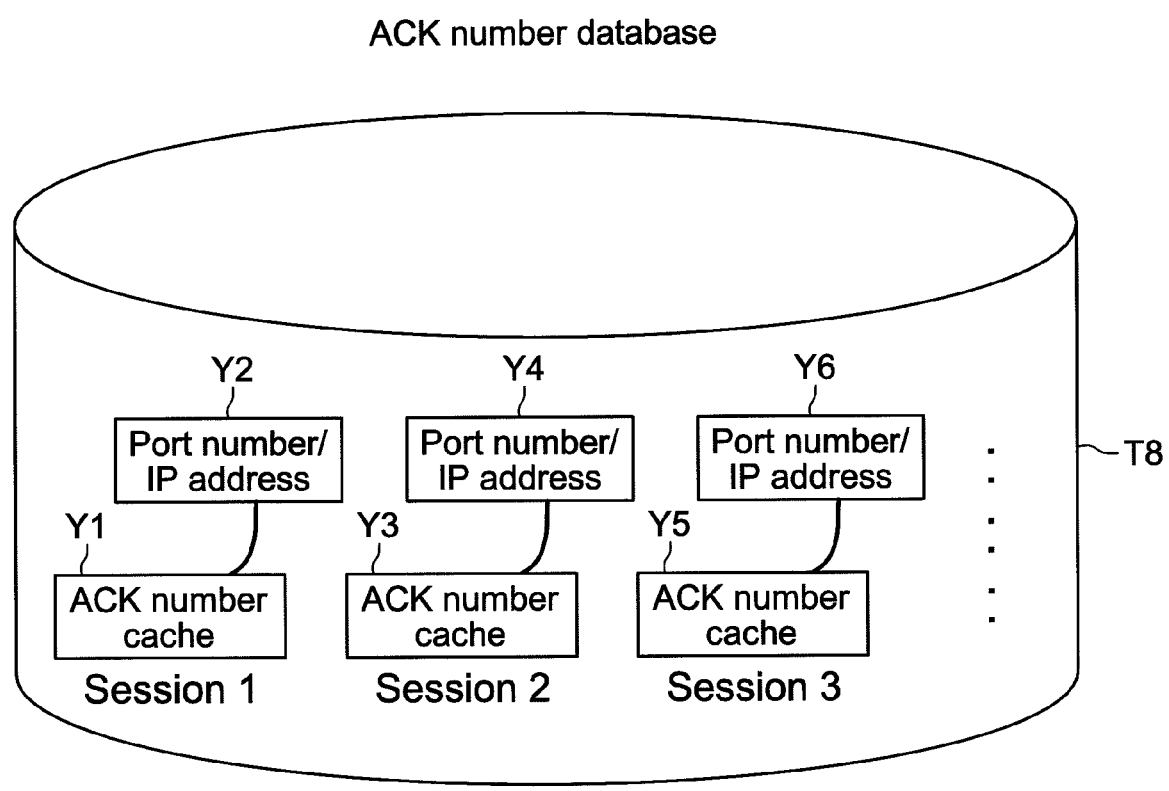
FIG. 15 illustrates a structure of an ACK number database in the relay apparatus according to the embodiments of the present invention.
Figure 16:
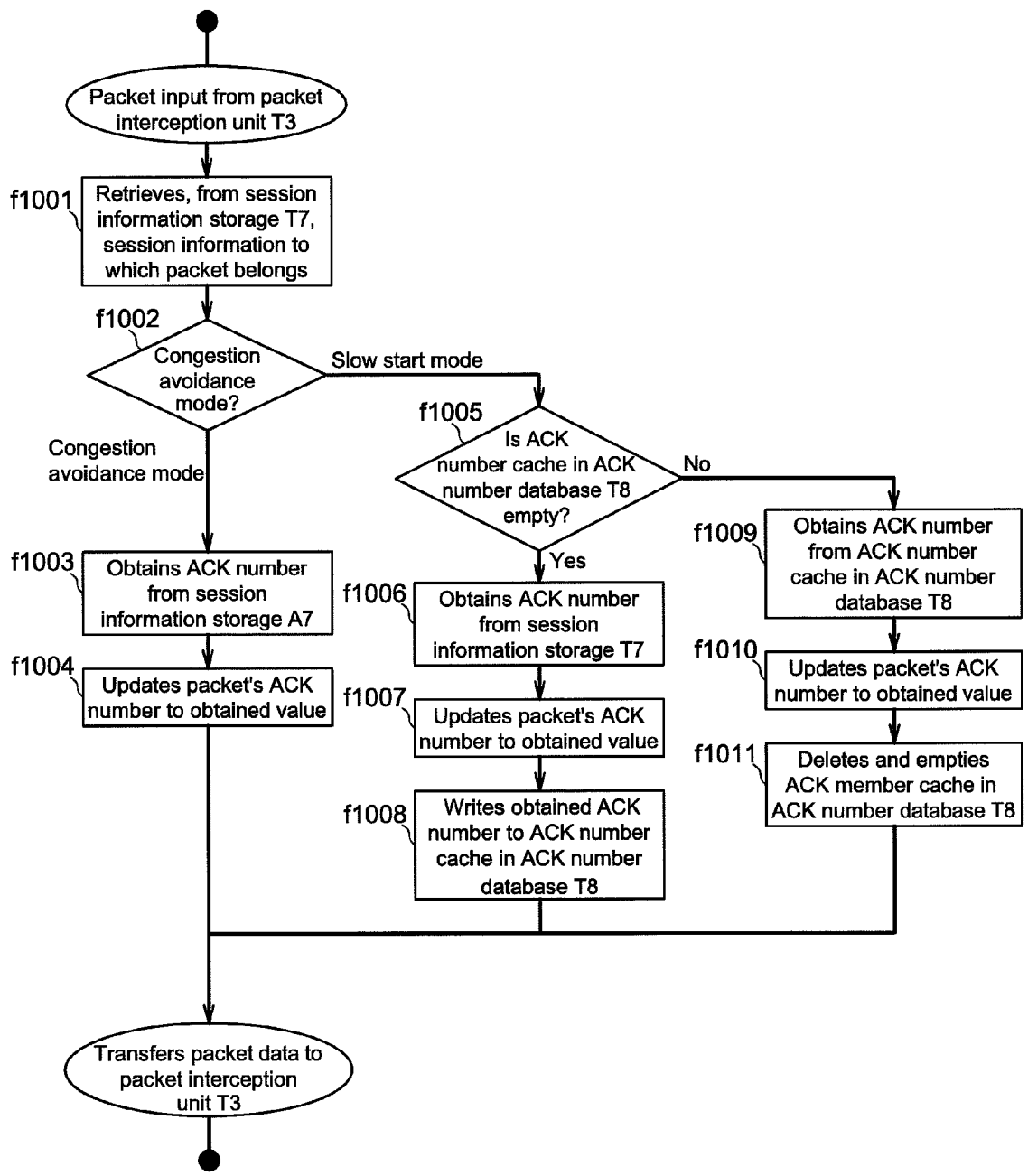
FIG. 16 is a flowchart of the ACK number change unit in the relay apparatus according to the embodiments of the present invention (enhanced TCP shaper)
Figure 17:
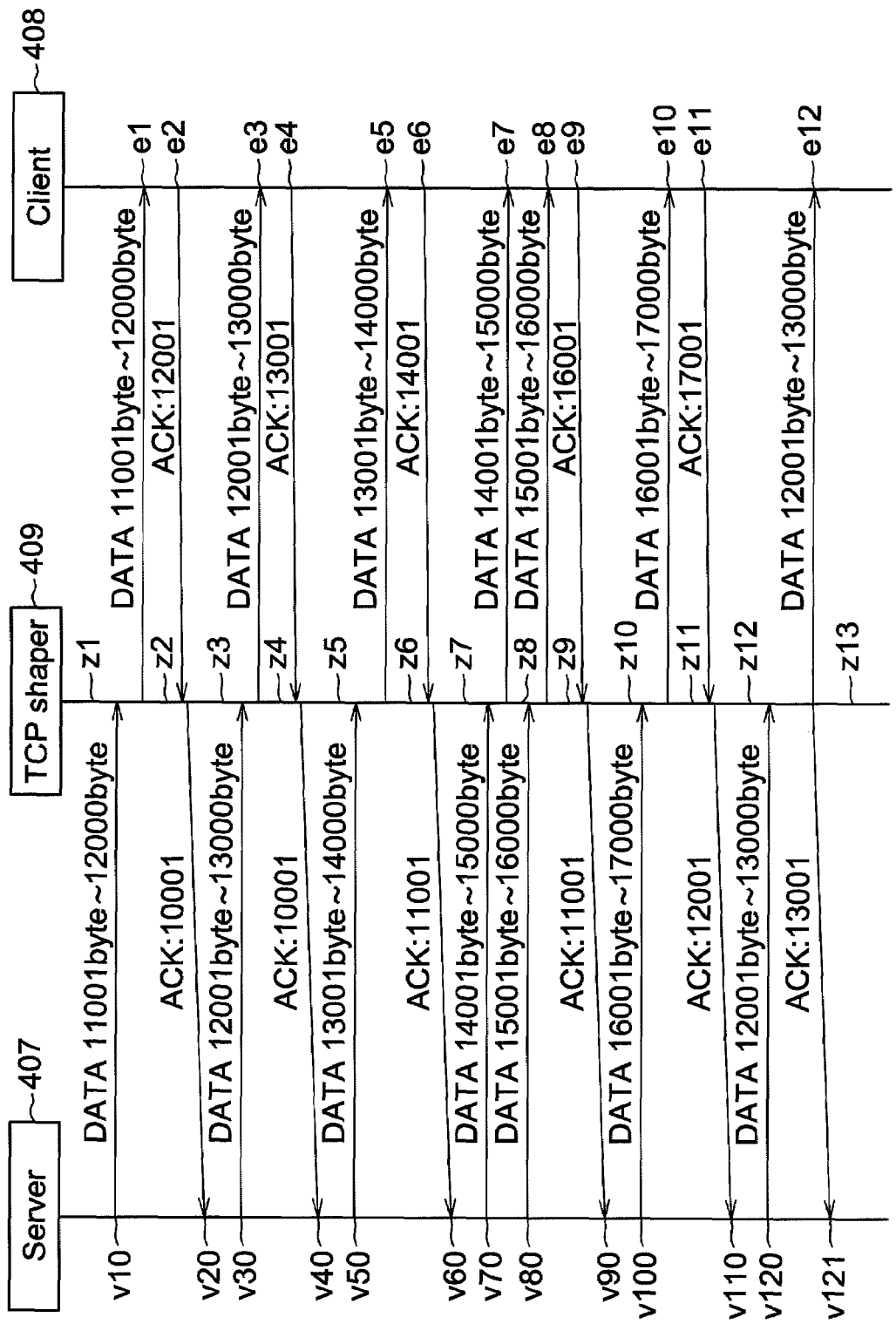
FIG. 17 is a sequence diagram illustrating operations in slow start mode in the relay apparatus according to the embodiments of the present invention (enhanced TCP shaper)
Figure 18:
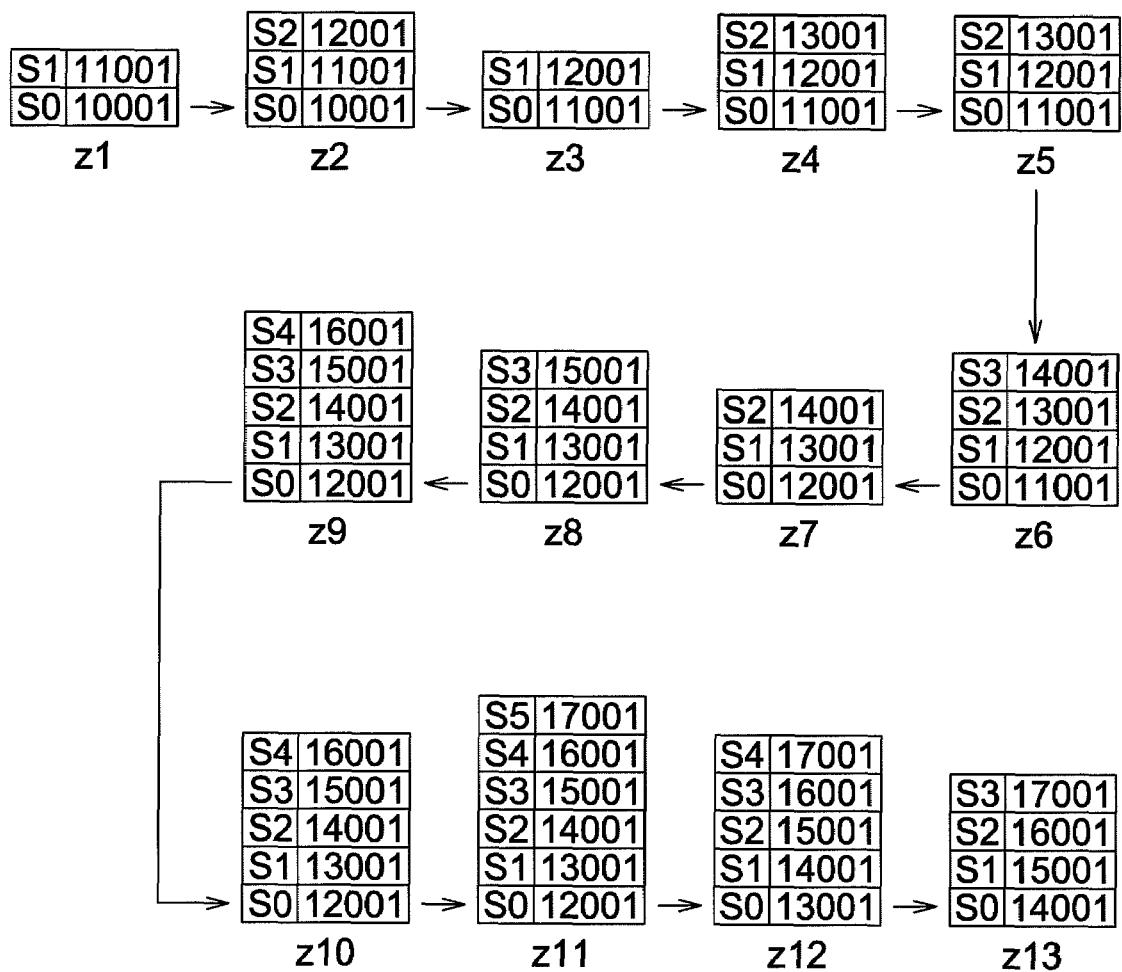
FIG. 18 illustrates transition of an ACK number list in slow start mode in the session information storage of the relay apparatus according to the embodiments of the present invention (enhanced TCP shaper)

In a second embodiment, descriptions are provided in order of: a difference from the first embodiment; a configuration of an enhanced TCP shaper with reference to FIGS. 14 to 15; a process flow of each module included in the enhanced TCP shaper with reference to FIG. 16; and an operation example of the enhanced TCP shaper with reference to FIGS. 17 and 18.

In the first embodiment, a packet containing TCP data is relayed only in a direction from server 404 to client 405 (a downstream direction) in TCP communication between server 404 and client 405 as shown in FIG. 12, for example. When client 405 transmits to server 404 a packet containing TCP data, TCP shaper relay apparatus 406 drops the packet containing TCP data and does not relay the packet to the server.

On the Internet these days, a server and a client sometimes exchange TCP data bidirectionally in a TCP session. For instance, to display contents stored on a web server using a web browser installed on an information device, such as a user PC and the like, the web server transmits to the information device, such as the PC and the like that a user uses, a packet of TCP data containing the contents on the web server. When the user shops online using the browser on the information device, such as the PC and the like, the information device, such as the PC and the like, transmits to the web server a packet of TCP data containing credit cart information and the like. Assuming that server 404 in FIG. 12 functions as the web server and client 405 in FIG. 12 as the information device, such as the PC and the like, the server and client transmit and receive the TCP data in both directions. When the first embodiment is applied to the environment described above, the TCP packet directed from the information device, such as the PC and the like, to the web server is dropped. Thus, the user is unable to shop online and so forth. The method in which the packet containing TCP data is relayed only in one direction as described in the first embodiment may cause inconvenience. Meanwhile, the enhanced TCP shaper according to the second embodiment, which basically operates in the same manner as described in the first embodiment, is capable of relaying the packet containing TCP data in both directions and of reducing throughput of downstream TCP.

Described below is the configuration of the enhanced TCP shaper with reference to FIGS. 14 to 15. FIG. 14 is an overall configuration example of the enhanced TCP shaper. Similar to the first embodiment, enhanced TCP shaper T12 is installed as one extended function of relay apparatus 303 in FIG. 1, for example.

Normally, a relay apparatus only has packet input unit T1, packet transfer unit T2, and packet output unit T9 as shown in FIG. 14. Relay apparatus 303 having the enhanced TCP shaper also has TCP shaper main unit T12 in addition to the units. Most of the modules included in TCP shaper main unit T12 operate in the same manner as described in the first embodiment.

Processes for handling a packet in packet input unit T1, packet transfer unit T2, and packet output unit T9 are the same as those in packet input unit A1, packet transfer unit A2, and packet output unit A9 in the first embodiment.

Further, packet interception unit T3, ACK number change unit T4, sequence number obtaining unit T5, and session information storage T7 included in TCP shaper main unit T12 operate in the same manner as packet interception unit A3, ACK number change unit A4, sequence number obtaining unit A5, and session information storage A7 in the first embodiment.

ACK number database T8 temporarily stores an ACK number of a TCP packet to be transmitted in an upstream direction. FIG. 15 shows an example of an internal structure of ACK number database T8. Each of ACK number caches Y1, Y3, and Y5 stores an value of an ACK number of a TCP packet transferred upstream in each session. ACK number caches Y1, Y3, and Y5 are used to increase the value of every other upstream ACK number in slow start mode. Similar to session information storage T7, the ACK number cache is provided per session. Normally, only a limited number of sessions can be stored. When session manager T6 finds no memory space available for an ACK number cache in ACK number database T8, session manager T6 then, for example, deletes from ACK number database T8 an ACK number cache that has not been updated for the longest period of time so as to create the ACK number cache for a new session.

Session manager T6 relays a variety of data between ACK number change unit T4 and session information storage T7; and between sequence number obtaining unit T5 and ACK number database T8. In the first embodiment, session manager A6 relays a variety of data between ACK number change unit A4 and session information storage A7; and between sequence number obtaining unit A5 and packet number storage A8. In the second embodiment, however, session manager T6 relays the data to and from ACK number database T8, instead of packet number storage A8. When a plurality of sessions exist in session information storage T7 or ACK number database T8, session manager T6 further determines to which session in session information storage T7 or in ACK number database T8 the variety of data belong, which are relayed to and from session information storage T7 or ACK number database T8. For example, session manager T6 obtains from ACK number change unit T4 or sequence number obtaining unit T5, information that identifies a session to which a TCP packet belongs, such as, for example, a packet source IP address (e.g., data contained in source IP address field 502 of FIG. 28), a packet destination IP address (e.g., data contained in destination IP address field 503 of FIG. 28), a TCP source port number (e.g., data contained in 114 of FIG. 19), a TCP destination port number (e.g., data contained in 115 of FIG. 19), and the like, along with other information. Based on the obtained information, session manager T6 identifies a memory space in session information storage T7 or in ACK number database T8, for example, and stores the data in the memory space of the associated session.

An internal structure of session information storage T7 is the same as that of session information storage A7 of the first embodiment as shown in FIG. 4, in which T7 replaces A4. In the description below, FIG. 4 is referred with T7 replacing A7.

In the second embodiment, the upstream ACK is extracted based on a predetermined rule as described below. In congestion avoidance mode, the ACK number of the upstream TCP packet is rewritten with a value less than an original value; and the ACK number of the upstream TCP packet transmitted at a newer time is surely provided with a value greater than the ACK number of the TCP packet transmitted earlier. In slow start mode, the ACK number of the upstream TCP packet is rewritten; and the ACK number of the upstream TCP packet transmitted at a newer time is provided with a value equal to or greater than the ACK number of the TCP packet transmitted earlier. In other words, the upstream TCP packet is surely provided with the value equal to that of the upstream TCP packet that precedes or follows the TCP packet, and the ACK number increases every two upstream TCP packet.

Executing processes below using the above-described modules suppresses the throughput of a TCP segment in each session.

Provided below is a process flow in each of the modules included in the enhanced TCP shaper. Of the modules included in T12, only the TCP packet is handled in the modules, except packet interception unit T3.

A process flow in packet transfer unit T2 is the same as that in packet transfer unit A2 of the first embodiment as shown in FIG. 6, in which packet input unit T1 replaces packet input unit A1; packet interception unit T3 replaces packet interception unit A3; and packet transfer unit T2 replaces packet transfer unit A2. In the description below, FIG. 6 is referred with packet input unit T1 replacing packet input unit A1, packet interception unit T3 replacing packet interception unit A3, and packet transfer unit T2 replacing packet transfer unit A2.

A process flow in packet interception unit T3 is the same as that in packet interception unit A3 of the first embodiment as shown in FIG. 7, in which packet transfer unit T2 replaces packet transfer unit A2; ACK number change unit T4 replaces ACK number change unit A4; and sequence number obtaining unit T5 replaces sequence number obtaining unit A5. In the description below, FIG. 7 is referred with packet transfer unit T2 replacing packet transfer unit A2, ACK number change unit T4 replacing ACK number change unit A4, and sequence number obtaining unit T5 replacing sequence number obtaining unit A5.

FIG. 16 is an example of a process flow in ACK number change unit T4 for an upstream TCP packet.

Only the upstream TCP packet transferred from packet interception unit T3 (path U3 in FIG. 14) is input to ACK number change unit T4. Further, ACK number change unit T4 exchanges with session manager T6 only information related to a session to which the TCP packet belongs, but not the packet itself. In the first embodiment, ACK number change unit A4 determines a packet containing TCP data in step f401 of FIG. 8, and drops the packet in step f413. In the second embodiment, however, a packet containing TCP data and a packet containing no TCP data are handled equally.

ACK number change unit T4 obtains from session information storage T7 mode information (e.g., C3 of session 1 in FIG. 4) of a session to which the packet currently being processed belongs in step f1001. In step f1002, ACK number change unit T4 determines whether the current session runs in slow start mode or in congestion avoidance mode, based on the mode information obtained in step f1001.

When the session runs in congestion avoidance mode, ACK number change unit T4 obtains the oldest ACK number (e.g., data stored in address S0 of session 1 in FIG. 4) at the moment from a session list (e.g., C4 of session 1 in FIG. 4) to which the packet currently being processed belongs in session information storage T7 via session manager T6 in step f1003. Then, in step f1004, ACK number change unit T4 rewrites an ACK number field (e.g., 111 in FIG. 19) of the packet currently being processed with the ACK number obtained in the preceding step. ACK number change unit T4 then transfers the TCP packet whose ACK number has been rewritten to packet interception unit T3 via path U4. When the session list is empty, ACK number change unit T4 does not rewrite the ACK number of the TCP packet temporarily stored therein, and transfers the TCP packet to packet interception unit T3 via path U4.

When the session runs in slow start mode, ACK number change unit T4 checks whether or not a value is stored in an ACK number cache (e.g., Y1 of session 1 in FIG. 15) to which the packet currently being processed belongs in ACK number database T8 in step f1005. When no value is stored, ACK number change unit T4 obtains the oldest ACK number (e.g., data stored in address S0 of session 1 in FIG. 4) at the moment from the session list (e.g., C4 of session 1 in FIG. 4) to which the packet currently being processed belongs in session information storage T7 via session manager T6 in step f1006. Then, in step f1007, ACK number change unit T4 rewrites the ACK number field of the packet currently being processed with the ACK number obtained in the preceding step. Further, in step f1008, ACK number change unit T4 writes the ACK number obtained in step f1006 to the ACK number cache (e.g., Y1 of session 1 in FIG. 15) to which the packet currently being processed belongs in ACK number database T8. Then, ACK number change unit T4 transfers the packet whose ACK number has been rewritten to packet interception unit T3 via path U4. When the session list is empty, ACK number change unit T4 does not rewrite the ACK number of the TCP packet temporarily stored therein, and transfers the TCP packet to packet interception unit T3 via path U4.

When the value is stored in the ACK number cache to which the packet currently being processed belongs in ACK number data base T8 in step f1005, ACK number change unit T4 obtains an ACK number from the ACK number cache (e.g., Y1 of session 1 in FIG. 15) in ACK number data base T8 in step f1009. Then, in step f1010, ACK number change unit T4 rewrites the ACK number field of the packet currently being processed with the ACK number obtained in the preceding step (e.g., Y1 of session 1 in FIG. 15). In step f1011 that follows, ACK number change unit T4 deletes the value obtained in earlier step f1009 (e.g., Y1 of session 1 in FIG. 15) and empties the ACK number cache. Then, ACK number change unit T4 transfers the packet to packet interception unit T3 via path U4.

Finally, ACK number change unit T4 transfers the packet data to packet interception unit T3 in step f1012.

Described below is an operation example of the enhanced TCP shaper having the above-described configuration and process flows. In congestion avoidance mode, the enhanced TCP shaper operates in the same manner as the basic TCP shaper described in the first embodiment.

The operation example of the enhanced TCP shaper in slow start mode is described below with reference to FIGS. 17 and 18. FIG. 17 is an example of TCP communication in slow start mode among server 407, client 408, and relay apparatus installed with the TCP shaper (hereinafter referred to as "TCP shaper relay apparatus") 409. TCP shaper relay apparatus 409 is provided on a communication path between server 407 and client 408. An internal configuration of TCP shaper relay apparatus 409 is the same as shown in FIGS. 4, 14, and 15. Further, TCP shaper relay apparatus 409 handles a packet transmitted on the communication path between server 407 and client 408 based on the process flows shown in FIGS. 6, 7, 9, and 16. Server 407 transmits to client 408, packets (v10, v30, v50, v70, v80, v100, and v120) each of which contains TCP data of 1000 bytes in TCP per transmission. Client 408 transmits to server 407, packets (e2, e4, e6, e9, and e11), which are ACKs in response to the packets containing TCP data (v10, v30, v50, v70, v80, and v100) transmitted from server 407. The packets that client 408 transmits to server 407 may or may not include TCP data.

FIG. 18 is a transition example of a session list in session information storage T7 during the communication in FIG. 17. The session list changes in session 1 of session information storage T7 in FIG. 4. More specifically, session list C4 in session information storage T7 of TCP shaper relay apparatus 409 starts in state z1 of FIG. 18, wherein values 11001 and 10001 are already stored in addresses S0 and S1 respectively of session list C4 in state z1. Value 10001 is registered at an older time than value 11001. Congestion has yet to occur at this point. Since the communication in FIGS. 17 and 18 is performed in slow start mode, mode information C3 of session 1 in state z1 stores value 1, which indicates slow start mode. Further, ACK number cache Y1 in ACK number database T8 in state z1 is empty. When server 407 runs in slow start mode, TCP shaper relay apparatus 409 uses the ACK number cache in ACK number database T8 in a method hereinafter described, so as to generate a state of congestion at the earliest point and to switch to congestion avoidance mode. Thereby, TCP shaper relay apparatus 409 prevents a spike in a communication bandwidth from server 407 to client 408 in slow start mode.

First, server 407 transmits packet v10 to client 408. Then, TCP shaper relay apparatus 409 provided on the communication path between server 407 and client 408, receives packet v10. Since packet v10 travels downstream, sequence number obtaining unit T5 obtains and stores a sequence number required to rewrite an ACK number of an upstream packet in a flow from f1002 (hereinafter described), according to the flow from f31 shown in FIG. 9. Processes for obtaining and storing the sequence number are the same as described in the first embodiment.

More specifically, since it is determined in f31 that packet v10 contains TCP data, sequence number obtaining unit T5 of TCP shaper relay apparatus 409 obtains the sequence number and TCP data length of packet v10 (f32 in FIG. 9), and identifies a session list of packet v10 stored in session information storage T7, based on IP address information (e.g., 502 and 503 in FIG. 28) and port number information (e.g., 114 and 115 in FIG. 19) of packet v10 (f33 in FIG. 9). In the second embodiment, the IP address information and port number information of packet v10 are identical to IP address information and port number information C2 of session 1 in session information storage T7 shown in FIG. 4, and thus the session list of packet v10 is identified as session list C4 of session 1.

Then, sequence number obtaining unit T5 determines whether or not packet v10 is a retransmitted TCP packet in a method provided below, for example (f34 in FIG. 9).

In FIG. 17, packet v10 has a sequence number of 11001 and a TCP data length of 1000 bytes. Sequence number obtaining unit T5 of TCP shaper relay apparatus 409 adds the sequence number and TCP data length of packet v10 obtained in process flow f32 of FIG. 9, that is, 11001+1000=12001.

Then, sequence number obtaining unit T5 of TCP shaper relay apparatus 409 compares value 12001, which is the sum of the sequence number and TCP data length, with value 11001, which is the ACK number having the newest registration time at the moment stored in S1 of session list C4 in state z1 in session information storage T7. Since sum 12001 of the sequence number and TCP data length is greater, sequence number obtaining unit T5 determines that packet v10 is not the retransmitted TCP packet, and additionally registers the sum of the sequence number and TCP data length on session list C4 in session information storage T7 (f35 in FIG. 9). In this case, sequence number obtaining unit T5 stores sum 12001 of the sequence number and TCP data length in S2 of session list C4 in session information storage T7.

Then, sequence number obtaining unit T5 transfers packet v10 as packet e1 to packet interception unit T3 (f38 in FIG. 9). Packet e1 is transferred to packet transfer unit T2 and to packet output unit T9 in sequence. TCP shaper relay apparatus 409 then transfers packet e1 to client 408. At this point, session list C4 changes from state z1 to state z2 as shown in FIG. 18.

Receiving packet e1, client 408 transmits to server 407, packet e2, which has ACK number 12001, as an ACK to packet e1. TCP shaper relay apparatus 409 provided on the communication path between server 407 and client 408, receives packet e2 during the transmission. Since packet e2 travels upstream, ACK number change unit T4 rewrites the ACK number received from client 408 with a value less than the ACK number, according to the flow from f1001 shown in FIG. 16, and transfers packet e2 to server 407. Thereby, ACK number change unit T4 limits the data transmission bandwidth from server 407 to client 408.

In f1001, ACK number change unit T4 of TCP shaper relay apparatus 409 identifies a session list of packet e2 stored in session information storage T7, based on IP address information (e.g., 502 and 503 in FIG. 28) and port number information (e.g., 114 and 115 in FIG. 19) contained in packet e2. In the second embodiment, the IP address information and port number information of packet e2 are identical to IP address information and port number information C2 of session 1 in session information storage T7 shown in FIG. 4, and thus the session list of packet e2 is identified as session list C4 of session 1.

Then, ACK number change unit T4 determines whether a session of packet e2 runs in congestion avoidance mode or in slow start mode, based on the value stored in mode information C3 of session 1 in session information storage T7 (f1002 in FIG. 16). Since value 1 (indicating slow start mode) is stored in mode information C3 of session 1, ACK number change unit T4 processes packet e2 in slow start mode according to the flow from f1005 in FIG. 16.

More specifically, in f1005, ACK number change unit T4 of TCP shaper relay apparatus 409 identifies an ACK number cache that belongs to packet e2 stored in ACK number database T8, based on the IP address information (e.g., 502 and 503 in FIG. 28) and port number information (e.g., 114 and 115 in FIG. 19) contained in packet e2, and obtains a value in the ACK number cache. In the second embodiment, the IP address information and port number information of packet e2 are identical to IP address information and port number information Y2 of session 1 in ACK number database T8 shown in FIG. 15, and thus the ACK number cache of packet e2 is identified as ACK number cache Y1 of session 1. Since ACK number cache Y1 is empty in state z2, TCP shaper relay apparatus 409 proceeds to a process of f1006.

In f1006, ACK number change unit T4 rewrites the ACK number received from client 408 with a value less than the ACK number, and transfers packet e2 to server 407. More specifically, ACK number change unit T4 of TCP shaper relay apparatus 409 obtains an ACK number having the oldest registration time stored on session list C4 in session information storage T7, that is, in this case, value 10001 stored in S0 in state z2 (f1006 in FIG. 16). (As a result, value 10001 stored in S0 of session list C4 is deleted; a value stored in S1 moves to S0; and a value stored in S2 moves to S1.) ACK number change unit T4 then rewrites the ACK number of packet e2 with value 10001 (f1007 in FIG. 16), and writes the ACK number obtained in preceding f1006 to ACK number cache Y1 (f1008 in FIG. 16). (As a result, ACK number cache Y1 is no longer empty.) Packet v20, which is packet e2 whose ACK number has been rewritten, is transferred to packet interception unit T3 (f1012 in FIG. 16), and then to packet transfer unit T2 and to packet output unit T9 in sequence. TCP shaper relay apparatus 409 then transfers packet v20 to server 407. At this point, session list C4 changes from state z2 to state z3 as shown in FIG. 18.

Server 407 has yet to receive an ACK to packet v10 already transmitted to client 408 at this point. However, server 407 of the second embodiment determines that a state of congestion has not yet occurred since server 407 has received packet v20, and thus continues to transmit to client 408, packet v30 that contains next data. TCP shaper relay apparatus 409 provided on the communication path between server 407 and client 408, receives packet v30 during the transmission. Since packet v30 travels downstream, sequence number obtaining unit T5 again obtains and stores a sequence number required to rewrite an ACK number of an upstream packet in the flow from f401, according to the flow from f31 in FIG. 9, similar to the above-described case of packet v10. Processes for obtaining and storing the sequence number are the same as described in the first embodiment.

More specifically, similar to the above-described case of packet v10, packet v30 is determined as a packet containing TCP data (f31 in FIG. 9), and a session list thereof is identified as session list C4 of session 1 (f32 and f33 in FIG. 9). Then, sequence number obtaining unit T5 determines whether or not packet v30 is a retransmitted TCP packet as described below, similar to the above-described case of packet v10 (f34 in FIG. 9).

In FIG. 17, packet v30 has a sequence number of 12001 and a TCP data length of 1000 bytes. Sequence number obtaining unit T5 of TCP shaper relay apparatus 409 adds the sequence number and TCP data length of packet v30 obtained in process flow f32 of FIG. 9, that is, 12001+1000=13001. Then, sequence number obtaining unit T5 of TCP shaper relay apparatus 409 compares value 13001, which is the sum of the sequence number and TCP data length, with value 12001, which is the ACK number having the newest registration time at the moment stored in S1 of session list C4 in state z3 in session information storage T7. Since sum 13001 of the sequence number and TCP data length is greater, sequence number obtaining unit T5 determines that packet v30 is not the retransmitted TCP packet, and additionally registers the sum of the sequence number and TCP data length (f35 in FIG. 9). In this case, sequence number obtaining unit T5 stores sum 13001 of the sequence number and TCP data length in S2 of session list C4 in session information storage T7. Then, sequence number obtaining unit T5 transfers packet v30 as packet e3 to packet interception unit T3 (f38 in FIG. 9). Packet e3 is transferred to packet transfer unit T2 and to packet output unit T9 in sequence. TCP shaper relay apparatus 409 then transfers packet e3 to client 408. At this point, session list C4 changes from state z3 to state z4 as shown in FIG. 18.

Receiving packet e3, client 408 transmits to server 407, packet e4, which has ACK number 13001, as an ACK to packet e3. TCP shaper relay apparatus 409 provided on the communication path between server 407 and client 408, receives packet e4 during the transmission. Since packet e4 travels upstream, ACK number change unit T4 rewrites the ACK number received from client 408 with a value less than the ACK number, according to the flow from f1001 shown in FIG. 16, and transfers packet e4 to server 407, similar to the above-described case of ACK packet e2. Thereby, ACK number change unit T4 limits the data transmission bandwidth from server 407 to client 408. More specifically, similar to the above-described case of packet e2, a session list of packet e4 is identified as session list C4 of session 1 (f1001 in FIG. 16), and session mode of packet e4 is identified as slow start mode, based on the value stored in mode information C3 of session 1 (f1005 in FIG. 16). Then, ACK number change unit T4 processes packet e4 in slow start mode according to the flow from f1005 in FIG. 16.

More specifically, in f1005, ACK number change unit T4 of TCP shaper relay apparatus 409 identifies an ACK number cache that belongs to packet e4 stored in ACK number database T8, based on IP address information (e.g., 502 and 503 in FIG. 28) and port number information (e.g., 114 and 115 in FIG. 19) contained in packet e4, and obtains a value in the ACK number cache. In the second embodiment, the IP address information and port number information of packet e4 are identical to IP address information and port number information Y2 of session 1 in packet information storage T8 shown in FIG. 15, and thus the ACK number cache of packet e4 is identified as ACK number cache Y1 of session 1. Since ACK number cache Y1 is not empty in state z4, TCP shaper relay apparatus 409 proceeds to a process of f1009.

In f1009, ACK number change unit T4 rewrites the ACK number received from client 408 with a value less than the ACK number, and transfers packet e4 to server 407. More specifically, ACK number change unit T4 of TCP shaper relay apparatus 409 obtains value 10001 stored in ACK number cache Y1 in ACK number database T8 (f1009 in FIG. 16); rewrites the ACK number of packet e4 with value 10001 (f1010 in FIG. 16); and deletes value 10001 stored in ACK number cache Y1 (f1011 in FIG. 16). (As a result, ACK number cache Y1 becomes empty.) Packet v40, which is packet e4 whose ACK number has been rewritten, is transferred to packet interception unit T3 (f1012 in FIG. 16), and then to packet transfer unit T2 and to packet output unit T9 in sequence. TCP shaper relay apparatus 409 then transfers packet v40 to server 407. At this point, session list C4 changes from state z4 to state z5 as shown in FIG. 18.

Server 407 has yet to receive an ACK to packets v10 and v30 already transmitted to client 408 at this point. However, server 407 of the second embodiment determines that a state of congestion has not yet occurred, and thus continues to transmit to client 408, packet v50 that contains next data. TCP shaper relay apparatus 409 provided on the communication path between server 407 and client 408, receives packet v50 during the transmission. Since packet v50 travels downstream, sequence number obtaining unit T5 obtains and stores a sequence number required to rewrite an ACK number of an upstream packet in the flow from f401, according to the flow from f31 in FIG. 9, similar to the above-described case of packet v10 and the like. Processes for obtaining and storing the sequence number are the same as described in the first embodiment.

More specifically, similar to the above-described case of packet v10 and the like, packet v50 is first determined as a packet containing TCP data (f31 in FIG. 9), and a session list thereof is identified as session list C4 of session 1 (f32 and f33 in FIG. 9). Then, sequence number obtaining unit T5 of TCP shaper relay apparatus 409 compares value 14001, which is a sum of sequence number 13001 and TCP data length 1000, with value 13001, which is the ACK number having the newest registration time at the moment stored in S2 of session list C4 in state z5 in session information storage T7. Since sum 14001 of the sequence number and TCP data length is greater, sequence number obtaining unit T5 determines that packet v50 is not a retransmitted TCP packet, and additionally registers the sum of the sequence number and TCP data length (f35 in FIG. 9). In this case, sequence number obtaining unit T5 stores sum 14001 of the sequence number and TCP data length in S3 of session list C4 in session information storage T7. Then, sequence number obtaining unit T5 transfers packet v50 as packet e5 to packet interception unit T3 (f38 in FIG. 9). Packet e5 is transferred to packet transfer unit T2 and to packet output unit T9 in sequence. TCP shaper relay apparatus 409 then transfers packet e5 to client 408. At this point, session list C4 changes from state z5 to state z6 as shown in FIG. 18.

Receiving packet e5, client 408 transmits to server 407, packet e6, which has ACK number 14001, as an ACK to packet e5. TCP shaper relay apparatus 409 provided on the communication path between server 407 and client 408, receives packet e6 during the transmission. Since packet e6 travels upstream, ACK number change unit T4 rewrites the ACK number received from client 408 with a value less than the ACK number, according to the flow from f1001 shown in FIG. 16, and transfers packet e6 to server 407, similar to the case of ACK packet e2. Thereby, ACK number change unit T4 limits the data transmission bandwidth from server 407 to client 408.

In f1001, ACK number change unit T4 of TCP shaper relay apparatus 409 identifies a session list of packet e6 stored in session information storage T7, based on IP address information (e.g., 502 and 503 in FIG. 28) and port number information (e.g., 114 and 115 in FIG. 19) contained in packet e6. In the second embodiment, the IP address information and port number information of packet e6 are identical to IP address information and port number information C2 of session 1 in session information storage T7 shown in FIG. 4, and thus the session list of packet e6 is identified as session list C4 of session 1.

Then, ACK number change unit T4 determines whether a session of packet e6 runs in congestion avoidance mode or in slow start mode, based on the value stored in mode information C3 of session 1 in session information storage T7 (f1002 in FIG. 16). Since value 1 (indicating slow start mode) is stored in mode information C3 of session 1, ACK number change unit T4 processes packet e6 in slow start mode according to the flow from f1005 in FIG. 16.

More specifically, in f005, ACK number change unit T4 of TCP shaper relay apparatus 409 identifies an ACK number cache that belongs to packet e6 stored in ACK number database T8, based on the IP address information (e.g., 502 and 503 in FIG. 28) and the port number information (e.g., 114 and 115 in FIG. 19) contained in packet e6, and obtains a value in the ACK number cache. In the second embodiment, the IP address information and port number information of packet e6 are identical to IP address information and port number information Y2 of session 1 in ACK number database T8 shown in FIG. 15, and thus the ACK number cache of packet e6 is identified as ACK number cache Y1 of session 1. Since ACK number cache Y1 is empty in state z6, TCP shaper relay apparatus 409 executes the process of f1006, similar to the process of packet e1.

In f1006, ACK number change unit T4 rewrites the ACK number received from client 408 with a value less than the ACK number, and transfers packet e6 to server 407. More specifically, ACK number change unit T4 of TCP shaper relay apparatus 409 obtains an ACK number having the oldest registration time stored on session list C4 in session information storage T7, that is, in this case, value 11001 stored in S0 in state z6 (f1006 in FIG. 16). (As a result, value 11001 stored in S0 of session list C4 is deleted; a value stored in S1 moves to S0; a value stored in S2 moves to S1; and a value stored in S3 moves to S2.) ACK number change unit T4 then rewrites the ACK number of packet e6 with value 11001 (f1007 in FIG. 16), and writes the ACK number obtained in preceding f1006 to ACK number cache Y1 (f1008 in FIG. 16). (As a result, ACK number cache Y1 is no longer empty.) Packet v60, which is packet e6 whose ACK number has been rewritten, is transferred to packet interception unit T3 (f1012 in FIG. 16), and then to packet transfer unit T2 and to packet output unit T9 in sequence. TCP shaper relay apparatus 409 then transfers packet v60 to server 407. At this point, session list C4 changes from state z6 to state z7 as shown in FIG. 18.

Server 407 has yet to receive an ACK to packets v10, v30, and v50 already transmitted to client 408 at this point. Still, server 407 of the second embodiment determines that a state of congestion has not yet occurred since server 407 has received packet v60, and thus continues to transmit to client 408, packets v70 and v80 that contain next data consecutively. TCP shaper relay apparatus 409 provided on the communication path between server 407 and client 408, receives packets v70 and v80 during the transmission. Since packets v70 and v80 travel downstream, sequence number obtaining unit T5 obtains and stores a sequence number required to rewrite an ACK number of an upstream packet in the flow from f401, according to the flow from f31 in FIG. 9, similar to the above-described case of packet v10 and the like. Processes for obtaining and storing the sequence number are the same as described in the first embodiment.

More specifically, similar to the above-described case of packet v10 and the like, packet v70 is first determined as a packet containing TCP data (f31 in FIG. 9), and a session list thereof is identified as session list C4 of session 1 (f32 and f33 in FIG. 9). Then, sequence number obtaining unit T5 of TCP shaper relay apparatus 409 compares value 15001, which is a sum of sequence number 14001 and TCP data length 1000 of packet v70, with value 14001, which is the ACK number having the newest registration time at the moment stored in S2 of session list C4 in state z7 in session information storage T7 (f34 in FIG. 9). Since sum 15001 of the sequence number and TCP data length is greater, sequence number obtaining unit T5 determines that packet v70 is not a retransmitted TCP packet, and additionally registers the sum of the sequence number and TCP data length (f35 in FIG. 9). In this case, sequence number obtaining unit T5 stores sum 15001 of the sequence number and TCP data length in S3 of session list C4 in session information storage T7. Then, sequence number obtaining unit T5 transfers packet v70 as packet e7 to packet interception unit T3 (f38 in FIG. 9). Packet e7 is transferred to packet transfer unit T2 and to packet output unit T9 in sequence. TCP shaper relay apparatus 409 then transfers packet e7 to client 408. At this point, session list C4 changes from state z7 to state z8 as shown in FIG. 18.

The process similar to the above-described case of packet v70 is executed for packet v80. More specifically, packet v80 is determined as a packet containing TCP data, and a session list thereof is identified as session list C4 of session 1 (f31 to f33 in FIG. 9). Sequence number obtaining unit T5 of TCP shaper relay apparatus 409 compares value 16001, which is a sum of sequence number 15001 and TCP data length 1000 of packet v80, with value 15001, which is the ACK number having the newest registration time at the moment stored in S3 of session list C4 in state z8 in session information storage T7 (f34 in FIG. 9). Since sum 16001 of the sequence number and TCP data length is greater, sequence number obtaining unit T5 determines that packet v80 is not a retransmitted TCP packet, and stores sum 16001 of sequence number 15001 and TCP data length 1000 of packet v80 in S4 of session list C4 in session information storage T7 (f35 in FIG. 9). Then, sequence number obtaining unit T5 transfers packet v80 as packet e8 to packet interception unit T3 (f38 in FIG. 9). Packet e8 is transferred to packet transfer unit T2 and to packet output unit T9 in sequence. TCP shaper relay apparatus 409 then transfers packet e8 to client 408. At this point, session list C4 changes from state z8 to state z9 as shown in FIG. 18.

Receiving packets e7 and e8 in a short interval as described above, client 408 transmits to server 407, one ACK to e7 and e8 as packet e9 that has ACK number 16001. Then, TCP shaper relay apparatus 409 provided on the communication path between server 407 and client 408, receives packet e9 during the transmission. Since packet e9 travels upstream, ACK number change unit T4 again rewrites the ACK number received from client 408 with a value less than the ACK number, according to the flow from f1001 shown in FIG. 16, and transfers packet e9 to server 407, similar to the above-described case of ACK packet e2 and the like. Thereby, ACK number change unit T4 limits the data transmission bandwidth from server 407 to client 408.

More specifically, similar to the above-described case of packet e2, a session list of packet e9 is identified as session list C4 of session 1 (f1001 in FIG. 16), and session mode of packet e9 is identified as slow start mode, based on the value stored in mode information C3 of session 1 (f1005 in FIG. 16). Then, ACK number change unit T4 processes packet e9 in slow start mode according to the flow from f1005 in FIG. 16.

More specifically, in f1005, ACK number change unit T4 of TCP shaper relay apparatus 409 identifies an ACK number cache that belongs to packet e9 stored in ACK number database T8, based on IP address information (e.g., 502 and 503 in FIG. 28) and port number information (e.g., 114 and 115 in FIG. 19) contained in packet e9, and obtains a value in the ACK number cache. In the second embodiment, the IP address information and port number information of packet e9 are identical to IP address information and port number information Y2 of session 1 in packet information storage T8 shown in FIG. 15, and thus the ACK number cache of packet e9 is identified as ACK number cache Y1 of session 1. Since ACK number cache Y1 is not empty in state z9, TCP shaper relay apparatus 409 proceeds to the process of f1009.

In f1009, ACK number change unit T4 rewrites the ACK number received from client 408 with a value less than the ACK number, and transfers packet e9 to server 407. More specifically, ACK number change unit T4 of TCP shaper relay apparatus 409 obtains value 11001 stored in ACK number cache Y1 in ACK number database T8 (f1009 in FIG. 16); rewrites the ACK number of packet e9 with value 11001 (f1010 in FIG. 16); and deletes value 11001 stored in ACK number cache Y1 (f1011 in FIG. 16). (As a result, ACK number cache Y1 becomes empty.) Packet v90, which is packet e9 whose ACK number has been rewritten, is transferred to packet interception unit T3 (f1012 in FIG. 16), and then to packet transfer unit T2 and to packet output unit T9 in sequence. TCP shaper relay apparatus 409 then transfers packet v90 to server 407. At this point, session list C4 changes from state z9 to state z10 as shown in FIG. 18.

Server 407 has yet to receive an ACK to packets v10, v30, v50, v70, and v80 already transmitted to client 408 even at this point. Still, server 407 of the second embodiment determines that a state of congestion has not yet occurred, and thus continues to transmit to client 408, packet v100 that contains next data. TCP shaper relay apparatus 409 provided on the communication path between server 407 and client 408, receives packet v100 during the transmission. Since packet v100 travels downstream, sequence number obtaining unit T5 obtains and stores a sequence number required to rewrite an ACK number of an upstream packet in the flow from f401, according to the flow from f31 in FIG. 9, similar to the above-described case of packet v10 and the like. Processes for obtaining and storing the sequence number are the same as described in the first embodiment.

More specifically, similar to the above-described case of packet v10 and the like, packet v100 is first determined as a packet containing TCP data (f31 in FIG. 9), and a session list thereof is identified as session list C4 of session 1 (f32 and f33 in FIG. 9). Then, sequence number obtaining unit T5 of TCP shaper relay apparatus 409 compares value 17001, which is a sum of sequence number 16001 and TCP data length 1000, with value 16001, which is the ACK number having the newest registration time at the moment stored in S4 of session list C4 in state z10 in session information storage T7. Since sum 17001 of the sequence number and TCP data length is greater, sequence number obtaining unit T5 determines that packet v100 is not a retransmitted TCP packet, and additionally registers the sum of the sequence number and TCP data length (f35 in FIG. 9). In this case, sequence number obtaining unit T5 stores sum 17001 of the sequence number and TCP data length in S5 of session list C4 in session information storage T7. Then, sequence number obtaining unit T5 transfers packet v100 as packet e10 to packet interception unit T3 (f38 in FIG. 9). Packet e10 is transferred to packet transfer unit T2 and to packet output unit T9 in sequence. TCP shaper relay apparatus 409 then transfers packet e10 to client 408. At this point, session list C4 changes from state z10 to state z11 as shown in FIG. 18.

Receiving packet e10, client 408 transmits to server 407, packet e11, which has ACK number 17001, as an ACK to packet e10. TCP shaper relay apparatus 409 provided on the communication path between server 407 and client 408, receives packet e11 during the transmission. Since packet e11 travels upstream, ACK number change unit T4 rewrites the ACK number received from client 408 with a value less than the ACK number, according to the flow from f401 shown in FIG. 8, and transfers packet e11 to server 407; or alternatively drops the ACK packet for server 407. Thereby, ACK number change unit T4 limits the data transmission bandwidth from server 407 to client 408. More specifically, ACK number change unit T4 rewrites the ACK number received from client 408 with the value less than the ACK number, according to the flow from f1001 shown in FIG. 16, and transfers packet e11 to server 407, similar to the above-described case of ACK packet e2 and the like. Thereby, ACK number change unit T4 limits the data transmission bandwidth from server 407 to client 408.

In f1001, ACK number change unit T4 of TCP shaper relay apparatus 409 identifies a session list of packet e11 stored in session information storage T7, based on IP address information (e.g., 502 and 503 in FIG. 28) and port number information (e.g., 114 and 115 in FIG. 19) contained in packet e11. In the second embodiment, the IP address information and port number information of packet e11 are identical to IP address information and port number information C2 of session 1 in session information storage T7 shown in FIG. 4, and thus the session list of packet e1 is identified as session list C4 of session 1.

Then, ACK number change unit T4 determines whether a session of packet e11 runs in congestion avoidance mode or in slow start mode, based on the value stored in mode information C3 of session 1 in session information storage T7 (f1002 in FIG. 16). Since value 1 (indicating slow start mode) is stored in mode information C3 of session 1, ACK number change unit T4 processes packet e11 in slow start mode according to the flow from f1005 in FIG. 16.

More specifically, in f1005, ACK number change unit T4 of TCP shaper relay apparatus 409 identifies an ACK number cache that belongs to packet e11 stored in ACK number database T8, based on the IP address information (e.g., 502 and 503 in FIG. 28) and the port number information (e.g., 114 and 115 in FIG. 19) contained in packet e11, and obtains a value in the ACK number cache. In the second embodiment, the IP address information and port number information of packet e11 are identical to IP address information and port number information Y2 of session 1 in ACK number database T8 shown in FIG. 15, and thus the ACK number cache of packet e1 is identified as ACK number cache Y1 of session 1. Since ACK number cache Y1 is empty in state z11, TCP shaper relay apparatus 409 executes the process of f1006, similar to the process for packet e2.

In f1006, ACK number change unit T4 rewrites the ACK number received from client 408 with a value less than the ACK number, and transfers packet e11 to server 407. More specifically, ACK number change unit T4 of TCP shaper relay apparatus 409 obtains an ACK number having the oldest registration time stored on session list C4 in session information storage T7, that is, in this case, value 12001 stored in S0 in state z11 (f1006 in FIG. 16). (As a result, value 12001 stored in S0 of session list C4 is deleted; a value stored in S1 moves to S0; a value stored in S2 moves to S1; a value stored in S3 moves to S2; a value stored in S4 moves to S3; and a value stored in S5 moves to S4.) ACK number change unit T4 then rewrites the ACK number of packet e11 with value 12001 (f1007 in FIG. 16), and writes the ACK number obtained in preceding f1006 to ACK number cache Y1 (f1008 in FIG. 16). (As a result, ACK number cache Y1 is no longer empty.) Packet v110, which is packet e11 whose ACK number has been rewritten, is transferred to packet interception unit T3 (f1012 in FIG. 16), and then to packet transfer unit T2 and to packet output unit T9 in sequence. TCP shaper relay apparatus 409 then transfers packet v110 to server 407. At this point, session list C4 changes from state z11 to state z12 as shown in FIG. 18. For server 407, packet v110 serves as an ACK to packet v10.

Of packets v10, v30, v50, v70, v80, and v100 already transmitted to client 408, server 407 has received the ACK to packet v10, but no ACK yet to remaining packets v30, v50, v70, v80, and v100 at this point. Thus, server 407 of the second embodiment, which has received ACK packet v110, finally recognizes that an RTO to packet v30 expired, since server 407 has yet to receive from client 408 an ACK to packet v30 (a packet having ACK number 13001).

Then, server 407 determines that congestion has occurred in packet v30 or the packet transmitted thereafter, and retransmits to client 408, packet v120, which has data identical to the data in packet v30. TCP shaper relay apparatus 409 provided on the communication path between server 407 and client 408, receives packet v120 during the transmission. Since packet v120 travels downstream, sequence number obtaining unit T5 obtains and stores a sequence number required to rewrite an ACK number of an upstream packet in the flow from f401, according to the flow from f31 in FIG. 9, similar to the above-described case of packet v10 and the like. Processes for obtaining and storing the sequence number are the same as described in the first embodiment.

More specifically, similar to the case of packet v10 and the like, packet v120 is first determined as a packet containing TCP data (f31 in FIG. 9), and a session list thereof is identified as session list C4 of session 1 (f32 and f33 in FIG. 9). Then, sequence number obtaining unit T5 determines whether or not packet v120 is a retransmitted TCP packet as described below, for example (f34 in FIG. 9).

In FIG. 17, packet v120 has a sequence number of 12001 and a TCP data length of 1000 bytes. Sequence number obtaining unit T5 of TCP shaper relay apparatus 409 adds the sequence number and TCP data length of packet v120 obtained in process flow f32 of FIG. 9, that is, 12001+1000=13001. Then, sequence number obtaining unit T5 of TCP shaper relay apparatus 409 compares value 13001, which is the sum of the sequence number and TCP data length, with value 17001, which is the ACK number having the newest registration time at the moment stored in S4 of session list C4 in state z12 in session information storage T7. Since sum 13001 of the sequence number and TCP data length is less, sequence number obtaining unit T5 determines that packet v120 is the retransmitted TCP packet, and executes a process for the retransmitted packet (f36 and f37 in FIG. 9). In this case, sequence number obtaining unit T5 updates the value in mode information C3 of session 1 in session information storage T7 to 0, which indicates congestion avoidance mode (f36 in FIG. 9).

During the state of congestion, server 407 only retransmits to client 408 the packet containing TCP data, and does not transmit new TCP data to client 405. Thus, when the state of congestion lasts long, the transfer efficiency declines. In order to recover server 407 from the state of congestion at the earliest point, TCP shaper relay apparatus 409 generates and transmits an ACK to server 407, for example.

More specifically, in order to recover server 407 from the state of congestion, sequence number obtaining unit T5 of TCP shaper relay apparatus 409 generates upstream packet v121 containing no TCP data, based on the source IP address (e.g., 502 in FIG. 28), the destination IP address (e.g., 503 in FIG. 28), the source port number (e.g., 114 in FIG. 19), and the destination port number (e.g., 115 in FIG. 19), which are stored in C2 of session information storage T7. Sequence number obtaining unit T5 then transfers packet v121 to packet interception unit T3

Then, ACK number change unit T4 of TCP shaper relay apparatus 409 inputs from packet interception unit T3, packet v121 generated earlier in sequence number obtaining unit T5. ACK number change unit T4 obtains an ACK number having the oldest registration time at the moment stored in session information storage T7, that is, in this case, value 13001 stored in S0 of session list C4 in state z12. (As a result, value 13001 stored in S0 of session list C4 is deleted; a value stored in S1 moves to S0; a value stored in S2 moves to S1; a value stored in S3 moves to S2; and a value stored in S4 moves to S3.) ACK number change unit T4 then writes value 13001 to an ACK number of packet v121 (f37 in FIG. 9). Packet v121, to which ACK number 13001 has been written, is transferred to packet interception unit T3 (f38 in FIG. 9), and then to packet transfer unit T2 and to packet output unit T9 in sequence. TCP shaper relay apparatus 409 then transfers packet v121 to server 407.

Thereafter, TCP shaper relay apparatus 409 does not store the ACK number in session information storage T7, and transfers packet v120 as packet e12 to packet interception unit T3 (f38 in FIG. 9). Packet e12 is transferred to packet transfer unit T2 and to packet output unit T9 in sequence. TCP shaper relay apparatus 409 then transfers packet e12 to client 408. At this point, session list C4 changes from state z12 to state z13.

In the present invention as described above, the network relay apparatus relays communication on a network between at least one server and at least one client. When receiving an upstream packet on the connected network, the network relay apparatus and the network relay control method rewrite an ACK number of the packet with a value less than an original value, and then transmit the packet to the network. When the server receives the ACK packet having the rewritten ACK number, which is the value less than the original value, the server determines that not all packets earlier transmitted to the client have been delivered, and stops transmitting a new packet to the client until the server receives an ACK packet having an ACK number that shows all the packets transmitted to the client are delivered. Thereby, the downstream TCP throughput does not exceed a capacity of the network, thus reducing packet loss of a voice communication packet and the like transmitted simultaneously. Further, using no window size provides an advantage to solve a problem, including that the throughput does not decline in communication using a terminal incapable of handling the window size.

Third Embodiment

Figure 2:
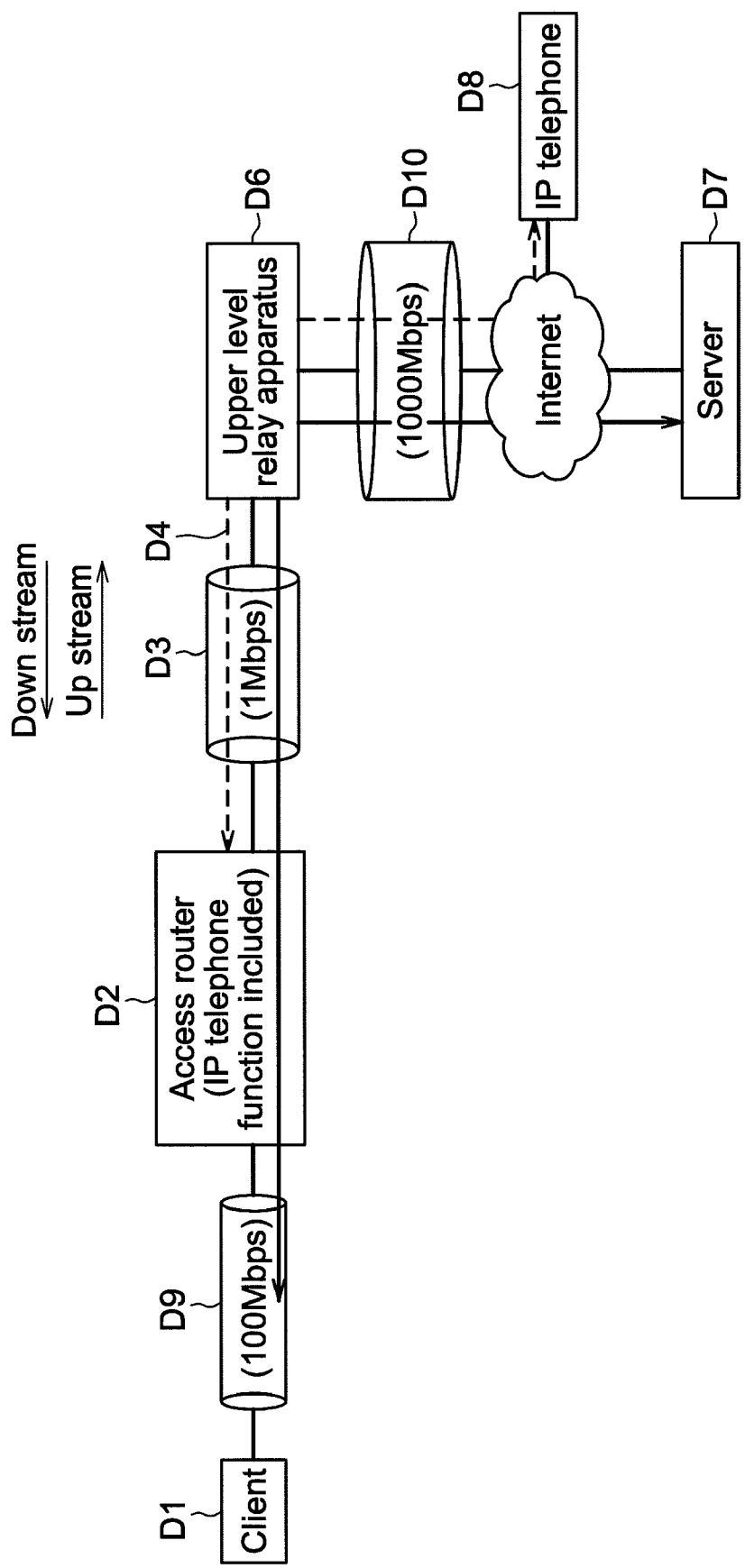
FIG. 2 illustrates a network system configuration using an access router.

FIG. 2 shows an example in which a TCP shaper operates as one function of an access router.

In FIG. 2, client D1 indicates an information device, such as a home PC and the like. Access router D2, to which the present invention is applied, is a packet relay apparatus that relays a packet transmitted from client D1 to upper level relay apparatus D6 hereinafter described, and that relays a packet transmitted from upper level relay apparatus D6 to client D1. Access router D2 also has an IP telephone function, and transmits and receives a packet containing audio data (hereinafter referred to as an "audio packet"). Access router D2 is physically installed at a home. Further, access router D2 assigns an address to client D1 using DHCP (Dynamic Host Configuration Protocol). Access router D2 stores therein the IP address assigned with DHCP, and thus is capable of recognizing the IP address of client D1 all the time.

Client D1 and access router D2 are connected via transmission line D9. Transmission line D9 has a transmission capacity of 100 Mbps.

Upper level relay apparatus D6 relays a packet transmitted from access router D2 to an Internet network, and relays a packet relayed from the Internet network to access router D2. Upper level relay apparatus D6 is physically installed at an Internet service provider that provides an Internet connection service to a home.

Upper level relay apparatus D6 and access router D2 are connected via transmission line D3. Transmission line D3 has a transmission capacity of 1 Mbps. On transmission line D3, a direction from access router D2 to upper level relay apparatus D6 is referred to as an "upstream direction," and a direction from upper level relay apparatus D6 to access router D2 is referred to as a "downstream direction."

Further, upper level relay apparatus D6 and the Internet network are connected via transmission line D10. Transmission line D10 has a transmission capacity of 1,000 Mbps.

Server D7 is connected to the Internet network. Client D1 and server D7 are able to transmit and receive a packet via transmission line D5. A sufficiently large transmission capacity is provided between the Internet network and server D7. More specifically, the transmission capacity is larger than that of transmission line D10.

Further, IP telephone D8 is connected to the Internet network. Access router D2 and IP telephone D8 are able to transmit and receive a packet via transmission line D4. A sufficiently large transmission capacity is provided between the Internet network and IP telephone D8.

First, described below is a behavior in a case where the present invention is not applied to access router D2. For example, client D1 connects to server D7 in TCP, and then server D7 transmits data to client D1 in a 900 kbps bandwidth. When IP telephone D8 and access router D2 start transmitting and receiving an audio packet to and from each other in a 200 kbps bandwidth, a required bandwidth on transmission line D3 is 200 kbps+900 kbps=1.1 Mbps. However, the downstream transmission capacity on transmission line D3 is 1 Mbps, which is smaller than the required total bandwidth of 1.1 Mbps for the downstream TCP data and audio packet. Since the downstream transmission capacity is not sufficient on transmission line D3, upper level relay apparatus D6 is unable to transmit the audio packet or TCP packet to transmission line D3. As a result, a packet loss occurs in a part of the audio packet or TCP packet. Then, the IP telephone function in access router D2 is unable to reproduce audio data of some packet, thus resulting in deterioration in the audio quality.

On the contrary, described below is the audio quality in a case where the TCP shaper function of the first or second embodiment of the present invention is applied to access router D2. In this case, the downstream bandwidth on transmission line D3 is controlled by the TCP shaper function of access router D2. The upstream or downstream direction of a packet relayed at access router D2 is determined as described below, for instance. When a destination IP address (e.g., 503 in FIG. 28) of the packet that access router D2 relays is identical to an IP address of client D1, the packet is determined downstream; when the destination IP address is not identical to the IP address of client D1, the packet is determined upstream. The IP address of client D1 can be stored in, for example, the DHCP function in access router D2. Referring to the stored IP address, access router D2 determines whether the packet destination IP address is identical to the IP address of client D1.

The TCP shaper function of access router D2 is deactivated first, and communication starts via access router D2. For example, client D1 connects to server D7 in TCP, and then server D7 transmits data to client D1 in a 900 kbps bandwidth. Before IP telephone D8 and access router D2 start transmitting and receiving an audio packet, the TCP shaper function is activated as triggered by an IP telephone connection request from either IP telephone D8 or access router D2. The TCP shaper function of access router D2 narrows the TCP data bandwidth from server D7 to client D1 accordingly. For example, the bandwidth used for TCP data from server D7 to client D1 is narrowed from 900 kbps to 100 kbps. Thereby, even when IP telephone D8 and access router D2 transmit to and receive from each other the audio packet in a 200 kbps bandwidth, a total bandwidth for the downstream TCP data and audio packet on transmission line D3 is 200 kbps+100 kbps=300 kbps. Since the downstream transmission capacity of transmission line D3 is 1 Mbps, which is sufficiently larger than the total bandwidth, the downstream transmission capacity on transmission line D3 is no longer insufficient, and thus causing no packet loss on upper level relay apparatus D6. Further, since only less than a half of the downstream transmission capacity is used on transmission line D3, jitter of the downstream audio packet is not deteriorated, and thus causing no audio deterioration in the IP telephone function of access router D2.

In the present invention as described above, the network relay apparatus relays communication on a network between at least one server and at least one client. When receiving an upstream packet on the connected network, the network relay apparatus and the network relay control method rewrite an ACK number of the packet with a value less than an original value, and then transmit the packet to the network. When the server receives the ACK packet having the rewritten ACK number, which is the value less than the original value, the server determines that not all packets earlier transmitted to the client have been delivered, and stops transmitting a new packet to the client until the server receives an ACK packet having an ACK number that shows all the packets transmitted to the client are delivered. Thereby, the downstream TCP throughput does not exceed a capacity of the network, thus reducing packet loss of a voice communication packet and the like transmitted simultaneously. Further, using no window size provides an advantage to solve a problem, including that the throughput does not decline in communication using a terminal incapable of handling the window size.

Although the IP telephone that handles only audio data is used in the description of the third embodiment, an IP-TV telephone that transmits and receives video data in addition to the audio data may also be used.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2006-107369 filed on Apr. 10, 2006, entire content of which is expressly incorporated by reference herein.

What is claimed is:

1. A network relay apparatus connecting a server terminal and a client terminal, the network relay apparatus comprising:
a transmitter that transmits first and second downstream packets received from the server terminal to the client terminal and transmits first and second upstream packets received from the client terminal to the server terminal, the second downstream packet being received after the first downstream packet, the second upstream packet being received after the first upstream packet, the first and second upstream packets respectively comprising first and second acknowledgement information according to the first and second downstream packets;
a memory that stores the first acknowledgement information; and
a data modifier that modifies the second upstream packet to change the second acknowledgement information into the first acknowledgement information stored in the memory,
wherein said transmitter transmits the second upstream packet modified by the data modifier to the server terminal after the first acknowledgment information was transmitted to the server terminal along with the first upstream packet, and
wherein each of the first and second downstream packets received by the network relay apparatus contains a non-zero payload.

2. The network relay apparatus according to claim 1, wherein the first and second acknowledgement information respectively indicates that the client terminal received the corresponding first and second downstream packets.

3. The network relay apparatus according to claim 2, wherein the first and second downstream packets respectively comprise substantial data and identification information of the substantial data, and the first and second acknowledgement information is determined according to the respective identification information.

4. The network relay apparatus according to claim 2, wherein the first downstream packet is followed by at least one additional downstream packet, and the first upstream packet is followed by at least one additional upstream packet, respectively corresponding to the at least one additional downstream packet and respectively including at least one acknowledgment information,
the memory further stores the at least one acknowledgement information, and
the data modifier changes the second acknowledgement information in the second upstream packet into the oldest acknowledgement information in the first acknowledgement information and the at least one acknowledgement information stored in said memory.

5. A network relay apparatus connecting a server terminal and a client terminal, the network relay apparatus comprising:
a transmitter that transmits first and second downstream packets received from the server terminal to the client terminal and transmits first and second upstream acknowledgement data, respectively corresponding to the first and second downstream packets, received from the client terminal to the server terminal, the second downstream packet being received after the first downstream packet is received, the second upstream acknowledgement data being received after the first upstream acknowledgement data is received, the first and second upstream acknowledgement data respectively comprising a first acknowledgement number and a second acknowledgement number;
a memory that stores the first acknowledgement number; and
a data modifier that modifies the second upstream acknowledgement data to change the second acknowledgement number into the first acknowledgement number stored in the memory,
wherein said transmitter transmits the second upstream acknowledgement data modified by the data modifier to the server terminal after the first acknowledgment information was transmitted to the server terminal along with the first upstream packet, and wherein each of the first and second downstream packets received by the network relay apparatus contains a non-zero payload.

6. The network relay apparatus according to claim 5, wherein the first acknowledgement number and the second acknowledgement number respectively indicate that the client terminal received the first downstream packet and the second downstream packet.

7. The network relay apparatus according to claim 6, wherein the first downstream packet is followed by at least one additional downstream packet, and the first upstream acknowledgement data is followed by at least one additional upstream acknowledgement data, respectively corresponding to the at least one additional downstream packets and respectively including at least one acknowledgment number, the memory further stores the at least one acknowledgement number of the at least one additional upstream acknowledgement data, wherein said data modifier modifies the second upstream acknowledgement data, to change the second acknowledgement number of the second upstream acknowledgement data into the oldest acknowledgement number in the first acknowledgement number and the at least one acknowledgement number stored in the memory, and said transmitter transmits the second upstream acknowledgement data modified by the data modifier to the server terminal.

8. The network relay apparatus according to claim 7, wherein the first acknowledgement number is smaller than the second acknowledgement number.

9. A data relaying method for transferring data between a server terminal and a client terminal, the method being implemented by a computer and comprising:

transferring first downstream packet received from the server terminal to the client terminal, the first downstream packet containing a non-zero payload;

receiving first upstream acknowledgement information from the client terminal, the first upstream acknowledgement information corresponding to the first downstream packet and comprising a first acknowledgement number;

storing the first acknowledgement number in a memory;

transferring second downstream packet received from the server terminal after the transfer of the first downstream packet to the client terminal, the second downstream packet containing a non-zero payload;

receiving a second upstream acknowledgement information from the client terminal, the second upstream acknowledgement information corresponding to the second downstream packet and comprising a second acknowledgement number that is larger than the first acknowledgement number;

modifying the second upstream acknowledgement information to rewrite the second acknowledgement number with the first acknowledgement number stored in the memory; and transmitting the modified second upstream acknowledgement information to the server terminal after the first acknowledgment information was transmitted to the server terminal along with the first upstream packet.

10. The network relay apparatus according to claim 5, wherein the transmitter further transfers voice communication packets between the client terminal and the server terminal when a voice communication session is performed together with a TCP session other than the voice communication session, and the data modifier changes only the second acknowledgement number of the second upstream acknowledgment data transmitted in the TCP session.

11. The network relay apparatus according to claim 5, wherein the data modifier changes an acknowledgement number of one of two consecutively received upstream acknowledgement data, and stops transmitting the other of two consecutively received upstream acknowledgement data to the server terminal.

12. The network relay apparatus according to claim 5, wherein the first downstream packet is followed by at least one additional downstream packet, and the first upstream acknowledgment data is followed by at least one additional upstream acknowledgment data, respectively corresponding to the at least one additional downstream packet and respectively including at least one acknowledgment number, the memory further stores the at least one acknowledgement number, the data modifier changes the second acknowledgment number of the second upstream acknowledgment data received from the client terminal to the oldest acknowledgement number in the first acknowledgement number and the at least one acknowledgement number stored in the memory, when the two acknowledgment numbers of immediately prior upstream acknowledgment data transmitted from the transmitter are the same, and the data modifier changes the second acknowledgement number of the second upstream acknowledgement data received from the client terminal to an acknowledgement number a same as the acknowledgement number of immediate prior upstream acknowledgement packet transmitted from the transmitter to the server terminal, when the two acknowledgment numbers of immediately prior upstream packets transmitted from the transmitter are different.

13. The network relay apparatus according to claim 5, wherein the data modifier further determines whether the second upstream acknowledgement data includes TCP data, and changes the second acknowledgment number when the TCP data is included.

* * * * *